United States Patent

Sedlock

[11] Patent Number: 6,126,528
[45] Date of Patent: Oct. 3, 2000

[54] PREFORMED OPHTHALMIC LENS BASE BLOCK WITH TEXTURED SURFACE

[75] Inventor: Carole Sedlock, Minneapolis, Minn.

[73] Assignee: 3M Innovative Properties Company, St. Paul, Minn.

[21] Appl. No.: 08/923,062

[22] Filed: Sep. 3, 1997

Related U.S. Application Data

[63] Continuation-in-part of application No. 08/713,901, Sep. 13, 1996.
[60] Provisional application No. 60/003,918, Sep. 18, 1995.

[51] Int. Cl.[7] ............................................. B24B 41/06
[52] U.S. Cl. ....................... 451/390; 451/41; 451/364; 451/384; 451/389; 451/390; 451/398; 451/460
[58] Field of Search ............................... 451/41, 364, 384, 451/389, 390, 398, 460

[56] References Cited

U.S. PATENT DOCUMENTS

| | | | |
|---|---|---|---|
| Re. 24,906 | 12/1960 | Ulrich | 206/59 |
| 3,382,202 | 5/1968 | Forrester et al. | 260/32.6 |
| 3,468,366 | 9/1969 | Suddarth | 164/332 |
| 3,512,310 | 5/1970 | Rudd et al. | 51/277 |
| 3,651,014 | 3/1972 | Witsiepe | 260/75 R |
| 3,786,116 | 1/1974 | Milkovich et al. | 260/885 |
| 3,911,185 | 10/1975 | Wright, Jr. | 428/97 |
| 3,914,489 | 10/1975 | Smedberg | 428/97 |
| 3,926,878 | 12/1975 | Shimizu et al. | 260/27 EV |
| 3,944,695 | 3/1976 | Kosaka et al. | 428/200 |
| 3,996,701 | 12/1976 | Ramirez et al. | 51/216 LP |
| 4,025,694 | 5/1977 | Pletcher | 428/480 |
| 4,059,715 | 11/1977 | Pletcher | 428/349 |
| 4,066,600 | 1/1978 | Pletcher et al. | 260/30.6 R |
| 4,173,506 | 11/1979 | Pletcher | 156/309 |
| 4,182,829 | 1/1980 | Walkowiak et al. | 528/75 |
| 4,235,761 | 11/1980 | Koenig | 260/28.5 AV |
| 4,280,939 | 7/1981 | Johnson | 260/23 AR |
| 4,287,013 | 9/1981 | Ronning | 156/242 |
| 4,327,013 | 4/1982 | Peters | 524/538 |
| 4,352,749 | 10/1982 | Nakabayashi et al. | 525/149 |
| 4,361,538 | 11/1982 | Dicoi et al. | 422/62 |
| 4,404,299 | 9/1983 | Decroix | 524/77 |
| 4,430,479 | 2/1984 | Merton et al. | 525/127 |
| 4,552,906 | 11/1985 | Podszûn et al. | 523/115 |
| 4,569,342 | 2/1986 | von Nostitz | 128/136 |

(List continued on next page.)

FOREIGN PATENT DOCUMENTS

| | | |
|---|---|---|
| 0 359 135 | 3/1990 | European Pat. Off. . |
| 0 443 269 B1 | 10/1993 | European Pat. Off. . |
| 0 642 039 A2 | 3/1995 | European Pat. Off. . |
| 46-21120 | 6/1971 | Japan . |
| 4-146983 | 5/1992 | Japan . |
| 2 017 546 | 10/1979 | United Kingdom . |
| WO 92/08614 | 5/1992 | WIPO . |
| WO 93/07228 | 4/1993 | WIPO . |
| WO 97/10923 | 7/1996 | WIPO . |
| WO 97/10924 | 9/1996 | WIPO . |

OTHER PUBLICATIONS

Gerber Optical, Inc. product literature, copyright Nov. 17, 1993.
Fast Grind® product literature, Super Systems, copyright unknown.
Advanced Blocking System product literature, Optical Works Corp., copyright unknown (2 sheets).
International Search Report for PCT/US/98/00803.
International Search Report for PCT/US/98/03715.
"Step One: Your First Step in Surface Preparation", Lab Talk, Jan./Feb. 1994, pp. 6, 8, 18.

*Primary Examiner*—Robert A. Rose
*Attorney, Agent, or Firm*—Yen Tong Florczak

[57] ABSTRACT

The present invention provides novel preformed base blocks that may be used with thermoplastic ophthalmic lens blocking compositions. The preformed base block has a rear portion that is sized and adapted to fit the chuck of a lens processing machine and a front portion that has a textured front surface and preferably a negatively tapered peripheral edge. The front portion is adapted to mechanically retain the thermoplastic blocking composition to form a lens block against a lens blank.

11 Claims, 5 Drawing Sheets

U.S. PATENT DOCUMENTS

| | | | |
|---|---|---|---|
| 4,659,786 | 4/1987 | Kawakami et al. | 525/415 |
| 4,678,836 | 7/1987 | McKinney et al. | 525/221 |
| 4,737,559 | 4/1988 | Kellen et al. | 526/291 |
| 4,740,245 | 4/1988 | Futami et al. | 106/35 |
| 4,768,951 | 9/1988 | Abiru et al. | 433/48 |
| 4,833,179 | 5/1989 | Young et al. | 522/183 |
| 4,847,137 | 7/1989 | Kellen et al. | 428/195 |
| 4,952,650 | 8/1990 | Young et al. | 526/194 |
| 5,026,278 | 6/1991 | Oxman et al. | 433/41 |
| 5,040,976 | 8/1991 | Ubel, III et al. | 433/41 |
| 5,066,231 | 11/1991 | Oxman et al. | 433/214 |
| 5,096,969 | 3/1992 | Payne et al. | 525/222 |
| 5,183,705 | 2/1993 | Birkholz et al. | 428/343 |
| 5,194,500 | 3/1993 | Chin et al. | 525/97 |
| 5,326,413 | 7/1994 | Esemplare et al. | 156/154 |
| 5,403,188 | 4/1995 | Oxman et al. | 433/218 |
| 5,415,544 | 5/1995 | Oxman et al. | 433/48 |
| 5,505,654 | 4/1996 | Wood et al. | 451/6 |
| 5,520,568 | 5/1996 | Craighead et al. | 451/42 |
| 5,721,644 | 2/1998 | Murray et al. | 359/819 |

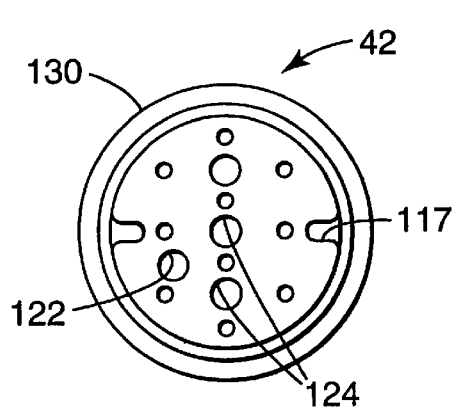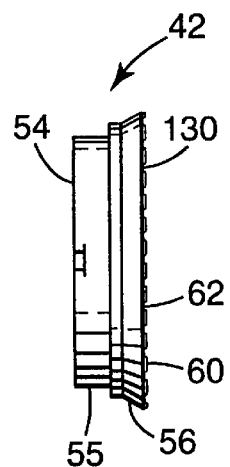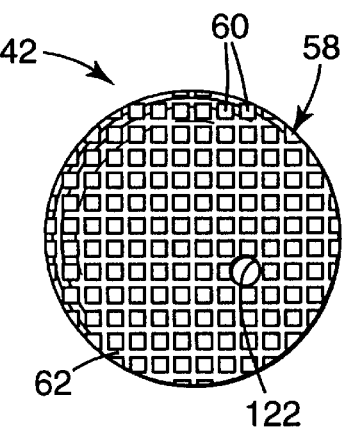
*Fig. 11e*  *Fig. 11f*  *Fig. 11g*
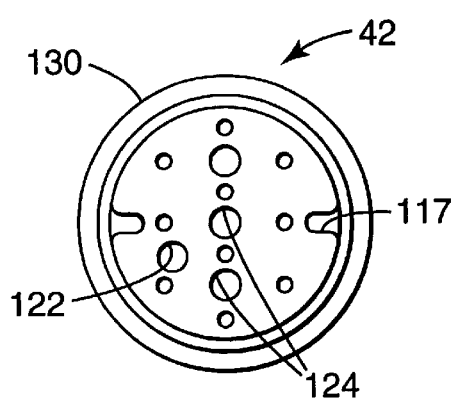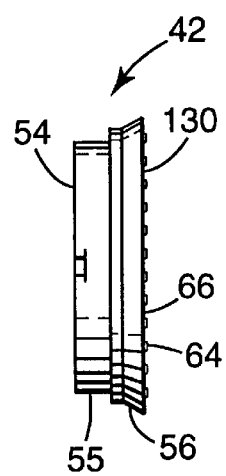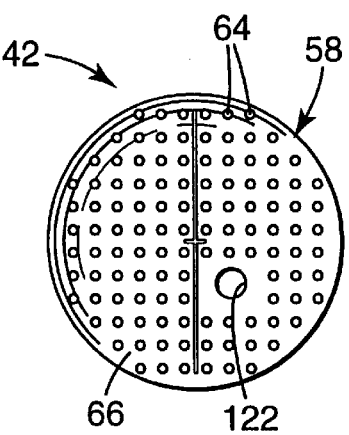
*Fig. 12e*  *Fig. 12f*  *Fig. 12g*

PREFORMED OPHTHALMIC LENS BASE BLOCK WITH TEXTURED SURFACE

CROSS REFERENCE TO RELATED APPLICATION

This application is a continuation-in-part of U.S. patent application Ser. No. 08/713,901, filed Sep. 13, 1996; and claims priority to U.S. Provisional Patent Application No. 60/003,918, filed Sep. 18, 1995. These applications are herein incorporated by reference.

FIELD

The present invention relates generally to a thermoplastic blocking composition for use in forming or attaching a lens block to an ophthalmic lens blank or a lens blank coating or tape and to preformed base blocks and lens blank tapes used with the blocking composition. The present invention also relates generally to methods of forming or attaching a lens block to an ophthalmic lens blank thereby facilitating the use of conventional machining, grinding and processing equipment to generate the ophthalmic lens.

BACKGROUND

A number of different methods have been used to hold a lens in place during the surfacing process. The method most commonly used at present makes use of a low-melting-temperature metal alloy to form or attach a "block" to the semifinished surface of a lens "blank." This procedure is often referred to as "lens blocking."

A common low-melting-temperature alloy comprises bismuth, tin, lead, cadmium, indium, and antimony. When these elements are combined correctly, the alloy melts at a temperature considerably lower than any one of its component elements would melt by itself. The alloy will neither cause a plastic lens to melt nor a glass lens to crack. For example, one alloy that melts at 47° C. is made from the following combination of metals: 45% bismuth; 23% lead; 8% tin; 5% cadmium; and 19% indium. This alloy will work for either plastic or glass lenses. In general, a higher melting alloy (e.g., one which melts at 70° C.) will generally only work for glass lenses.

Unfortunately, many of the present metal alloy materials pose significant environmental and health hazards. For example, lead, a common ingredient in many alloys, is considered to be a strong protoplasmic poison which can be introduced into the body through ingestion, inhalation and skin absorption. Similarly, cadmium may also pose significant health hazards. These hazards are particularly acute since many of the procedures used in the ophthalmic laboratory may cause fumes and/or dust particles of these metals to be released to the air, thereby creating environmental and health hazards for those formulating these alloys or those working with them.

A "blocker" is a piece of equipment employed for the purpose of lens blocking. Blockers that use metal alloy either inject molten alloy between the semifinished lens and a preformed block, or mold a block fully and completely from the alloy material. Both types of blockers have a melting pot that is thermostatically regulated, and a heated feeding tube.

Ideally, for plastic lenses, the alloy temperature is kept just above its melting point until it fills in the cavity between the lens and lens block. For example, the 47° C. alloy used for plastic, polycarbonate and polyurethane lenses should preferably be kept at 52° C., or even lower if possible. For glass lenses the alloy temperature may be maintained at higher temperatures (e.g., about 77° C.).

Once on the lens, the alloy should be cooled as rapidly as possible. In addition to saving time, rapid cooling of the alloy helps prevent the formation of aberrations or indentations on the surface of the lens. However, it is also important that the alloy be allowed to cool fully before generating the lens. If a lens is generated too soon after blocking, the alloy may not have cooled evenly, thereby producing surface distortion or waviness or the lens may become dislodged from the blank.

There are two convenient ways used to harden the alloy quickly. The first is to circulate cold running water or a coolant through a water or "chill" ring, which fits around the lens block. This causes the lens block and alloy to chill, "freezing" the alloy. The second method is to chill the block (e.g., in a refrigerator) before it is placed on the blocker.

A tape or other lens coating is often used when surfacing lenses: (1) to prevent the lenses from being scratched; (2) to serve as a heat shield (e.g., to protect a plastic lens from warpage caused by the heat of the alloy); (3) to achieve better or enhanced alloy adherence; and (4) to eliminate the step of cleaning the lens after surfacing. The cleanest and most common method for protecting lens surfaces and holding the block securely is the use of a surface tape. Tapes for this purpose were developed by the 3M Company and may be applied by placing the lens in a small chamber, stretching the tape over the chamber, and applying a partial vacuum. The lens moves up to the tape and the tape is pulled down over the lens surface. Alternatively, lens coatings, available in brush-on and spray applications, may be applied to the convex side of the lens.

Blocks used for glass lenses ("glass blocks" or "glass-lens blocks") are generally about 43 mm in diameter. They do not need to be large, since their purpose is purely to hold the lens during generating. Blocks used for plastic lenses ("plastic-lens blocks") must not only hold the lens in place, they must also keep it from flexing (bending) during generating, fining, and polishing. For that reason, plastic-lens blocks are generally considerably larger than glass-lens blocks. Since blocks for plastic lenses should be made as large as possible for each grinding situation, they are available in a variety of sizes ranging from approximately 55 to 68 mm. Generally, the largest block that can be used on a given semifinished lens blank is chosen. It should be understood that "glass-lens blocks" are generally made from steel, not glass. They are normally used for blocking glass lenses. Neither are "plastic-lens blocks" made exclusively from plastic. Such blocks are normally made from aluminum.

When a lens has been blocked using a metal alloy, it can be deblocked through shock deblocking or hot-water deblocking.

Shock deblocking of plastic lenses is done with a ring that is placed around the outside of the lens block on the front surface of the lens. It is deeper than the block, so when the lens and block are turned block side down, the ring may be struck against a flat surface. The block drops off the lens from the shock.

Hot-water deblocking is a commonly used technique that utilizes a hot-water bath. The temperature of the water is kept below the boiling point. The blocked lenses are placed on a rack, which is lowered into the water. With the lens under water, the alloy begins to melt and drips to the bottom of the tank. There is a valve at the bottom of the tank through which the liquid alloy can be drained off from time to time. After deblocking, the blocks and lenses are removed from the rack, the surface tape removed, and the lenses cleaned.

Attempts have been made to use less toxic materials in place of the toxic metal alloy. For example, materials comprising low molecular weight thermoplastic polymers and resins have been tried. Unfortunately, some of these compositions exhibit generally poor physical properties (e.g., they are relatively brittle and of little cohesive or tensile strength). Others are very soft and waxy (or become soft and waxy during use), and are prone to flexing which could cause lens distortion during processing. In addition, some of these compositions are also very tacky and messy to work with and do not directly adhere well to glass lenses. Cleaning of these tacky compositions from lens blanks can be very time consuming and significantly increase the cost of the lens processing operation. Also, current wax compositions tend to be heat sensitive at temperatures encountered during normal processing conditions (e.g., grinding and polishing). Materials that are sensitive to normal operating temperatures (e.g., those materials that soften significantly at those temperatures) are undesirable for use in this application. Also, some of the wax based materials are not recommended for use in this application. Also, some of the wax based materials are not recommended for use with glass lenses or cannot be used in the presence of petroleum based lubricants.

SUMMARY

We have discovered blocking compositions that have many advantages over traditional metal alloy materials. For example, the lens blocking compositions of the present invention are non-toxic, environmentally safe, and preferably biodegradable. The materials preferably can be used with existing processing equipment and may be recycled.

In one embodiment an ophthalmic lens block is provided that comprises a solidified mass of a thermoplastic blocking composition. The blocking composition may comprise a homopolymer or copolymer of epsilon-caprolactone, and preferably has a number average molecular weight of at least 3,000, a mean bending modulus of at least 69 MPa at 21° C., or a mean flexural strength of at least 1 MPa at 21° C. The composition is solid at 21° C. and has a sufficiently low melting or softening point such that the composition may be placed adjacent to an ophthalmic lens blank while at its melting or softening point without damaging the lens blank. The composition also has sufficient adhesion to a lens blank or to a lens blank coating or tape to hold an ophthalmic lens during a generating procedure. Ophthalmic lens blocking kits are provided that comprise the thermoplastic blocking composition and optionally a lens blank tape or coating and/or a preformed base block. Preferred preformed base blocks comprise a front portion that has a negatively tapered peripheral edge. The preferred preformed base block readily retains the thermoplastic blocking composition, yet can be easily separated from it after use. Preferred lens blank tapes are conformable and comprise a polymer backing that has both polar and non-polar moieties. By adjusting the ratio of polar and non-polar moieties, the adhesion to a thermoplastic blocking composition can be adjusted.

In another embodiment, a method of holding an ophthalmic lens blank is provided, comprising the steps of: providing a lens blocking composition as described above; heating the lens blocking composition to its melting or softening point; providing a blocking material receiving cavity against the lens blank; forming the ophthalmic lens blocking composition into the receiving cavity; and allowing the composition to solidify. Alternatively, a method of holding an ophthalmic lens blank is provided, comprising the steps of: providing an ophthalmic lens block comprising a solidified mass of a thermoplastic blocking composition, and preferably comprising a heat absorbing material; heating the surface of the lens blocking composition to its melting or softening point; positioning a lens blank against the softened surface of the lens blocking composition; and allowing the composition to resolidify.

RELATED APPLICATIONS

Of related interest is the following U.S. Provisional Patent Application, filed on Sep. 18, 1995 by the assignee of this invention: Lens Blank Surface Protection Film—Serial No. 60/004,120; and U.S. patent application, filed on Nov. 17, 1995 by the assignee of this invention: Lens Blank Surface Protection Film—Ser. No. 08/560,315, which are herein incorporated by reference. Also of related interest are U.S. patent application Ser. Nos. 08/713,344; 08/710,238; 08/713,345; 08/713,322 (filed on Sep. 13, 1996) and 08/818,266 (filed on Mar. 17, 1997), which are herein incorporated by reference.

BRIEF DESCRIPTION OF THE DRAWINGS

This invention will be better understood when taken in conjunction with the drawings wherein:

FIGS. 11e to 11g are side and end views of a further alternative preformed base block having a textured front surface.

FIGS. 12e to 12g are side and end views of a further alternative preformed base block having a textured front surface.

Figure 1:
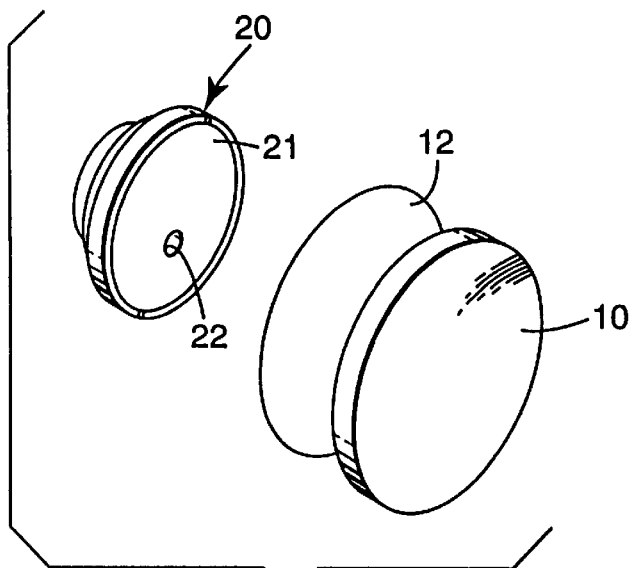
FIG. 1 is a perspective view of an ophthalmic lens blank and a lens block.

This invention utilizes certain principles and/or concepts as are set forth in the claims appended to this specification. Those skilled in the lens generating arts to which this invention pertains will realize that these principles and/or concepts are capable of being illustrated in a variety of embodiments which may differ from the exact embodiments utilized for illustrative purposes in this specification. For these reasons, the invention described in this specification is not to be construed as being limited to only the illustrative embodiments but is only to be construed in view of the appended claims.

DEFINITIONS

Unless otherwise specified, the term "molecular weight" in this specification refers to "weight average molecular weight." ($M_w = \Sigma_i N_i M_i^2 / \Sigma_i N_i M_i$) Although weight average molecular weight ($M_w$) can be determined in a variety of ways, with some differences in result depending upon the method employed, it is convenient to employ gel permeation chromatography. Standard sample preparation techniques should be observed. Molecular weight values reported by commercial suppliers of various materials are not always represented to be weight average molecular weight. The reported molecular weight is often presented in order to identify the particular material.

As used herein, the term "number average molecular weight" ($M_n$) refers to the total weight of all the molecules in a polymer sample divided by the total number of moles present. ($M_n = \Sigma_i N_i M_i / \Sigma_i N_i$) Although number average molecular weight can be determined in a variety of ways, with some differences in result depending upon the method employed, it is convenient to employ gel permeation chromatography.

As used herein, the term "Z average molecular weight" ($M_z$) refers to a weighted average molecular weight defined by the equation $M_z = \Sigma_i N_i M_i^3 / \Sigma_i N_i M_i^2$. Although Z average molecular weight can be determined in a variety of ways, with some differences in result depending upon the method employed, it is convenient to employ gel permeation chromatography.

As used herein, the term "polydispersity" refers to the ratio of a materials' "weight average molecular weight" divided by its "number average molecular weight." ($M_w/M_n$)

As used herein, the term "melting or softening point" refers to the temperature at which a material has changed from its cool state to its warm state and is capable of being shaped to conform to a lens blank.

As use herein, a "lens block" refers to the entire three-dimensional apparatus that is attached to the lens blank and used to "handle" the lens blank during processing. This term includes any optional preformed base block and the thermoplastic blocking composition that attaches the preformed base block to the lens. This term does not include the lens itself or any lens surface protection tape or coating that is applied to the lens prior to blocking.

DETAILED DESCRIPTION

A variety of materials can be used in the ophthalmic lens blocking compositions of the present invention. The materials described herein provide a blocking composition that has many advantages over traditional metal alloys. For example, the materials are non-toxic, environmentally safe, and preferably biodegradable. The materials preferably can be used with existing processing equipment and may be recycled.

Preferred compositions comprise a thermoplastic material, selection of which should be based in part on the desired end use for the composition (e.g., the type of lens being blocked, whether the composition is being used to form a block or attach a preformed block, etc.) and the desired properties of the composition in the molten or softened ("warm") state and solid or hard ("cool") state.

The warm state is characterized by appreciable mass flow of the blocking composition under moderate pressure at some temperature between above room temperature (preferably above about 35° C.) and the maximum temperature that can be safely tolerated by the lens blank against which the composition is formed or applied (e.g., for a thermoplastic material preferably below about 85° C., more preferably below about 75° C.). Notably, preferred thermoplastic materials of the present invention have a sufficiently high heat capacity that a temperature of 85° C. can be tolerated. In contrast, metal alloys heated to 85° C. might cause a plastic lens to melt or warp.

The cool state is characterized by sufficient strength and stiffness to permit a lens blank to be attached to a block, and by minimal apparent mass flow of the blocking composition under typical lens processing stresses and/or pressures at temperatures near or below room temperature.

The warm and cool state properties permit the blocking composition to be heated to a moderate temperature, shaped while warm to conform to the lens blank, and cooled or allowed to cool to form a substantially rigid block or blocking composition.

Suitable thermoplastic materials for use in the present invention include polyesters and polyurethanes such as those described in U.S. Pat. Nos. 3,382,202, 4,059,715, 4,182,829, 4,327,013, 4,361,538, 4,552,906 and 4,569,342; copolymers such as those described in U.S. Pat. Nos. 4,659,786 (e.g., polyester-polysiloxane block copolymers), 4,740,245 (e.g., ethylene vinyl acetate copolymers), and 4,768,951 (e.g., ionomer resins of ethylene copolymers); segmented copolyesters and polyetheresters such as those described in U.S. Pat. Nos. 3,651,014, 4,173,506, 4,059,715, 4,066,600, 4,025,694, 4,430,429 and 4,552,906; ethylene vinyl acetate resins such as are described in European Published Pat. Application No. 0 359 135 and Kokai No. Sho 63[1988]-96536; and polycaprolactones such as those described in U.S. Pat. Nos. 5,066,231, 5,040,976, and 5,026,278. The disclosures of these references are herein incorporated by reference for their teachings and disclosures of suitable thermoplastic materials.

Preferred thermoplastic materials have a weight average molecular weight of between about 5,000 and 100,000; more preferred materials have a weight average molecular weight of between about 10,000 and 70,000; and most preferred materials have a weight average molecular weight of between about 12,000 and 65,000. Preferred thermoplastic materials have a number average molecular weight of between about 3,000 and 100,000; more preferred materials have a number average molecular weight of between about 3,000 and 50,000; and most preferred materials have a number average molecular weight of between about 4,000 and 45,000. Preferred thermoplastic materials have a polydispersity less than about 10; more preferred materials have a polydispersity less than about 8; and most preferred materials have a polydispersity less than about 6.

In one presently preferred embodiment, the thermoplastic material is a homopolymer or copolymer of epsilon-caprolactone. Preferred polycaprolactones have the general formula:

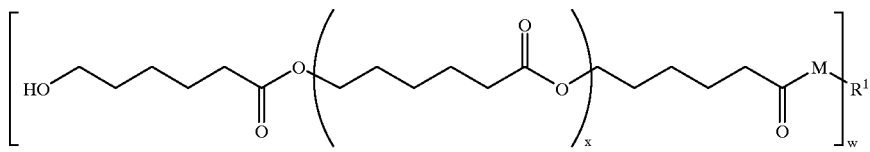

wherein $R^1$ is an aromatic or a straight chain or branched aliphatic backbone, which can optionally contain one or more non-interfering substituents such as hydroxyl or amine groups, w is 1 if $R^1$ is hydrogen, and w otherwise has an average value of about 1 to about 4, M is oxygen or —$NR^2$— where $R^2$ is hydrogen or a non-interfering aromatic or aliphatic group, and the average product of w times x is preferably greater than about 35.

Blends of polycaprolactones can also be employed. Compositions containing a blend of high and low molecular weight polycaprolactones can have both a higher modulus and a lower viscosity than a composition containing only one of the constituent polycaprolactones. In other words, the blend provides a synergistic combination of modulus and low viscosity. For example, blends of high molecular weight polycaprolactones (e.g., with a number average molecular weight greater than about 20,000) and low molecular weight polycaprolactones (e.g., with a number average molecular weight less than about 20,000) may be used. If desired, more than one high or low molecular weight polycaprolactone may be used. For example, one may employ two different low molecular weight polycaprolactones and one high molecular weight polycaprolactone.

As used in this specification a "high molecular weight polycaprolactone" refers to an epsilon-caprolactone homopolymer or copolymer whose number average molecular weight is at least about 20,000, and preferably at least about 30,000. The high molecular weight polycaprolactones preferably have the general formula described above, wherein $R^1$, $R^2$, w, and M are as previously defined and the product of w times x is greater than about 175. The product of w times x is more preferably at least about 250 and most preferably between about 250 and 440.

The low molecular weight polycaprolactone is an epsilon-caprolactone homopolymer or copolymer whose number average molecular weight is less than about 20,000, and preferably less than about 10,000. The low molecular weight polycaprolactones preferably have the general formula described above, wherein $R^1$, $R^2$, w, and M are as previously defined and the product of w times x is less than about 175. The product of w times x is more preferably less than about 100, and most preferably between about 3 and 90.

As a further guide, when the composition comprises a blend of high and low molecular weight polycaprolactones, the weight ratio of high to low molecular weight polycaprolactones preferably is between about 9.5:0.5 to 0.5:9.5, more preferably between about 9:1 to 1:9, most preferably 50:50 to 1.5:8.5, and will depend in part on the intended use for the composition.

The polycaprolactone can contain property-modifying or cross-linkable functional groups (for example, hydroxyl, acrylate, methacrylate, epoxy, isocyanato, or vinyl groups) if desired.

Preferred commercially available high molecular weight polycaprolactone polymers include "TONE P-767" polycaprolactone from Union Carbide Corp., the "CAPA" polycaprolactones "640" (reported 40,000 molecular weight), "650" (reported 50,000 molecular weight) and "656" (reported 56,000 molecular weight) from Solvay Interox, and the various high molecular weight polycaprolactones available from Daicell Chemical Industry Co., Ltd. Other suitable high molecular weight polycaprolactone polymers include CAPA 630 from Solvay Interox.

Preferred commercially available low molecular weight polycaprolactone polymers include "TONE P-300" polycaprolactone (reported 10,000 molecular weight), "TONE 1270" polycaprolactone (reported 4,000 molecular weight), the "TONE" polycaprolactone diols "0200" (reported 530 molecular weight), "0210" (reported 830 molecular weight), "0230" (reported 1,250 molecular weight), "0240" and "2240" (reported 2,000 molecular weight), and "0250" (reported 3,000 molecular weight), "TONE" polycaprolactone triols "0301" (reported 300 molecular weight), "0305" (reported 540 molecular weight) and "0310" (reported 900 molecular weight) from Union Carbide Corp., as well as the "CAPA" polycaprolactone diols "203" (reported 400 molecular weight) through "240" (reported 4,000 molecular weight), "CAPA" polycaprolactone triols "304" (250 molecular weight) and "305" (reported 540 molecular weight), and the "CAPA" polycaprolactone tetraol "316" (reported 1,000 molecular weight) available from Solvay Interox.

The amounts of high molecular weight and/or low molecular weight polycaprolactone, and the amounts of other ingredients in the blocking compositions of the invention, usually will be empirically selected. Selection should be based in part on the desired end use for the composition and the desired properties in the molten or softened ("warm") and solid or hard ("cool") states. For polycaprolactones, the warm state is characterized by an amorphous microstructure, and by appreciable mass flow under moderate pressure at some temperature between about 35° C. and about 85° C., although a maximum of about 75° C. is preferred. The cool state is characterized by a solidified semi-crystalline polycaprolactone microstructure, and by minimal, preferably no, apparent mass flow under moderate pressure at temperatures below 21° C.

Blends of polycaprolactones with other suitable and compatible materials and polymers can also be employed. For example, a suitable polycaprolactone material may be blended with an ethylene vinyl acetate ("EVA") resin. Suitable EVA resins are described in European Published Pat. Application No. 0 359 135 and Kokai No. Sho 63[1988]-96536. Suitable commercially available EVA resins include the "ELVAX" resins shown below:

| ELVAX Resin | Melt flow rate | % Vinyl acetate |
| --- | --- | --- |
| 40-W | 48–66 | 40 |
| 150 | 38–48 | 33 |
| 210 | 400 | 28 |
| 220 | 134–168 | 28 |
| 250 | 22–28 | 28 |
| 260 | 5.3–6.7 | 28 |
| 4969-6W | 1900 | 28 |

These resins are commercially available from E.I. duPont de Nemours & Company. "ULTRATHENE" EVA resins from Quantum Chemical Corp. and "ESCORENE" EVA resins from Exxon Chemical Corp. are also useful. Blends of resins can be used if desired.

In another embodiment, the thermoplastic material comprises a blend of the aforementioned EVA resins with a suitable wax material (e.g., paraffinic hydrocarbons) Suitable wax materials include commercially available waxes such as "SHELLWAX" and "SHELLMAX" available from Shell Oil Company, Houston Tex. and "EPOLENE" waxes available from Eastman Chemical Products, Inc. Kingsport, Tenn. "SHELLWAX" waxes are available in a variety of grades having melt points from 50 to 84° C. Suitable "SHELLWAX" waxes include grades 100, 120, 200, 270, 300, and 700. "SHELLWAX" grade 200 is presently particularly preferred. Suitable "EPOLENE" waxes are available in a variety of grades having molecular weights from about 1,800 to 23,000.

The preferred amounts of thermoplastic resin and wax in this embodiment of the thermoplastic blocking composition are as follows:

| Ingredient | Preferred weight % | More preferred weight % |
| --- | --- | --- |
| Thermoplastic resin | 30 to 90 | 50 to 80 |
| Wax | 10 to 70 | 20 to 50 |

In yet another embodiment, the thermoplastic material is a segmented copolyester, preferablely consisting essentially of a multiplicity of recurring intralinear long chain and short chain ester units connected head-to-tail through ester linkages. These are solid, non-tacky, strongly cohesive, solvent-free thermoplastic polymers. They consist essentially of from about 5 to 75 percent by weight of amorphous ester units and 95 to 25 percent by weight of crystallizable ester units joined through the ester linkages (the term "crystallizable" as used herein includes both crystalline ester units and units which are capable of becoming crystalline).

The crystallizable ester units in the copolyesters are of the formula: —C(O)$R_1$C(O)—O$R_2$O— (formula I) and the amorphous ester units are of the formula: —C(O)$R_3$C(O)—O$R_4$O— (formula II) wherein $R_1$ is preferably the divalent radical remaining after removal of carboxyl groups from a dicarboxylic acid having a molecular weight less than about 300, more preferably, $R_1$ consists of residues (remaining after removal of the carboxyl groups) of one or more diacids selected from saturated aliphatic dicarboxylic acids containing from 4 to 10 carbon atoms (the residues thereof containing from 2 to 8 carbon atoms) and, alternatively and less preferably, aromatic dicarboxylic acids such as terephthalic acid, isophthalic acid, phthalic acid, 4–4'-benzophenone dicarboxylic acid, 4–4'-diphenylmethanedicarboxylic acid, 4–4'-diphenylether dicarboxylic acid, 4,4'-diphenylthioether dicarboxylic acid and 4,4'-diphenylamine dicarboxylic acid;

$R_2$ is preferably the divalent radical remaining after removal of hydroxyl groups from a low molecular weight diol having a molecular weight less than about 250, more preferably, $R_2$ consists of residues (remaining after removal of the hydroxyl groups) of one or more saturated aliphatic diols containing from 2 to 12 carbon atoms;

$R_3$ is preferably $R_1$, optionally $R_3$ is $R_5$, wherein $R_5$ consists of the divalent radicals containing from 22 to 50 carbon atoms which remain after removal of the carboxyl groups from saturated aliphatic dimer acids (i.e., the polymerized and hydrogenated product of two molecules of an ethylenically unsaturated fatty acid containing from about 12 to 26 carbon atoms, the dimer acid thus being saturated and containing from 24 to 52 carbon atoms); and $R_4$ is $R_2$ or $R_6$, wherein $R_6$ consists of the divalent radicals remaining after removal of the hydroxyl groups from a long chain aliphatic diol having an average molecular weight of 200 to 4,000 (preferably 400 to 2,000, and more preferably 600 to 2,000), provided that at least one of $R_3$ and $R_4$ in each amorphous ester unit is $R_5$ or R6, and provided that when $R_1$ is aromatic, $R_2$ contains from 6 to 12 carbon atoms and the amorphous content is 50–75 percent by weight.

The copolyesters preferably have DTA melting temperatures of from about 25° to 150° C. and inherent viscosities of preferably at least 0.5 dl/g (this and the other inherent viscosities herein are measured in 0.3 g/dl solutions of polymer in chloroform at 25° C.). Usually the inherent viscosities of the copolyesters are not more than 1.5 dl/g at 25° C.

The copolyesters of the present invention are preferably substantially linear and of relatively high strength. The linear copolymers are prepared from short and long chain precursors which are difunctional with respect to carboxyl and hydroxyl, for example organic diols (glycols) and dicarboxylic acids. The diacid precursors containing $R_1$ are often referred to herein as short chain diacids, the diol precursors containing $R_2$ as short chain diols, the diacid precursors containing $R_5$ as long chain diacids and the diol precursors containing $R_6$ as long chain diols. The carboxyl and hydroxyl functions most often appear in the precursors as the free acid and free base but can also appear as simple derivative functions such as esters, acid chlorides or anhydrides if desired.

The relative amount of crystallizable and amorphous units is determined by the precursor charge. Most frequently the copolyesters are reaction products of a long and a short chain precursor of one functionality and a short chain precursor of the other functionality. In case of such a stoichiometrically balanced charge of three monomers, the weight percentages of amorphous and crystallizable units can be calculated exactly (this is also true where there are more than three monomers but of only three types, e.g., two short chain diacids, one short chain diol and one long chain diacid but no long chain diol, etc.). However, if monomers of all four types are included in the charge, the relative amounts of amorphous and crystallizable units are not exact but can be expressed as falling between two values (the range being quite narrow). Thus, to calculate the minimum amorphous content in such a copolyester, it is assumed that the maximum possible reaction occurs between the short chain diol and short chain diacid (thus maximizing the content of crystallizable units). To calculate the maximum amorphous content, it is assumed that the maximum possible reaction occurs first between the short chain diacid and the long chain diol and between the short chain diol and the long chain diacid, the remaining reactants after those reactions (if any remain) reacting with one another.

The amorphous and crystallizable units of the copolyesters can alternate in the polymer chains or they can appear in blocks of the same type and this can be controlled to some extent by the process of preparation. For example, prepolymers of crystallizable and/or amorphous units can be prepared separately thus assuring larger blocks of one type or the other or, as is the usual practice, the precursors (monomers) can be charged directly and simultaneously to the reaction vessel.

The amorphous blocks of the copolyesters of the invention are most often composed of alternating long chain diol and short chain diacid residues, but this is not necessarily the case. Although it is possible that a long chain diol and a long chain diacid could react alternately to form blocks of several repeating units, this is unlikely and, at any rate would have little effect on the properties of the resulting polymer. The end groups of the copolyesters can be of a single functionality, if an excess of one precursor is included, or can be a mixture if the charge was stoichiometrically balanced.

The short chain diacids can be saturated aliphatic acids containing from 4 to 40 carbon atoms (including unbranched, branched, or cyclic having 5 to 6 atoms in a ring) and/or aromatic acids containing from 8 to 15 carbon atoms. Examples of suitable aliphatic acids are succinic, glutaric, adipic, pimelic, suberic, azelaic, sebacic, 1,3- or 1,4-cyclohexanedicarboxylic, 1,3-cyclopentanedicarboxylic, 2-methylsuccinic, 2-methylpentanedioic, 3-methylhexanedioic, carbonic, oxalic, itaconic, diethylmalonic, fumaric, citraconic, allylmalonate, 4-cyclohexene-1,2-dicarboxylate, 2,5-diethyladipic, 2-ethylsuberic, 2,2,3,3 -tetramethylsuccinic, decahydro- 1,5- (or 2,6-) naphthylene dicarboxylic, 4,4'-bicyclohexyl dicarboxylic, 4,4'-methylenebis(cyclohexyl carboxylic), 3,4-furan dicarboxylate, and 1,1-cyclobutane dicarboxylate acids and the like. Other representative dicarboxylic acids include terephthalic and isophthalic acids, bibenzoic acid, substituted dicarboxy compounds with benzene nuclei such as bis(p-carboxyphenyl) methane, p-oxy (p-carboxyphenyl) benzoic acid, ethylene-bis(p-oxybenzoic acid), 1,5-naphthalene dicarboxylic acid, 2,6-naphthalene dicarboxylic acid, 2,7-naphthalene dicarboxylic acid, phenanthralene dicarboxylic acid, anthralene dicarboxylic acid, 4,4'-sulfonyl dibenzoic acid, etc. and $C_1$–$C_{10}$ alkyl and other ring substitution derivatives thereof such as halo, alkoxy or aryl derivatives.

The short chain diols include branched, unbranched, and cyclic aliphatic diols having 2 to 15 carbon atoms, such as, for example, ethylene glycol, 1,3-propylene glycol, 1,2-propylene glycol, 1,4-butanediol, 1,3-butanediol, 1,5-pentanediol, 2-methyl-2,4-pentanediol, 1,6-hexanediol, 1,8-octanediol, cyclobutane-1,3-di(2'-ethanol), cyclohexane-1,4-dimethanol, 1,10-decanediol, and 1,12-dodecanediol. Preferred are diols with 2–15 carbon atoms such as ethylene, propylene, isobutylene, tetramethylene, pentamethylene, 2,2-dimethyltrimethylene, hexamethylene and decamethylene glycols, dihydroxy cyclohexane, cyclohexane dimethanol, resorcinol, hydroquinone, 1,5-dihydroxy naphthalene, etc. Especially preferred are aliphatic diols containing 2–8 carbon atoms. Included among the bisphenols which can be used are bis(p-hydroxy) diphenyl, bis(p-hydroxyphenyl) methane, and bis(p-hydroxyphenyl) propane.

The chemical structure of the long chain diol is not critical. Any substituent groups which do not interfere with the polymerization reaction to form the copolyester can be present. Thus, the chain can be a single divalent acyclic or alicyclic, hydrocarbon group, poly(alkylene oxide) group, polyester group, a combination thereof, or the like. Any of these groups can contain substituents which do not interfere to any substantial extent with the polymerization to form the copolyester used in accordance with this invention. The hydroxy functional groups of the long chain diols used to prepare the copolyesters should be terminal groups to the extent possible.

Suitable long chain diols include poly(oxyalkylene) glycols in which the alkylene group contains from 2 to 9 carbon atoms, preferably from 3 to 8 carbon atoms and more preferably from 2 to 4 carbon atoms. Among these compounds are poly(alkylene oxide) glycols and polyether glycols such as poly(oxyethylene)glycols having molecular weights of about 200, 600, 1500, and 2000, poly (oxypropylene)glycols, having molecular weights of about 425 and 1800, poly(oxytetramethylene)glycols, poly (oxypentamethylene)glycol, poly(oxyhexamethylene) glycols, poly(oxyheptamethylene)glycols, poly (oxyoctamethylene)glycols, poly(oxynonamethylene) glycols, poly(1,2-butylene oxide)glycol, random or block copolymers thereof, for example, glycols derived from ethylene oxide and 1,2-propylene oxide and poly-formals prepared by reacting formaldehyde with glycols, such as pentamethylene glycol, or mixtures of glycols, such as a mixture of tetramethylene and pentamethylene glycols. Also included are poly(lactone)glycols, e.g., poly(caprolactone) glycol; poly(oxyalkylenecarbonate)glycols, e.g., poly (oxyethylenecarbonate)glycol; and glycols containing a hydrocarbon main chain, e.g., hydroxy-terminated polybutadiene.

The copolyesters can be prepared by conventional polycondensation polyester-forming reactions wherein one or more short chain diacids and/or long chain diacids or their equivalents (e.g., volatile alcohol esters, acid chlorides, or anhydrides of the diacids) are caused to react with an equivalent amount of one or more short chain diols and/or long chain diols. When copolyesters having an acid value of no more than about 2 (indicating substantially complete reaction) and relatively high molecular weight are desired, it is preferable that the polyester reaction be carried out in the presence of a suitable catalyst.

The choice of catalyst depends on the starting materials. Thus, for simple esterification of a short chain diacid with a short chain diol and a long chain diol, the diacid alone may preferably function as esterification catalyst. Optionally, however, one may use as a catalyst a compound having an ionization constant greater than about $10^{-3}$, such as, for example, p-t-butylbenzenesulfonic acid. For esterification by ester interchange, an ester interchange catalyst is used. Suitable catalysts include, for example, manganous acetate, calcium acetate, zinc acetate, sodium methoxide, antimony oxide, antimony glycoxide, tetraalkyltitanates, complex titanates such as magnesium hexaalkyltitanates or other suitable ester interchange catalysts as described in the literature relating to the preparation of polyesters.

Suitable thermoplastic materials have a melting or softening point above about 35° C. Preferred thermoplastic materials have a melting or softening point between about 40 and 85° C., more preferably between about 45 and 75° C., and most preferably between about 50 and 70° C. A composition has reached its melting or softening point when it has changed from its solid state and has become capable of appreciable mass flow under moderate pressure.

Preferred compositions are capable of being injection molded using standard blocking apparatus. Typically, the pressure employed in commercial blocking apparatuses is about 69 kPa (10 psi). Preferred compositions for forming blocks are able to fill the lens block cavity in less than about 2 minutes using standard equipment, such as an "OPTEK" 200 blocker from Optek Division, Associated Development Corp., Pinellas Park, Fla. More preferably, the cavity can be filled in less than about 1 minute, and most preferably, the cavity can be filled in less than about 30 seconds.

A common physical property measured in the plastics industry to characterize a material's flow properties under pressure is its viscosity. Suitable compositions have a viscosity that is low enough such that the material may be easily molded when in its warm state to the shape of the lens blank. Preferred materials have a viscosity that is low enough such that the material may be injection molded within a reasonable time under a reasonable pressure. The composition's viscosity is preferably not so low that the composition undesirably "flashes" when injection molded (i.e., undesirably flows through cracks between the cavity and the lens blank). In addition, when the composition contains solid adjuvents, such as fillers, the warm state viscosity should preferably be high enough that the filler does not undesirably settle.

Preferred blocking compositions for use in the present invention with traditional blocking machines have a shear viscosity (measured at the desired temperature of use using a Rheometrics Dynamic Analyzer (RDA-II) having 25 mm parallel plate geometry and a steady shear rate of $1\ s^{-1}$) of between 3 and 500 Pascal seconds (Pa s). More preferred blocking compositions for use in the present invention with traditional blocking machines have a shear viscosity of between 3 and 100 Pa s. Most preferred blocking compositions for use in the present invention with traditional blocking machines have a shear viscosity of between 3 and 30 Pa s.

The blocking composition should preferably be hard enough at its use temperature to function in the manner intended. For example, the composition, when used to form a complete block, should be hard enough to withstand the forces and stresses imparted during the typical lens processing procedure, including any forces and stresses imparted to the composition during mounting and unmounting from the lens processing machinery as well as any forces imparted to the composition during the actual grinding or finishing operation. Compositions that deform or flow appreciably during these operations may be unsuitable. Suitable thermoplastic materials are solid or "hard" at temperatures near or below room temperature. Preferred thermoplastic materials are solid at temperatures below about 40° C., more preferred thermoplastic materials are solid at temperatures below about 45° C., and most preferred thermoplastic materials are solid at temperatures below about 50° C.

The hardness of the blocking composition may be measured by the material's bending modulus. This property is conveniently measured using the three-point bending technique described in ASTM D790-86. Suitable blocking compositions have a mean bending modulus of at least 34.4 MPa, preferably at least 69 MPa, more preferably at least 138 MPa, and most preferably at least 276 MPa, when tested at 21° C. according to ASTM D790-86 (using at least 3 specimens per test).

Preferred solid blocking compositions exhibit a Shore "A" hardness of at least 40 when tested at 21° C. using the technique described in ASTM D2240 (using at least 3 specimens per test). More preferred compositions have a Shore "A" hardness of at least 70, and most preferred compositions have a Shore "A" hardness of at least 90. If the Shore "A" value of a particular material is out of scale then Shore "D" may be employed. More preferred solid blocking compositions exhibit a Shore "D" hardness of at least 20 when tested at 21° C. using the technique described in ASTM D2240 (using at least 3 specimens per test). Most preferred compositions have a Shore "D" hardness of at least 25, and optimum compositions have a Shore "D" hardness of at least 30.

Alternatively, the hardness of the composition may be tested using a nanoindentation technique, as described in Example 2. Preferred compositions have a nanoindentation hardness of at least 1 GPa, more preferred compositions have a nanoindentation hardness of at least 2 GPa, and most preferred compositions have a nanoindentation hardness of at least 4.5 GPa.

The blocking composition should preferably have enough cohesive strength and/or tensile strength to function in the manner intended. For example, the composition, when used to form a complete block, should have enough cohesive strength to withstand the forces and stresses imparted during the typical lens processing procedure, including any forces and stresses imparted to the composition during mounting and unmounting from the lens processing machinery as well as any forces imparted to the composition during the actual grinding or finishing operation. Compositions that fall apart, crack, or shatter during these operations are unsuitable.

The strength of the blocking composition may be conveniently measured using the three-point bending technique described in ASTM D790-86. Preferred blocking compositions have a mean flexural strength at 21° C. of at least 1 MPa, more preferably at least 2 MPa, most preferably at least 4 MPa, and optimally at least 6.8 MPa, when tested according to ASTM D790-86 (using at least 4 specimens per test).

The blocking composition preferably should be dimensionally stable and should maintain the desired geometric alignment of the lens blank to the processing machine. Compositions that are either too soft or that creep under typical operating stresses may not maintain the necessary alignment of the lens to the reference guides on the back of the block. These errors will be imparted to the lens and may cause imprecise machining of the lens.

Preferred blocking compositions are relatively dimensionally stable when heated over a temperature range of 0° C. to near the melting temperature of the composition. Example 1 describes a Thermal Mechanical Analysis technique that may be used to measure a material's dimensional change upon heating. Preferred blocking compositions exhibit less than 2.9% change in dimension over a temperature range between 0° C. and three degrees less than the material's melting temperature, when tested according to the procedure described in Example 1. More preferred blocking compositions exhibit less than 2% change in dimension, and most preferred blocking compositions exhibit less than 1.5% change in dimension.

Preferred blocking compositions are also relatively dimensionally stable when cooled over a temperature range of near the melting temperature of the composition to 21° C. Preferred blocking compositions exhibit less than a 5% change in volume when cooled from the material's melting temperature to 21° C. More preferred blocking compositions exhibit less than 4% change in volume, and most preferred blocking compositions exhibit less than 3% change in volume. Optimally, the blocking composition can withstand normal changes in dimension without cracking or crazing.

The blocking composition is preferably non-tacky at 21° C. Materials which are tacky at room temperature tend to be difficult to work with and messy. Tacky materials also tend to become contaminated with lint and dust. These contaminants can adversely affect the ability of the composition to be recycled. Tackiness may be measured using a probe tack test as described in ASTM D2979-88 and Example 2 below. Preferred compositions have a mean peak value of less than 800 g, more preferred compositions have a mean peak value of less than 400 g, when tested as described herein.

The blocking composition should preferably adhere to the lens blank (or to a coating or tape applied to the lens blank) with a sufficient strength to avoid unintended detachment of the lens during processing, yet preferably allow deblocking of the lens using traditional shock deblocking or hot-water deblocking methods. Thus, a preferred balance of adhesion should be achieved.

One method of measuring adhesion is described in Example 2. This method utilizes a tensile testing machine to shear a small button of material from the surface of a substrate. Using this method, preferred blocking compositions have a mean shear adhesion value, of at least 6.5 kg/cm$^2$, more preferably between 6.5 and 25 kg/cm$^2$, and most preferably between about 8 and 20 kg/cm$^2$.

Another method of assessing whether a particular blocking composition achieves the necessary balance of adhesion between the blocking composition and the lens blank (or to a coating or tape applied to the lens blank) is to perform a shock deblocking test using a standard commercial lens block. For this test, a 70 mm plastic lens with a 2.0–2.4 mm center thickness, piano, finished uncut, "RLX Plus™ Scratch Resistant, Finished Lens in Hard Resin" from Signet Armorlite, Inc. is optionally covered with a surface protective tape. A brass blocking ring is placed on a blocker (e.g., OPTEK™ Model 200 Blocker) and a 56 mm diameter Coburn Block from Coburn Company is placed into the ring such that the inlet in the block fits snugly over the rubber nozzle. The block is then centered on the lens and slowly filled with molten blocking composition. The blocked lens assembly is allowed to set for 10 to 15 seconds after filling, in order for the resin to harden and form a good bond to the taped lens. The blocked lens is removed from the blocker and allowed to set for 1 hour before deblocking. The blocked lens is placed into the deblocking ring and the lens is taped to the deblocking ring using 1.27 cm wide filament tape. With the blocking tool facing downward, the blocked lens is placed in a hollow tube. The diameter of the tube is much greater than the blocking tool and the tube is sufficiently thick to abruptly stop the lens by its perimeter. The blocked lens assembly is dropped starting at 2.54 cm height and raised in 2.54 cm increments until the block separated from the tape or until 15.24 cm in height, then, raised and dropped in 5.08 cm increments up to 91.44 cm. The height in centimeters at which the block released from the tape is recorded as the deblock value. Using this method, preferred blocking compositions have a deblock value of between 5 and 56 cm, more preferably between 7 and 45 cm, most preferably between about 10 and 35 cm, and optimally between about 14 and 20 cm.

The blocking compositions of the present invention can contain a wide variety of adjuvents depending upon the desired end use. Suitable adjuvents include solvents, diluents, plasticizers, pigments, dyes, inorganic and organic fibrous or particulate reinforcing or extending fillers, nucleating agents, thixotropic agents, indicators, inhibitors, stabilizers, UV or IR absorbers, and the like.

Viscosity modifiers and/or performance modifiers (hereinafter "modifiers") are particularly preferred optional adjuvents for use with the thermoplastic blocking compositions of the present invention. These modifiers may be added to the blocking composition as needed to either enhance or adjust certain warm state properties, such as the viscosity of the heated composition (e.g., to facilitate flow rates during cavity filling) and/or to enhance or adjust certain cool state properties, such as resistance of the material to cracking upon cooling. Preferably, the modifiers are essentially solid at room temperature (so as to not undesirably provide a "greasy" feel to the blocking composition). The modifiers also preferably maintain their compatibility with the blocking composition during their transition to or from the cool state to the warm state. Most preferably, the modifier does not undesirably phase separate during these transitions.

Suitable modifiers include carboxylic acids of the form $CH_3(CH_2)_n COOH$, where n is preferably between about 10 and 16 for blocking compositions that have a melting temperature between about 45 and 75° C. In general, the number of —$CH_2$— groups may be adjusted to complement the particular thermoplastic blocking composition being used. Higher numbers of these groups tend to increase the melting temperature of the acid. Thus, when the melting temperature of the blocking composition being used is higher than 75° C., the number of —$CH_2$— groups can be larger. Conversely, acids having lower numbers of —$CH_2$— groups will tend to be liquids at room temperature. Their use in a blocking composition may result in a blend that has a somewhat greasy feel. A particularly preferred carboxylic acid modifier for use with polycaprolactone polymers and blends of polycaprolactone polymers is 1-octadecanoic acid ("stearic acid," available from Aldrich Chem. Co., Milwaukee, Wis.).

Suitable blocking compositions have been developed that incorporate between about 0 and 40 weight percent carboxylic acid modifier. More preferably, polycaprolactone based blocking composition comprise between about 1 and 25 weight percent carboxylic acid modifier, and most preferably, between about 5 and 20 percent carboxylic acid modifier.

Other suitable modifiers include monohydric and polyhydric alcohols. Suitable alcohols include straight chain alcohols, branched chain alcohols and glycols. Preferred monohydric straight chain alcohols have the general form $CH_3(CH_2)_n OH$, where n is preferably between about 11 and 19 for blocking compositions that have a melting temperature between about 45 and 75° C. More preferably, n is between about 13 and 17 for these compositions. In general, the number of —$CH_2$— groups may be adjusted to complement the particular thermoplastic blocking composition being used. Higher numbers of these groups tend to increase the melting temperature of the alcohol. Thus, when the melting temperature of the blocking composition being used is higher than 75° C., the number of —$CH_2$— groups can be larger. Conversely, alcohols having lower numbers of —$CH_2$— groups will tend to be liquids at room temperature. Their use in a blocking composition may result in a blend that has a somewhat greasy feel. In general, suitable branched chain alcohols may have a somewhat larger number of —$CH_2$— groups than straight chain alcohols. Preferred branched chain alcohols have between 10 and 20 carbon atoms.

Particularly preferred monohydric straight chain alcohol modifiers for use with polycaprolactones and blends of polycaprolactones include 1-octadecanol ("stearyl alcohol," available from Aldrich Chem. Co., Milwaukee, Wis.), 1-hexadecanol ("cetyl alcohol," available from Aldrich Chem. Co.), 1-tetradecanol ("myristyl alcohol," available from Aldrich Chem. Co.), and 1-dodecanol ("dodecyl alcohol," available from Eastman Chem. Products, Inc., Kingsport, Tenn.).

Suitable blocking compositions comprise up to about 60 weight percent alcohol modifier. Preferred compositions comprise between about 1 and 60 weight percent alcohol modifier. More preferably, polycaprolactone based blocking compositions comprise between about 5 and 45 weight percent alcohol modifier, and most preferably, between about 15 and 40 percent alcohol modifier.

Preferred polyhydric alcohols include polyethylene gylcols having the general form $H(OCH_2CH_2)_nOH$, where n is between 20 and 185, and polyethylene glycol ethers having the general form $R(OCH_2CH_2)_nOR$, where R is typically hydrogen or a straight-chain or branch-chain alkyl group having between 1 and 10 carbon atoms and where n is between 17 and 116. More preferably, one R group is hydrogen and the other R group is selected from the group consisting of $CH_3$ and $CH_2CH_3$.

Most preferably, the polyhydric alcohol is a polyethylene glycol. Preferred polyethylene glycols have a weight average molecular weight between about 900 and 8,000. More preferably, for use with polycaprolactone based blocking compositions the polyethylene glycol has a weight average molecular weight between about 1,000 and 3,400. A presently preferred polyethylene glycol is available from Aldrich Chemical Company, Milwaukee, Wis., and has a molecular weight of about 1,500.

Other suitable polyhydric alcohols include polyethylene glycol methyl ethers having a weight average molecular weight between about 750 and 5,000. More preferably, for use with polycaprolactone based blocking compositions the polyethylene glycol methyl ether has a weight average molecular weight between about 1,000 and 3,400. A presently preferred polyethylene glycol methyl ether is available from Aldrich Chemical Company, Milwaukee, Wis., and has a molecular weight of about 2,000.

If desired, blends of two or more modifiers may be employed. For example, combinations of stearic acid and stearyl alcohol; stearyl alcohol and myristyl alcohol; stearyl alcohol, myristyl alcohol and dodecyl alcohol; and stearyl alcohol, myristyl alcohol and polyethylene glycol have been found to be beneficial. Other combinations will likely also be suitable. The blend should be chosen to optimize the properties of the blocking composition for its desired use. Myristyl alcohol has been found to be particularly compatible with polycaprolactone based blocking compositions and has also been found to help make other less compatible modifiers compatible with polycaprolactone. When blends of two or more modifiers are employed, suitable blocking compositions comprise up to about 60 weight percent of the blend of modifiers. Preferably, polycaprolactone based blocking compositions comprise between about 1 and 60 weight percent of the blend of modifiers, more preferably between about 15 and 50 weight percent of the blend of modifiers, and most preferably, between about 15 and 40 percent of the blend of modifiers.

Preferred fillers for use in the present invention comprise inorganic or organic, particulate or fibrous materials which are substantially insoluble in the continuous phase. Filler morphologies may include spheres, bubbles, expandable bubbles, particulate materials, filaments, microfibers, flakes and platelet type materials, as well as combinations of these. The fillers may have a solid, porous, or hollow structure.

Suitable inorganic filler materials include glass, amorphous and crystalline silica, soda lime borosilicate, amorphous sodium/potassium/aluminum silicate glass, alumina, iron oxides, calcium metasilicate, calcium carbonate, calcium sulfate (in either a particulate or microfiber form), kaolin, mica, talc, barium sulfate, boron fibers, carbon fibers, glass fibers, ground glass fibers, flake glass, metallic fibers, feldspar, barium ferrite, titanium oxide, ceramics and the like. Preferred inorganic filler materials include glass and ceramic bubbles such as: Scotchlite™ brand glass bubbles H50/10000 EPX, H50/10000 (acid washed), K-46, and S60/10000 (available from 3M); Extendosphere™ brand SG, CG, SF-12 (available from PQ Corp.); Zeeosphere™ brand 200, 400, 600, 800, and 850 (available from 3M); Zeolite™ W1000, W1012, W1300, W1600, G3400, and G3500 (available from 3M); Dicaperl™ brand HP-900 and HP-920 (available from Grefco) and Sil-Cell™ brand Sil-35/34, Sil-32, Sil-42, and Sil-43 (available from Silbrico Corp., Hodgkins, Ill. 60525). Dicaperl™ brand HP-820, HP-720, HP-520, HP-220, HP-120, HP-900, HP-920, CS-10-400, CS-10-200, CS-10-125, CSM-10-300, and CSM-10-150 (available from Grefco, Torrance, Calif.), and ceramic particles such as Ceramcel™ (available from Microcel Tech. Inc.) may also be suitable, particularly when blended with other fillers. Colored pigment fillers are also suitable. Blends of these fillers may also be suitable.

Suitable organic fillers include fillers comprised of thermoplastic or thermoset organic materials or both as well as composite filler materials comprising the aforementioned organic materials as matrix and inorganic micro-inclusions dispersed therein. Preferred organic fillers are insoluble in the blocking composition. Suitable thermoplastic filler materials include polyolefins such as Primax brand UH-1080, UH-1060 and UH-1250 (available from Air Products & Chemicals—Allentown, Pa.), polyesters (e.g., poly(ethylene terephthalate), hereinafter referred to as "PET"), polyamides, polyimides, polyacrylates, polycarbonate, polyurethane and the like including copolymers of the aforementioned materials. Suitable thermoplastic filler materials also include expandable bubbles such as Expancel 461 DE 20 microspheres (available from Nobel Industries). Suitable thermoset filler materials include epoxies, aldehyde condensation products (e.g., Ucar Thermoset microballoons BJO-0950, BJO-0820, BJO-0900, BJO-0840, BJO-09300 available from Union Carbide, Danbury Conn.), acrylates, and methacrylates. Preferred organic filler materials include polyethylene microspheres (available from Air Products & Chemicals—Allentown, Pa.).

Preferred particulate fillers have an average particle diameter between 5 and 500 microns, more preferably the particulate fillers have an average particle diameter between 20 and 200 microns, most preferably the particulate fillers have an average particle diameter between 30 and 120 microns. As used herein, "average particle diameter" is defined as the diameter of a sphere of the same volume as the particle.

Microfibers may be added to the blocking composition to enhance integrity or composite strength. Preferred fibers for use in the present invention have an average length between 25 and 5,000 microns, more preferably the fibers have an average length between 30 and 1,000 microns, most preferably the fibers have an average length between 30 and 500 microns. Microfiber fillers such as those described in U.S. patent application Ser. No. 08/008,751, which is herein incorporated by reference, may also be useful alone or in combination with other particulate fillers or fibers.

Suitable concentrations of filler in the blocking composition (i.e., "filler loading") will vary depending on the bulk density of the filler, the specific gravity of the filler and particular thermoplastic blocking composition employed, and the desired handling property of the composition. A suitable filler loading is determined by selecting a level which is sufficiently high to ensure adequate strength but not so high that the composition becomes too viscous to flow and adapt to the lens surface when softened.

The composition should remain substantially homogeneous (that is, it should not undergo macroscopic phase separation or filler sedimentation) during use and more preferably during prolonged storage prior to use. The composition preferably should retain its desired physical properties even if repeatedly cycled between the warm and cool states. Thus the selection of ingredients can be guided in part by a desire to preserve homogeneity and thermal reversibility.

The ingredients in the blocking composition can be blended by hand or by mechanical mixing. The ingredients preferably are warmed sufficiently to melt the thermoplastic material, but if desired can be mixed at lower temperatures. Any suitable mixing device can be used, including kettles equipped with a mechanical stirrer, extruders, rubber mills, and the like.

The blocking composition can be put up in a variety of forms including preformed blocks, sheets, ropes, pellets, powders and the like. The composition can be shaped in a variety of ways including extrusion, injection molding and web processing using a coating knife or rollers. The composition can be sold unwrapped, loosely wrapped in a package, or packaged in tubes, syringes, and the like.

The blocking composition can be converted from the cool state to the warm state by using a variety of energy sources. The composition can be immersed in a heated bath containing a suitable inert liquid (e.g., water or a fluorochemical fluid) that will not dissolve or swell the composition in either its cool or warm states. The composition can also be softened using heat sources such as a melting pot, hot air gun, hot plate, conventional oven, infrared heater, or microwave oven. The composition can be encased in a plastic pouch, syringe or other container which is in turn heated or is subjected to one or more of the above-mentioned heating methods.

Transforming the blocking composition from a warm state to a cool state requires loss of thermal energy and can be carried out using a variety of cooling techniques. Cooling can take place under ambient conditions in the presence of air only. Cooling can also be expedited using forced air, cold water, ice, or heat sinks such as chilled "cold pack." In one presently preferred method, the blocking composition is cooled using "cooling" or "chill" rings. The rings are shaped to surround the block and circulate a cool liquid, such as chilled water, thus dissipating heat from the blocking composition.

In one embodiment of the present invention, a composition, preferably comprising a "heat absorbing material," is preformed into a "stock" lens block (e.g., by injection molding techniques). The generally concave surface of the stock lens block is then heated, for example, using an infrared (IR) heat source, to melt the surface of the preformed block to a depth sufficient to allow the preformed block to conform to the surface of the lens blank. A lens blank is then positioned against the softened surface of the block and the heated surface is allowed to cool. Alternatively, the composition containing the heat absorbing material may be provided in a powdered, pelleted or sheet form and placed in the cavity of a block. The composition may then be heated as described above.

This method has the advantage that less material needs to be heated. Consequently, the procedure is very fast (sufficient surface heating can occur in less than about 10–15 seconds). In addition, the material is not stored in its warm state for a prolonged period (such as would occur in a melting pot). Thus, compositions having less long-term stability in the warm state may be employed.

Suitable "heat absorbing materials" include carbon black, and other inorganic pigments and fillers. The heat absorbing materials are preferably present in an amount sufficient to speed the heating of the blocking composition. Preferred compositions contain up to about 70% by weight of a heat absorbing material. More preferred compositions contain between about 1 and 20% by weight of a heat absorbing material, most preferred compositions contain between about 5 and 15% by weight of a heat absorbing material. The amount of the heat absorbing material may be empirically selected to adjust the depth of the softening layer for a given intensity IR source and a given exposure time.

If desired, a preformed stock lens block base can be fitted with a layer of a blocking composition of the present invention. Preferably, the layer comprises a heat absorbing material as described above. Desirably, the layer of blocking composition is thick enough to allow the heated layer to "conform" to the surface of the lens blank.

The blocking composition of the present invention is preferably utilized in conjunction with a suitable lens blank coating or tape. Preferred tapes for use with the blocking composition have a pressure-sensitive adhesive surface and a tack-free adhesion promoting surface. The tapes assist in the firm bonding of the lens blank to the lens block (i.e., the pressure sensitive adhesive on the tape firmly bonds to the lens blank and the thermoplastic lens blocking composition firmly adheres to the tack-free backside of the tape when applied thereto in the warm state and cooled). In addition, preferred tapes are conformable, that is, they follow the curvature of the lens blanks without any wrinkles or air bubbles; and translucent, that is, they permit light to pass therethrough. As a result, the lens may be visually aligned in the appropriate device prior to blocking. Still further, when preferred tapes of the present invention are removed from the lens they leave virtually no adhesive residue. Thus, messy and time consuming cleaning operations need not be performed on the lens before it can be used.

Despite this clean removability, suitable tapes of the present invention exhibit excellent adhesion to both the lens blank and the thermoplastic blocking composition. Additionally, the tapes of the invention are able to withstand the shear forces encountered during the surfacing and edging operations. As a result, lenses are held in accurate position throughout these operations. An added benefit offered by the tape of the present invention is the protection provided to the lenses from thermal and mechanical shock.

The composition of the exposed surface of the tape (i.e., the non-adhesive surface away from the lens blank) should be selected so as to achieve the desired degree of adhesion with the particular thermoplastic blocking composition. The blocking compositions described herein generally comprise varying amounts of polar constituents or groups. While not intending to be bound by theory, it is presently believed that the polar constituents or groups present in certain blocking compositions of the present invention may interact with the polar groups present in certain tape backings and thus contribute to the adhesion between the tape surface and the thermoplastic composition (e.g., through a hydrogen bonding mechanism). According to this theory, the amount of available polar constituents or groups in both the blocking composition and at the surface of the tape would impact the total amount of adhesion between the composition and the tape.

For example, it has been discovered that blocking compositions comprising polycaprolactone polymers exhibit extremely high adhesion to certain commercial lens protection tapes that have a backing surface layer made from a polyurethane polymer (a very polar backing). The level of adhesion is often too high and causes difficulties when the user attempts to deblock the lens and block. In contrast, this same thermoplastic blocking composition adheres poorly to non-polar polymers such as polyethylene. The poor adhesion is undesirable as the lens and block may become detached during lens processing.

Surprisingly, a tape backing comprising a blend of a polar polymer and a "diluting" polymer (e.g., a "non-polar" polymer) provides an ideal surface against which such a polycaprolactone blocking composition may be adhered. The two component backing may be produced, for example, from these two different and often incompatible types of materials by coextrusion processing techniques. Alternatively, one may construct the backing from a suitable copolymer material that comprises both polar and non-polar or diluting constituents or groups.

A wide variety of polymers may be employed as the "polar" polymer. Preferred polymers comprising polar constituents or groups include polyurethane polymers and polycaprolactone polymers. Particularly preferred polyurethane polymers include "ESTANE" polyether type polyurethanes from the B.F. Goodrich Co., Cleveland, Ohio. Suitable ESTANE polyether type polyurethanes include grades 58370, 58866, 58202, 58300, 58891, 58630, 58309, 58311, 58315, 58863, 58887, and 58810. Polyester type polyurethanes may also be suitable. Examples of polyester type polyurethanes include ESTANE grades 58360, 58206, 58271, 58092, 58134, 58130, 58277, 58133, and 58137. Other suitable polyurethane polymers or polar group containing polymers may be used if desired. For example, PELLETHANE, a polytetramethylene glycol ether thermoplastic polyurethane elastomer, from Dow Chemical Co. Suitable polycaprolactone polymers for use as the "polar" polymer of the tape include the high molecular polycaprolactone polymers previously described as being preferred or suitable for the blocking composition. A particularly preferred polycaprolactone polymer for this use is CAPA 650.

A wide variety of polymers may be employed as the "diluting" polymer. Preferred diluting polymers comprise non-polar constituents or groups and include, e.g., polyethylene polymers and copolymers. Also preferred are low density polyethylene polymers such as "AFFINITY" VLDPE and "ASPUN" LLDPE (an ethylene-octene copolymer) both from Dow Chemical Co., Midland, Mich. Suitable AFFINITY polymers include grade PL 1845. Suitable ASPUN resins include grades 6804, 6806, 6814, and 6809. Suitable diluting polymers include ENGAGE 8200 polyolefin elastomer from Dow Chemical Co. Particularly preferred "diluting" polymers include "BYNEL" resins available from E.I. Du Pont de Nemours and Company, Wilmington, Del. including: anhydride modified ethylene acrylate copolymers such as grades E369 and E374 (now commercially available as "Bynel 2174"); a maleic anhydride modified linear low density polyethylene (available as "Bynel 4109"); and a maleic anhydride modified low density polyethylene (available as "Bynel 4206").

The tape backing preferably comprises less than about 60% polar component, and more preferably between 20 and 60% (e.g., a preferred blend of polyurethane polymer with a non-polar polymer such as VLDPE comprises less than about 60% polyurethane component, more preferably between 20 and 60% polyurethane). As previously mentioned, the tape backing, comprising both polar and non-polar constituents or groups may be processed by coextrusion methods as herein described.

The tapes of the present invention may also include additional "core" layers of materials (including layers of materials that do not comprise an olefin moiety and an acid moiety) between the adhesion promoting surface layer and the pressure sensitive adhesive layer. Examples of useful materials for the optional core layers include: polyolefins, ethylene vinyl acetate copolymers; ethylene methylacrylate copolymers; ethylene ethylacrylate copolymers; ethylene acrylic acid copolymers; vinyl polymers (e.g., polyvinyl chloride); urethane polymers (e.g., polyester urethanes and polyether urethanes); polyester films (e.g., poly(ethylene terephthalate)); ionomer polymers; maleic anhydride/acrylic acid graft copolymers with ethylene vinyl acetate copolymer, ethyl acrylate, polyethylene, or polypropylene such as "BYNEL" resins from E.I. Du Pont de Nemours and Company; and polyamide films (e.g., nylon). The core layer should be selected so as to provide a tape with the desired conformability. In addition, the core layer should optimally provide a surface that retains the adhesive layer, i.e., inhibits adhesive transfer to the lens blank. Additional layers, such as "anchoring" layers or "tie" layers, may be used if desired, e.g., to join the backing to the adhesive layer.

The total thickness of the polymer backing (including any core or skin layers or coating applied thereto, but not including the adhesive layer of the tape) is preferably between about 0.01 and 0.25 mm, more preferably between about 0.03 and 0.15 mm, most preferably between 0.04 and 0.1 mm.

A wide variety of adhesives may be used when forming the tapes of the present invention. Most preferably, the adhesive is a pressure sensitive adhesive. Suitable pressure-sensitive adhesives exhibit high bond strength to the ophthalmic lens (e.g., plastic and glass). They also exhibit high cohesive strength and high bond strength to the backing layer. Preferably, they leave virtually no adhesive residue when removed from the lens.

The amount of adhesive present on the backing layer should be sufficient to hold the tape on the lens during the surfacing and generating process. It has been found preferable that the amount of adhesive present be in the range of about 7 g/m$^2$ to 160 g/m$^2$. More preferably, the amount of adhesive present is in the range of about 15 g/m$^2$ to 100 g/m$^2$; most preferably, the amount of adhesive present is in the range of about 15 g/m$^2$ to 80 g/m$^2$; and optimally, it is in the range of about 19 g/m$^2$ to 80 g/m$^2$.

A variety of pressure-sensitive adhesives are useful. They include polyacrylate adhesives, natural rubber adhesives, thermoplastic rubber adhesives, and blend thereof. Preferably the adhesive is a polyacrylate adhesive.

In one presently preferred embodiment, a layer of pressure sensitive adhesive is coextruded with the backing to form the tape. Suitable "coextrudable" or "melt-processable" pressure sensitive adhesives include those adhesives disclosed in U.S. Pat. Nos. 4,737,559 and 4,847,137, and in U.S. patent application Ser. No. 08/390,780, which are herein incorporated by reference.

Examples of suitable melt-processable adhesives include crosslinked pressure-sensitive adhesives comprising a crosslinked copolymer comprised of A monomers, PX monomers, and optional B monomers wherein:

A is a monomeric acrylate or methacrylate ester of a non-tertiary alcohol or a mixture of non-tertiary alcohols, said alcohols having from 1 to 14 carbon atoms with the average number of carbon atoms being about 4–12;

PX is a copolymerizable mono-ethylenically unsaturated aromatic ketone monomer free of ortho-aromatic hydroxyl groups; the copolymer being crosslinked by means of said PX monomer and the degree of crosslinking and the degree of polymerization of the copolymer being such that the crosslinked pressure-sensitive adhesive composition preferably has a creep compliance value (hereinafter J-value) of at least about $1.2 \times 10^{-5}$ cm$^2$/dyne; and B is an ethylenically unsaturated compound copolymerizable with the A and/or PX monomers.

Use of the PX monomer to crosslink the copolymer allows for control of the creep compliance of the adhesive. Copolymerizing the PX monomer into the backbone of the pressure-sensitive adhesive copolymer also allows for crosslinking of the copolymer with ultra-violet or actinic radiation after formation of the copolymer. Further, copolymerizing the PX monomer into the polymer backbone before the crosslinking thereof greatly increases the efficiency of the crosslinking obtainable by inclusion of the PX monomer in the adhesive as compared with addition of an aromatic ketone compound which is not initially copolymerized into the copolymer. Because of the increased efficiency, only small amounts of PX monomer are needed to achieve useful degrees of crosslinking.

The number and composition of A, PX and B monomers and the degree of polymerization of the copolymer are preferably adjusted to obtain the desired physical properties of the adhesive (e.g., the desired degree of creep compliance). For a polymer having a given A and B composition, an increase in the amount of PX monomer will generally result in an increase in the degree of photocrosslinking and decrease the level of creep compliance of the copolymer. Likewise, an increase in the degree of polymerization of the copolymer will decrease the level of creep compliance of the adhesive. Accordingly, as the amount of PX monomer is increased and, as a result, the degree of photocrosslinking is increased, the degree of polymerization of the copolymer adhesive should be decreased to obtain a comparable level of creep compliance. Conversely, if the amount of PX monomer is decreased, and, as a result, the degree of photocrosslinking is decreased, the degree of polymerization of the uncrosslinked copolymer adhesive should be increased to obtain a comparable level of creep compliance when crosslinked. For example, a preferred composition of the copolymer adhesive is 94 parts isooctyl acrylate, 0.04 parts para-acryloxy benzophenone and 6 parts acrylic acid. For this particular composition, the inherent viscosity, which is a measure of the degree of polymerization of the resulting copolymer before crosslinking should be from about 1 to about 1.7 dl/g.

To obtain the desired physical properties, the weight of PX monomer is generally within the range of about 0.01% to about 2%, preferably about 0.025% to about 0.5% of the total weight of all monomers in the copolymer.

In general, the inherent viscosity of the uncrosslinked copolymer should range from about 0.5 to about 2.0 dl/g, more preferably from about 0.8 to about 1.6 to obtain the desired degree of polymerization of the copolymer. The test procedure followed and the apparatus that can be used to measure inherent viscosity are described in detail in "Textbook of Polymer Science", F. W. Billmeyer, Wiley-Interscience, Second Edition, 1971, pages 84 and 85.

Monomer A is a monomer which contributes to the visco-elastic properties of the copolymer. Monomer A preferably is a monomeric acrylic or methacrylic acid ester of a non-tertiary alcohol or a mixture of non-tertiary alcohols, said alcohols having from 1 to 14 carbon atoms with the average number of carbon atoms being about 4 to 12. Examples of such monomers include the esters of acrylic acid or methacrylic acid with non-tertiary alkyl alcohols such as 1-butanol, 1-pentanol, 2-pentanol. 3-pentanol, 2-methyl-1-butanol, 1-methyl-1-butanol, 1-methyl-1-pentanol, 2-methyl-1-pentanol, 3-methyl-1-pentanol, 2-ethyl-1-butanol, 2-ethyl-1-hexanol, 3,5,5-trimethyl-1-hexanol, 3-heptanol, 2-octanol, 1-decanol, 1-dodecanol, and the like. Such monomeric acrylic or methacrylic esters are known in the art and many are commercially available.

The PX monomer is a copolymerizable monoethylenically unsaturated aromatic ketone compound preferably free of ortho-aromatic hydroxyl groups, wherein only the ethylenically unsaturated group is copolymerizable with the A monomers and optional B monomers under the polymerization conditions selected to form the copolymer.

Aromatic ketones free of ortho-aromatic hydroxyl groups absorb ultraviolet radiation to form a triplet excited state through intersystem crossing. These excited state molecules can abstract hydrogen radicals from the polymer. The free radical sites thus generated on the polymer can combine to form crosslinks. The semi-pinacol radical which results from the combination of the photocrosslinker (PX) and the hydrogen radical can also lead to crosslinking since the photocrosslinker is copolymerized. The presence of a hydroxyl group as ring substituent in a position ortho to the carbonyl on the aromatic ring will inhibit the crosslinking ability of the aromatic ketone monomer. Accordingly, the aromatic-ketone monomer is preferably free of ortho-aromatic hydroxyl groups.

Preferred PX monomers are represented by the general formula:

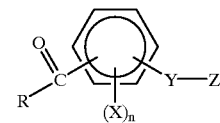

wherein

R is lower alkyl or phenyl, provided that R may be substituted with one or more halogen atoms, alkoxy groups, or hydroxyl groups, and further provided that when R is phenyl substituted with one or more hydroxyl groups, any such hydroxyl groups must be meta or para to the aromatic carbonyl;

X is halogen, alkoxy, or hydroxyl, provided that when an X is a hydroxyl groups, X must be meta or para to the aromatic carbonyl;

n is an integer from 0 to 4;

Y is a divalent linking group, preferably selected from the group consisting of a covalent bond, an oxygen atom (—O—), an amino groups (—NR'— wherein R is hydrogen or lower alkyl), an oxyalkyleneoxy group (—O—R"—O— wherein R" is an alkylene group), a carbamoylalkyleneoxy group (—O—R"—O—C(O)—N—(R')—R'"— wherein R'" is a covalent bond or an alkyleneoxy group such as —R"—O— wherein R" is an alkylene group); and Z is alkenyl or ethylenically unsaturated acyl.

Particularly preferred PX monomers are the acryloxybenzophenones, e.g., para-acryloxybenzophenone.

The optional B monomer is an ethylenically unsaturated compound copolymerizable with the monomeric acrylic acid ester and is employed to modify the physical properties of the copolymer. In general, the addition of the B monomer will reduce the flexibility of the copolymer. Preferred B monomers are acrylic acid, methacrylic acid, itaconic acid, acrylamide, methacrylamide, acrylonitrile, methacrylonitrile, vinyl acetate, and N-vinylpyrrolidone. The B monomer may be included at levels up to 25% of the total weight of all monomers. The preferred adhesive according to the present invention will contain from about 1% to about 15% by weight of B monomer of the total weight of all monomers. In a preferred adhesive, the amount of acrylic acid or acrylamide will range from about 1% to about 7% by weight of total monomer. In adhesives containing N-vinylpyrrolidone as the B monomer, the preferred copolymer will contain from about 5% to about 15% of N-vinylpyrrolidone by weight.

The A monomer, PX monomer, and optional B monomer may be dissolved in a suitable inert organic solvent and polymerized by standard free radical polymerization utilizing a suitable free radical initiator such as those described U.S. Pat. No. RE 24,906 (Ulrich). Suitable initiators which may be utilized include azo compounds such as 2,2'-azobis(isobutyronitrile), hydroperoxides such as tert-butyl hydroperoxide, peroxides such as benzoyl peroxide or cyclohexanone peroxide. Generally, from about 0.01% to about 1% by weight of thermally activatable initiator based upon the total polymerizable composition is used, preferably 0.01% to 0.5%.

The organic solvent utilized in the free radical polymerization may be any organic liquid which is a solvent for the reactants and product, that is inert to the reactants and product, and will not otherwise adversely affect the reaction. Suitable solvents include ethyl acetate and mixtures such as ethyl acetate with toluene, heptane and toluene and isopropyl alcohol and heptane with toluene and methyl alcohol. Other solvent systems are useful. The amount of solvent is generally about 30–80% by weight based on the total weight of the reactants and solvent. Copolymerization may be carried out by other well known techniques such as suspension, emulsion or bulk polymerization.

The uncrosslinked copolymer is easily coated or coextruded upon suitable backings. After the adhesive has been coated or coextruded, it may be subjected to ultraviolet radiation of sufficient intensity for a time sufficient to crosslink the copolymer to the desired degree by means of the aromatic ketone groups of the PX monomer. The degree of crosslinking by means of the PX monomer is controlled by the amount of PX monomer in the copolymer and the intensity of the crosslinking radiation to which the uncrosslinked copolymer is exposed during the method of preparing an adhesive of this invention.

To measure the creep compliance of this adhesive, a 150-micrometer thickness of the adhesive is knife-coated onto a smooth film of polytetrafluoroethylene. The coated film is then dried to constant weight by placing it in an air-circulating oven generally for at least five minutes at 110° C. The adhesive, thus dried, is stripped from the polytetrafluoroethylene and two test pieces of equal area are die-cut and placed in a parallel plate creep compliance rheometer, one piece being on each side of the center plate, with an outer plate contacting the exposed surface of each. Screws which connect the two outer plates are then tightened so as to compress the interposed layers of adhesive approximately 10%. The parallel plates are placed in horizontal arrangement and one end of the center plate is connected to a chart recorder. A hook is attached to the opposite end of the center plate with a flexible wire extending horizontally from the hook and then downward over a pulley, the outer plates being held in a fixed position. A suitable weight (one sufficient to measurably deform the sample a distance no greater than its thickness) is attached to the free end of the wire, then the strip chart recorder is started. The weight typically used to exert the stress on the adhesive films is 500 grams. From the strip chart recorder, the time and the displacement (strain) are read and the applied force (stress) is recorded. The creep compliance at a given temperature is then calculated using the equation:

$$J_{(t)} = 2AX/hf$$

where t is the time at which the measurement is taken, A is the area of one face of the adhesive samples, h is the thickness of the adhesive mass, X is the displacement at time t (where X is less than h) and f is the force due to the mass attached to the wire connected to the middle plate. Where A is expressed in $cm^2$, h in cm, X in cm, and f in dynes, the compliance value J(t) is given in $cm^2/dyne$.

It has been found that the adhesive films of this embodiment of the invention have the required degree of compliance and the short term creep to function as an exceptionally fine pressure sensitive adhesive when the J value measured at ambient conditions at the end of a 3 minute period of subjection to stress is at least about $1.2 \times 10^{-5}$ $cm^2/dyne$ to about $2.3 \times 10^{-5}$ $cm^2/dyne$, preferably about $1.3 \times 10^{-5}$ $cm^2/dyne$ to about $2.0 \times 10^{-5}$ $cm^2/dyne$.

In a second embodiment, the adhesive comprises a co-extrudable adhesive such as are disclosed in U.S. Pat. Nos. 4,833,179 and 4,952,650, which are herein incorporated by reference. These suitable coextrudable adhesives may be made by the suspension polymerization of a pressure-sensitive acrylate copolymer bead having a glass transition temperature of 0° C. or less. This method comprises the steps of:

(a) making a monomer premix comprising
  (i) an acrylic acid ester of a non-tertiary alcohol, said alcohol having from 1 to 14 carbon atoms, with the average number of carbon atoms being about 4 to about 12,
  (ii) a polar monomer copolymerizable with said acrylic acid ester,
  (iii) a chain transfer agent,
  (iv) a free-radical initiator, and
  (v) a modifier moiety;
(b) combining the premix with a water phase containing a suspending agent to form a suspension;
(c) concurrently agitating the suspension and permitting polymerization of said monomer premix until polymer beads are formed; and
(d) collecting the polymer beads, whereby the amount of the modifier moiety is sufficient to render wet copolymer beads non-agglomerating at room temperature to be safely handleable and transportable. The modified moiety is preferably selected from the group consisting of polystyryl macromers, reactive zinc salts and hydrophobic silica. Certain zinc salts and the hydrophobic silica may be added after polymerization has begun, if desired.

Suitable alkyl acrylate monomers useful in this embodiment of the present invention include monofunctional acrylate ester monomers. Included within this class of monomers are, for example, isooctyl acrylate, isononyl acrylate, 2-ethyl-hexyl acrylate, decyl acrylate, dodecyl acrylate, n-butyl acrylate and hexyl acrylate. Preferred monomers include isooctyl acrylate, isononyl acrylate, and butyl acrylate. Acrylate monomers preferably comprise at least about 80 parts based on 100 parts total monomer content, preferably from about 85 parts to about 95 parts.

Polar monomers useful in this embodiment of the invention include both moderately polar and strongly polar monomers. Strongly polar monomers useful herein include acrylic acid, methacrylic acid, itaconic acid, hydroxyalkyl acrylates, styrene sulfonic acid or the sodium salt thereof, maleic acid, fumaric acid, citraconic acid, acrylamides, and substituted acrylamides. Moderately polar monomers useful herein include N-vinyl lactams such as N-vinyl pyrrolidone, N-vinyl caprolactam, acrylonitrile, dimethyl amino-propyl methacrylate, and vinyl chloride. Preferred polar monomers include acrylic acid, methacrylic acid, acrylamides and substituted acrylamides. Polar monomers preferably comprise up to about 20 parts based on the total monomer content.

Modifier moieties useful in the method of the present invention include polystyryl methacrylate macromolecular monomers (macromers), zinc oxide or reactive zinc salts, and hydrophobic silica. Preferred moieties include the reactive zinc salts, and the macromers. A variety of useful macromers and methods for their preparation are disclosed in U.S. Pat. No. 3,786,116, which is herein incorporated by reference. A particularly useful 1-polystyrylethyl methacrylate macromonomer is commercially available under the name Chemlink 4500™. This macromer is a high glass transition temperature (Tg) polymeric material, having a Tg of about 90° C. or higher, and a molecular weight of from about 5,000 to about 25,000. The modifier moiety is suitably present in an amount ranging from about 0.05 to about 10 parts based on 100 parts total monomer content. The preferred level of modifier moiety varies with the selection of the moiety, i.e., a preferred level of macromer ranges from 0.5 to about 10 parts based on 100 parts monomer content. The macromer is added to the monomer premix. The reactive zinc salts and/or hydrophobic silica may be added to the monomer premix, alternatively, they may be added to the suspension during polymerization.

The copolymer beads of this embodiment are prepared by an aqueous suspension polymerization technique utilizing conventional suspension agents with optional anionic surfactants. The amount of surfactant is preferably from about 2.5 ppm to about 1.0 part based on 100 parts total monomer content. Preferred surfactants include sodium lauryl sulfate and sodium dioctyl sulfosuccinate. Non-ionic surfactants may also be included so long as an anionic surfactant is present and predominates.

Suspending agents are those conventionally used in suspension polymerization processes. They may be minimally water-soluble inorganic salts such as tribasic calcium phosphate, calcium carbonate, calcium sulfate, barium sulfate, barium phosphate, hydrophilic silicas, and magnesium carbonate. Preferred inorganic suspending agents include barium sulfate, hydrophilic silicas, and tribasic calcium phosphate. Water-soluble organic suspending agents may also be used, e.g., polyvinyl alcohol, poly-N-vinyl pyrrolidone, polyacrylic acid, polyacrylamide and hydroxyalkyl cellulose. The suspending agent is present in amounts ranging from about 0.01 part to about 5 parts based on 100 parts total monomer content.

Initiators for polymerizing the monomers to provide the copolymer beads of the invention are those which are normally suitable for free-radical polymerization of acrylate monomers and which are oil-soluble and have low solubility in water, e.g., organic peroxides such as benzoyl peroxide, lauryl peroxide and various thermal initiators. Preferred thermal initiators include 2,2'-azobisbutryronitrile, commercially available from E. I. duPont de Nemours under the trade name VAZO 64. The initiator is present in an amount from about 0.05 to about 1 part based on 100 parts total monomer content.

Useful chain transfer agents include mercaptans, alcohols, and carbon tetrabromide. Isooctyl thioglycolate and carbon tetrabromide are preferred. The chain transfer agent is present in any amount of from about 0.01 to about 0.5 part based on 100 parts total monomer content.

Photocrosslinking agents may also be used in methods of the invention. Preferred crosslinking agents include copolymerizable aromatic ketone monomers, especially acryloxybenzophenone. When present, the photocrosslinker generally comprises from about 0.01 to about 5.0 parts based on 100 parts total monomer weight.

The monomers, modifier moiety, chain transfer agent, free-radical initiator, and any optional materials are mixed together in the prescribed ratio to form a monomer premix. They are then combined with a water phase comprising a suspending agent, any optional surfactant and water, and are polymerized with agitation for from about 2 to about 16 hours at a temperature of from about 40° C. to about 90° C. to give a suspension which contains the copolymer beads. The beads are then washed and separated from the water by means such as gravity filtration. The filtered product also generally comprises about 15–30% water.

In yet a further embodiment, the adhesive layer alternatively may be coated onto the backing (e.g., using a conventional coating process) or transferred onto the backing (e.g., in the form of a transfer adhesive or a double-sided adhesive tape). Suitable transfer adhesives include 3M Transfer Adhesive No. 1524 from 3M, St. Paul, Minn. or the like.

Suitable coatable pressure sensitive adhesives include adhesives that comprise a polymer of an acrylate ester of acrylic acid with a non-tertiary alcohol. These adhesives also preferably contain a minor amount of a copolymerized acid or amide. These adhesives and methods of their preparation are described in U.S. Pat. No. RE 24,906 which is herein incorporated by reference. An example of a useful pressure-sensitive adhesive of this type comprises a polymer of 90 parts by weight isooctyl acrylate and 10 parts by weight acrylic acid available as Y 9460 from 3M Company.

Also useful are natural rubber adhesives comprising natural rubber and, preferably, a tackifying resin. One such adhesive comprises natural pale crepe rubber (100 parts by weight), polyterpene resin (75 parts by weight), and antioxidant (1 part by weight). Other useful natural rubber adhesives are also useful and will be apparent to those skilled in the art.

In addition, thermoplastic rubbery adhesives comprising a rubbery block copolymer and, preferably, at least one resin compatible with the block copolymer are useful. The rubbery copolymers have the general configuration A-B-A wherein the A units represent a thermoplastic polymer block with a Tg above 20° C. and the B units represent an elastomeric polymer block formed from a conjugated diene. The A units are relatively incompatible with the B units and have an average molecular weight of from about 5,000 to 125,000. Preferably the A units are styrene and the B units are polybutadiene or polyisoprene or poly(ethylene/butylene). An example of block copolymer of this type is Shell Chemical Company Kraton D1101. Other block copolymers of this type may also be used. Resins compatible with the block copolymer are known and include, for example, hydrocarbon resins, coumarone-indene resins, dimerized rosins, metal resinates, hydrogenated rosins, polyterpene resins and heat treated wood rosins.

The polymer backing of the present invention may contain a variety of additional ingredients. Thus, they may be modified by the incorporation of agents that increase flexibility and/or clarity (e.g., nucleating agents), fillers, antiblocking agents, and the like. Fillers and antiblocking agents are useful in reducing blocking to other surfaces. Materials useful as fillers and antiblocking agents are well known in the art. If desired, low adhesion backsizes (LAB) may be used as an antiblocking agent. However, the selection of the LAB should be made so as to not interfere with the desired level of adhesion between the tape backing and the blocking composition. Presently preferred tapes do not contain a LAB.

Other layers and ingredients may be employed in the tapes of the present invention. For example, an anchoring layer may be employed between the backing layer and the pressure-sensitive adhesive in order to improve the bond therebetween. The anchoring layer can be selected from a variety of materials commonly employed for improving bonds between substrates.

It has been found that colorants (e.g., dyes and pigments) are useful in the tapes of the present invention to enhance the visibility of the tapes once they have been applied to the ophthalmic lens blanks. Preferably they do not render the tapes opaque. Typically, they are included in the backing layer. They may also be included within the pressure-sensitive adhesive. Typically they comprise up to about 10% by weight of whatever layer they are in. The colorants are preferably pigments. A particularly useful pigment and concentration is copper phthalocyanine present in an amount in the range of 2 to 7 parts by weight.

The tapes of the present invention may be readily prepared from known processing techniques. Thus, for example, the pressure-sensitive adhesive may be applied by solution coating the appropriate adhesive onto the backing layer followed by removal of the solvent therefrom. Alternatively, the adhesive may be applied by first solution coating it onto a liner followed by removal of the solvent therefrom. The dried adhesive may then be nip laminated to the backing layer.

Alternatively, and presently preferably, the tape of the present invention may be prepared by coextruding an adhesive material and a separate polymeric backing material or blend of backing materials. For example, the multilayered, coextruded tape may be made using multi-layered coextrusion feedblocks such as those fabricated by The Cloeron Co., Orange, Tex. In one embodiment, a layer of backing material is coextruded with a layer of adhesive to form a two-layer tape. The backing material and adhesive are individually melted and fed using a screw extruder into a coextrusion feedblock where the melt streams were combined. In another embodiment, a core layer and a skin layer or skin layers are coextruded with an adhesive layer using a multilayered coextrusion feedblock.

The method in which the polymer blend is prepared is not particularly critical within the preferred range of proportions and with the inclusion of the preferred ingredients. Any conventional mixing device which provides substantial homogeneity can be employed. Another possible method is to prepare the blend in a twin-screw mixing extruder at the desired proportions. It is also possible to prepare a polymer "master-batch" concentrate and then add the appropriate quantity of either virgin resin to obtain the desired proportions. It is also appropriate to incorporate other polymer additives, e.g., plasticizers, colorants, fillers, processing aids, antiblocks, stabilizers, etc. in the concentrate to enhance their dispersibility in the final blend.

Films of the blends of this invention are readily prepared by intimately admixing the polymers; and extruding the resulting mixture in the form of a clear, flexible sheet or film which is subsequently cooled in a draw-down procedure to form a backing film having an average thickness in the range of about 0.01 mm to about 0.25 mm or more, more preferably in the range of about 0.03 mm to about 0.15 mm, and most preferably in the range of about 0.04 mm to about 0.10 mm. The thin sheet is extruded and drawn onto a chill roll.

Mixing of the required components is readily carried out in a conventional mixing apparatus such as a Banbury mixer or screw-type extruder. In one embodiment wherein the mixing device is a screw-type extruder, the materials are fed into the barrel of the extruder. The extruded mixture may be mixed with additional polymer(s) prior to final extrusion or may be fed directly into an extruder equipped with a sheet die, annular die, or coextrusion die and extruded in the form of a transparent sheet onto a chill roll and drawn down to form a film having the desired thickness. Suitable extrusion apparatus include a typical screw-type extruder, an extruder equipped with a ramming device and the like.

In a preferred embodiment the mixing and extruding steps are carried out in a single apparatus which is a typical screw-type extruder that is equipped with a sheet die or annular die and feed means placed along the extruder barrel which houses the screw or screws of the extruder. The blend materials are introduced as the polymer is being extruded at a rate such that a constant mixture is maintained. Similarly, concentrated master-batches can be added to virgin material in the screw-type extruder.

The tapes of the present invention are easily applied to ophthalmic lens blanks. Generally, the pressure-sensitive adhesive portion of the tapes of the present invention are applied to the front, or finished, surface of a lens blank. This may be done either by hand or, preferably, by means of a mechanical device. In either event, the tape of the present invention conforms readily to the configuration of the lens blank without wrinkles, folds, air bubbles, or other discontinuities between the adhesive and the front surface of the lens. Preferably, the tape of the invention is applied so that it covers the entire front surface or back surface of the lens. Normally it is applied to the front surface.

The tapes of the invention may be used on both plastic and glass lens blanks which may vary in curvature from plano to 10-base curve or higher. It is, of course, understood that the particular tape employed may be selected to suit the particular lens to be altered. Preferably, more conformable tapes are employed with lens blanks having a higher base curvature.

After application, excess tape is trimmed away from the periphery of the lens blank. The lens blank is then blocked. After the blocking composition has solidified and cooled, the blocked lens is removed from the blocking machine and is ready for mounting in the surfacing and/or edging machines. When these operations have been completed, the finished lens is deblocked, for example, by means of a sharp tap. This may be easily accomplished, for example, with the aid of a hollow cylinder that is adapted to support the finished lens on its wall while receiving the still attached lens blank within its hollow portion. By holding the lens and cylinder together and striking the bottom of the cylinder upon a hard surface, the bond between the blocking composition and the tape may be broken. The lenses may also be deblocked, for example, by melting the blocking composition in hot water. In either event, the tape is then removed from the lens and discarded. The lens and block may then, if necessary, be cleaned.

The blocking composition of the present invention is preferably utilized in conjunction with a suitable preformed base block. Preferred base blocks are designed so that the blocking composition and base block form a unitary structure (i.e, an "ophthalmic lens block") that securely holds the lens during processing. More preferably, the base block and composition are easily separated after use so that the base block and/or the composition may be reused or recycled.

A presently preferred base block contains a rear portion that is sized and adapted to fit the chuck of a desired lens processing machine and a front portion that is adapted to retain a blocking composition. The exact size and shape of the rear portion of the preformed base block may assume a variety of configurations. The preferred preformed base block also has a "negatively" tapered peripheral edge and a curved front surface. The tapered peripheral edge is preferably angled so as to provide a mechanical "overcut" and retain the thermoplastic blocking composition against the preformed base block. This avoids the need for adhesive intermediate the thermoplastic blocking composition and the preformed base block. The blocking composition may be very easily and cleanly separated from the preformed base block by simply holding the preformed base and "peeling" the blocking composition off the base. Upon separation, very little if any blocking composition remains stuck to the preformed base. There is also no need to "dig" out blocking composition from cavities formed by "positively" tapered "undercuts". If desired, the cleanly separated preformed base block may then be reused, and the blocking composition recycled (i.e., reheated) and used again.

Figure 9E:
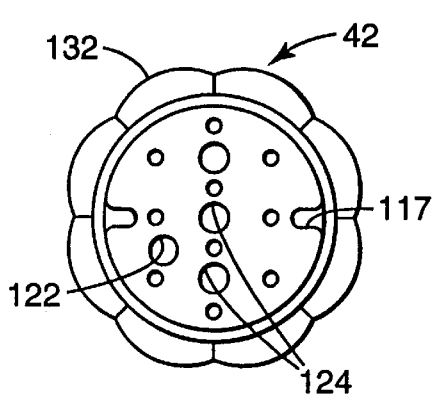
FIGS. 9e to 9g are side and end views of an alternative preformed base block having a scalloped outer edge.
Figure 10E:
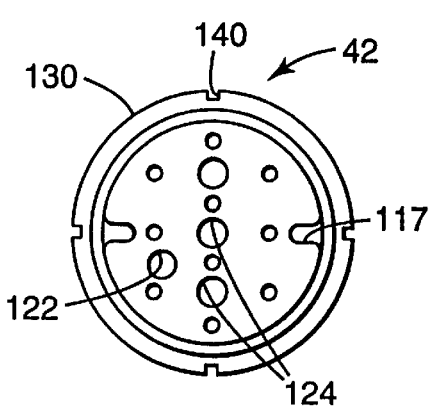
FIGS. 10e to 10g are side and end views of a further alternative preformed base block having a keyed outer edge.

To prevent undesired rotation of the thermoplastic blocking composition relative to the preformed base block the preformed base block preferably also comprises a means to resist such rotation. This may be accomplished using an adhesive or a mechanical means. Suitable mechanical means include, for example, runners (e.g., off-centered fill holes) that extends at least partially through the preformed base block. Blocking composition that solidifies in the runner will help prevent such rotation. Alternatively, for example, the preformed base block may optionally comprise a non-circular periphery, such as a scalloped outer edge as shown in FIG. 9e or a key or plurality of keys as shown in FIG. 10e. Other mechanical means to resist rotation may be employed, if desired. In a presently preferred embodiment at least a portion of the front surface of the preformed base block is provided with a textured surface pattern. More preferably the entire front surface of the preformed base block is provided with the textured surface pattern. It is believed that a textured surface provides a mechanical lock between the base block and the solidified blocking composition that helps spread the torsional forces across the entire interface between the base block and the blocking composition. In this manner no one region of the blocking composition is relied upon to resist all the torsional forces.

Suitable texture patterns include any pattern that provides sufficient interfacial mechanical "locking" with the solidified blocking composition such that the blocking composition can resist undesirable rotation during use.

The depth and pattern of the texture may be varied depending, for example, on the amount of torsion forces the part encounters, the viscosity and/or surface energy of the molten blocking composition, etc. In addition, the texture pattern is preferably provided with a suitable "draft angle." The draft angle, if any, should be sufficient so the preformed base block can be conveniently injection molded, if desired, yet be released from the tooling. Also, the draft angle should be sufficient so that the blocking composition can be conveniently separated from the base block, if desired. Suitable draft angles for these purposes are greater than about 4°. Preferred draft angles are greater than about 9°. The depth of the texture pattern can also be varied. Suitable depths of pattern are greater than about 0.15 mm, more preferably greater than about 0.25 mm, and most preferably greater than about 0.35 mm. Suitable texture patterns include, for example, pattern DT 3050 (available from Diversified Texturing & Engraving, Inc., Fridley Minn.). Other suitable patterns are depicted in FIGS. 11g and 12g. If desired, the surface of the preformed base block may be further roughed, for example by sand blasting techniques. The addition roughness provided by such techniques may further enhance resistance to undesirable rotation.

DETAILED DESCRIPTION OF THE DRAWINGS

Shown in FIG. 1 is an ophthalmic lens blank 10 and a conventional lens base block 20. A tape 12 or other lens coating is shown applied to the semi-finished surface of the lens and provides additional protection to keep the lens from being scratched or otherwise damaged by the heat of the lens blocking composition when the molten blocking composition is placed "adjacent" to the lens blank and/or to achieve better adherence between the base block and the lens blank. When base block 20 is placed against lens 10 a cavity is formed between cavity 21 of the block and the surface of the lens. A lens blocking composition may be injected through hole 22 to fill the cavity.

Figure 2:
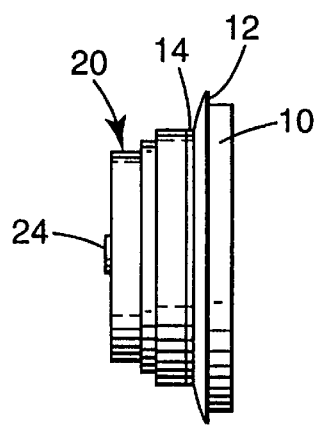
FIG. 2 is a side view of an ophthalmic lens blank and a lens block, wherein the ophthalmic lens blank and a lens block are attached using a lens blocking composition of the present invention.
Figure 3:
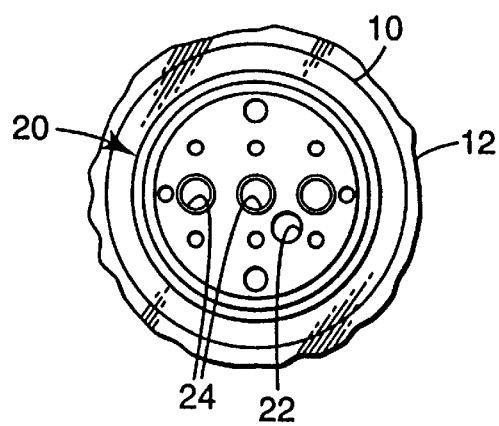
FIG. 3 is an end view of the ophthalmic lens blank and lens block of FIG. 2.

FIG. 2 depicts a side view of the ophthalmic lens blank 10 and lens base block 20 of FIG. 1. As shown in FIG. 2, an optional tape 12 or other lens coating may be applied to the semi-finished surface of the lens. A lens blocking composition 14 then fills the cavity formed between metal base block 20 and optional tape 12 on lens 10 and attaches the base block to the lens. Depending on the particular composition used, the composition may just fill the cavity or may form a film between the base block and the lens (as shown). FIG. 3 depicts an end view of the ophthalmic lens blank and lens block of FIG. 2. Base block is provided with positioning guides 24 and hole 22 through which lens blocking composition 14 may be injected.

Figure 4A:
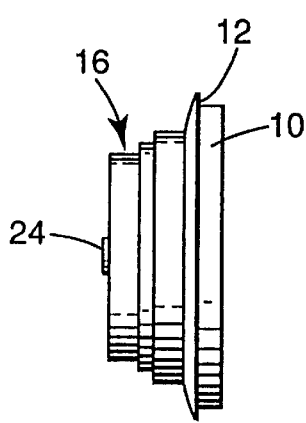
FIGS. 4a and 4b are side and end views of an ophthalmic lens blank and a lens block formed from a lens blocking composition of the present invention.
Figure 4B:
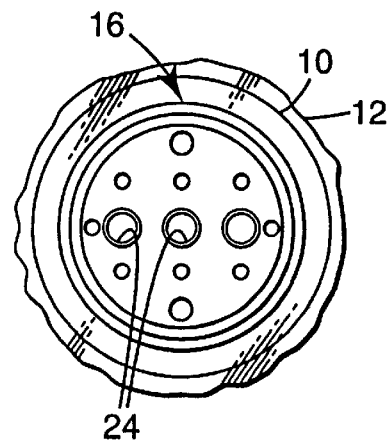
Figure 4C:
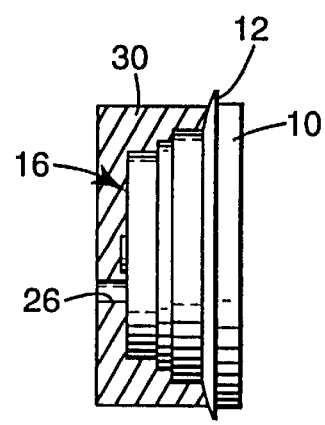
FIG. 4c is a side view of an ophthalmic lens blank and a mold into which a lens blocking composition of the present invention may be injected to form a lens block.

FIGS. 4a and 4b depict an alternative embodiment of the present invention wherein a lens block 16 is formed from the lens blocking composition of the present invention. If desired, a tape 12 or other lens coating may be first applied to the semi-finished surface of the lens. As shown in FIG. 4c, a mold is used to define a cavity in the shape of a lens block. The mold 30 forms the cavity using the finished surface of lens 10 as one boundary. When a lens blocking composition is injected into the mold (e.g., through gate 26) and allowed to harden a rigid block is formed against and adhered to the lens or lens coating.

Figure 5A:
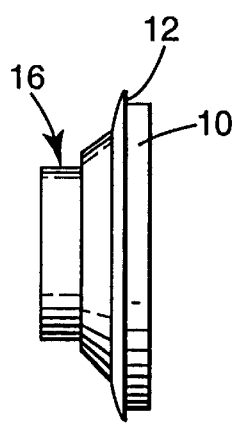
FIGS. 5a and 5b are side and end views of an alternative ophthalmic lens blank and a lens block formed from a lens blocking composition of the present invention.
Figure 5B:
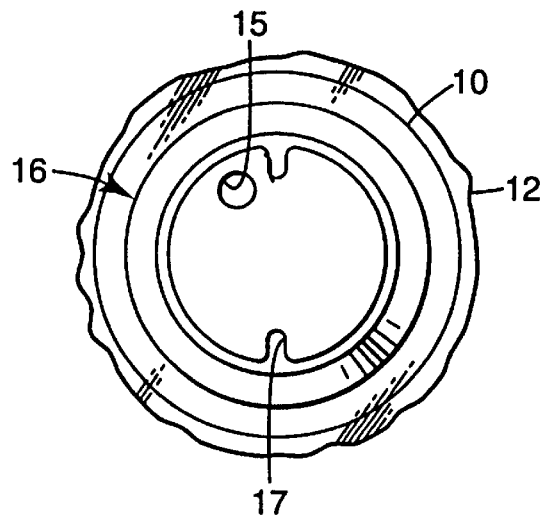

FIGS. 5a and 5b depict an alternative embodiment of the present invention wherein a lens block 16 is formed from the lens blocking composition of the present invention. If desired, a tape 12 or other lens coating may be first applied to the semi-finished surface of the lens 10. In this embodiment, lens block 16 comprises positioning guides 17 and hole 15.

Figure 6A:
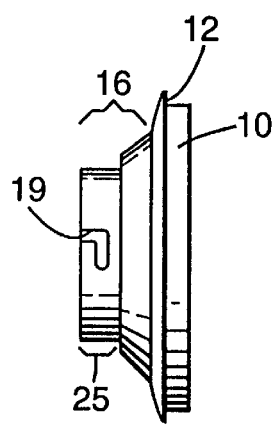
FIGS. 6a and 6b are side and end views of an alternative ophthalmic lens blank and a lens block formed in part from a lens blocking composition of the present invention and using a preformed base block.
Figure 6B:
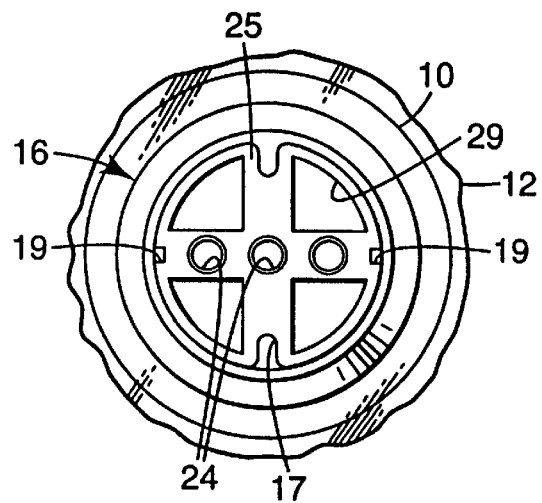

FIGS. 6a and 6b depict a further alternative embodiment of the present invention wherein a lens block 16 is formed in part from the lens blocking composition of the present invention. In this embodiment, a preformed metal (or other rigid material) base block 25 is placed in the blocker, and the lens blocking composition is used to fill a cavity between the preformed base block and the lens 10 and to form a support ring of blocking composition against the lens. Preformed base block 25 may comprise one or more positioning guides 17, one or more polishing pin guide holes 24, and preferably contains an optional means to hold or "lock" the preformed base block against the blocker while the cavity is being filled with the blocking composition. One method for accomplishing this is to provide one or more "J-locks" 19, which engage pins on the blocker or on an optional cooling ring. The "J-locks" prevent the preformed base block from being pushed away from the blocker by the blocking composition. This ensured that the positioning guides of the preformed base will be in the desired alignment. Preformed base block 25 preferably contains a one or more holes 29 through its rear surface. When the base block and blocking composition are formed to provide a lens block, the blocking composition is viewable through the rear holes 29. After the block is separated from the lens, the user may conveniently separate the preformed base block from the blocking composition by holding the base block and pressing against the blocking composition (e.g., using a thumb or a tool) through the rear hole 29.

Figure 7A:
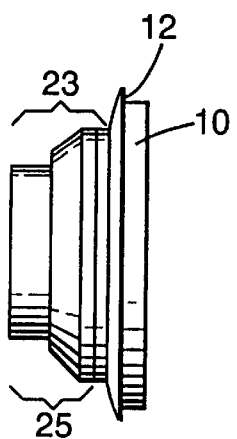
FIGS. 7a and 7b are side and end views of an alternative ophthalmic lens blank and a lens block formed in part from a lens blocking composition of the present invention and using a preformed base block.
Figure 7B:
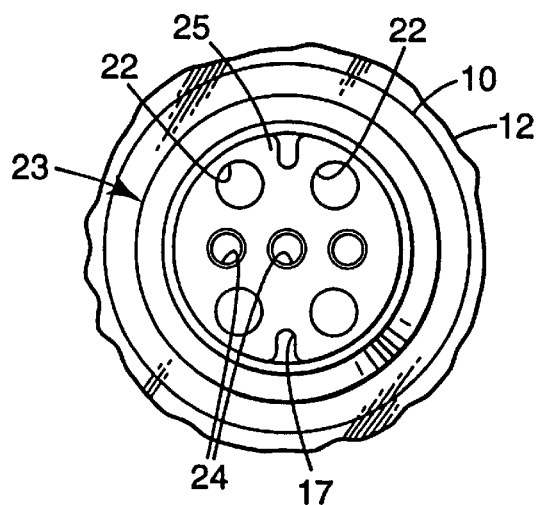

FIGS. 7a and 7b depict a further alternative embodiment of the present invention wherein a lens block 23 is formed in part from the lens blocking composition of the present invention. In this embodiment, a preformed metal (or other rigid material) base block 25 is placed in the blocker, and the lens blocking composition is used to fill the cavity between the preformed base block and the lens and to form a support ring of blocking composition against the lens. Preformed base block 25 may comprise one or more positioning guides 17, one or more polishing pin guide holes 24, and optionally contains a means to hold or "lock" the preformed base block against the blocker while the cavity is being filled with the blocking composition. Preformed base block 25 preferably contains a one or more holes 22 through its rear surface. When the base block and blocking composition are formed to provide a lens block, the blocking composition is viewable through the rear holes 22. After the block is separated from the lens, the user may conveniently separate the preformed base block from the blocking composition by holding the base block and pressing against the blocking composition (e.g., using a tool) through the rear surface hole 22.

Figure 8A:
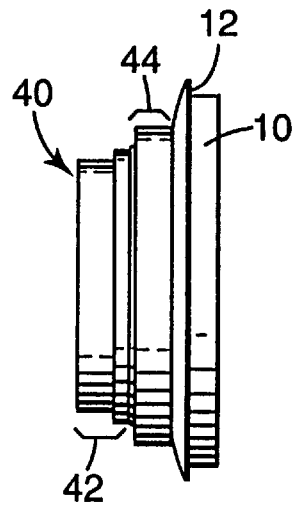
FIG. 8a is a side view of an ophthalmic lens blank and a lens block formed in part from a lens blocking composition of the present invention and using a preformed base block.
Figure 8B:
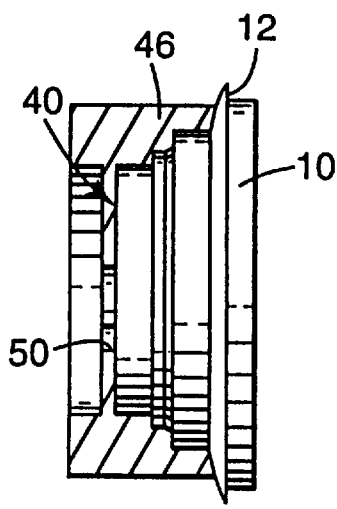
FIG. 8b is a side view of the ophthalmic lens blank and block of FIG. 8a, further showing a cross-section of a chill ring mold.
Figure 8C:
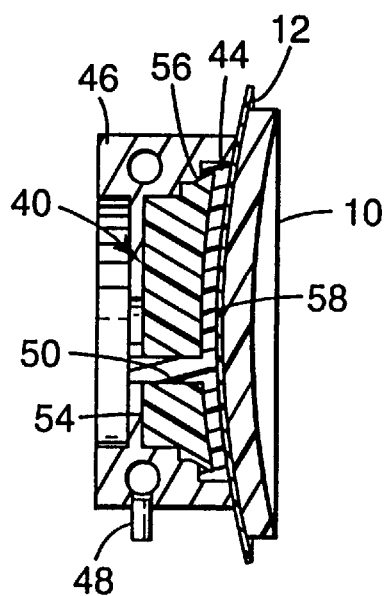
FIG. 8c is a cross-sectional view of the block of FIGS. 8a and 8b.
Figure 8D:
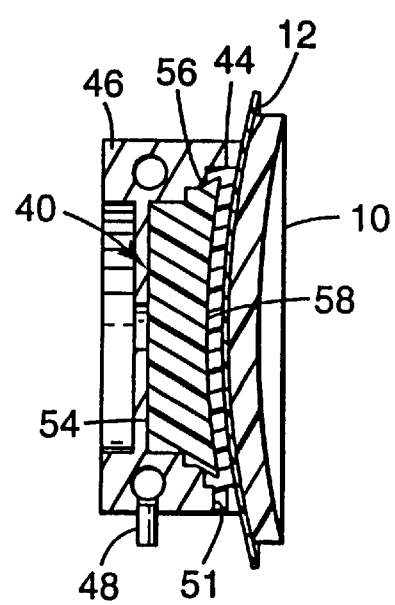
FIG. 8d is a cross sectional view of a block similar to the block depicted in FIGS. 8a and 8b, but having an alternative location for the filling gate.

Shown in FIG. 8a is an ophthalmic lens blank 10 and a lens block 40 of the present invention. The lens block 40 comprises a preformed base block 42 and a thermoplastic blocking composition 44. An optional tape 12 or other lens coating is shown applied to the semi-finished surface of the lens 10 and provides additional protection to keep the lens 10 from being scratched or otherwise damaged by the heat of the lens blocking composition 44 when the molten blocking composition is placed "adjacent" to the lens blank and/or to achieve better adherence between the block and the lens blank. As shown in FIGS. 8b to 8d, preformed base block 42 is inserted into a mold 46 that is placed adjacent the lens blank 10. This forms a cavity between and optionally around at least a portion of the preformed base block 42 and the surface of the lens. The mold may also be fitted with a cooling apparatus, such as a water circuit 48 that allows the circulation of chilled water to pass. The thermoplastic blocking composition is then injected into the cavity between the preformed base block 42 and lens 10 and allowed to harden. The thermoplastic blocking composition 44 may be injected either through a hole 50 in the mold that is located opposite the lens (as shown in FIGS. 8b and 8c) or through a hole 51 in the mold that is located on the side of the block 40 as is shown in FIG. 8d.

FIG. 8b depicts a side view of the ophthalmic lens blank 10 and lens block 40 of FIG. 1. As shown in FIG. 8b, an optional tape 12 or other lens coating may be applied to the semi-finished surface of the lens. A lens blocking composition 44 then fills the cavity formed between the mold 46, preformed base block 42, and lens 10; and attaches the preformed base block to the lens. FIG. 8c depicts a cross-sectional side view of the block 40 of FIGS. 8a and 8b. Preformed base block 42 is shown in FIG. 8f having a rear surface 54 and collar 55 that together are sized and adapted to fit the chuck of a desired lens processing machine. As such, the exact size and shape of this portion of the preformed base block may assume a variety of configurations. Preformed base block 42 preferably also has a "negatively" tapered edge 56 and a curved front surface 58. A fill hole 122 may optionally be provided through the preformed base block 42 to enable filling from the rear surface. Tapered edge 56 is preferably angled so as to provide a mechanical "overcut" and retain the thermoplastic blocking composition against the preformed base block 42. This avoids the need for adhesive between the thermoplastic blocking composition 44 and the preformed base block 42. The blocking composition may be very easily and cleanly separated from the preformed base block by simply holding the preformed base and "peeling" the blocking composition off the base. It has been observed that having a peripheral overcut retention means is preferred. Upon separation, very little if any blocking composition remains stuck to the preformed base. There is also no need to "dig" out blocking composition from cavities formed by "positively" tapered undercuts. If desired, the cleanly separated performed base block may then be reused, and the blocking composition recycled (i.e., reheated) and used again. To prevent undesired rotation of the thermoplastic blocking composition 44 relative to the preformed base block 42 the preformed base block 42 preferably also comprises a means to resist such rotation. This may be accomplished using an adhesive or a mechanical means. For example, when the thermoplastic blocking composition is filled through an off-centered hole 122 that extends at least partially through the preformed base block, the material that solidifies in the hole will help prevent such rotation. Alternatively, for example, the preformed base block may optionally comprise a scalloped outer edge 132 as shown in FIG. 9e or a key 140 or plurality of keys as shown in FIG. 10e. Other mechanical means to resist rotation may be employed, if desired.

Figure 8E:
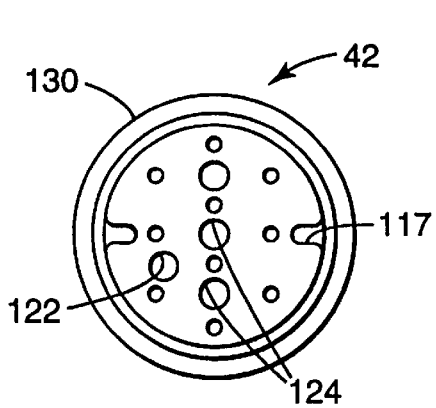
FIGS. 8e to 8g are side and end views of the preformed base block of FIG. 8c.
Figure 8F:
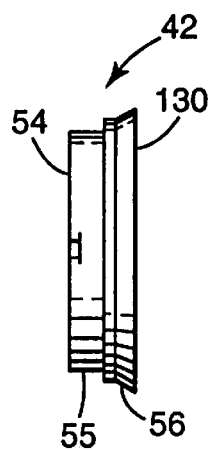
Figure 8G:
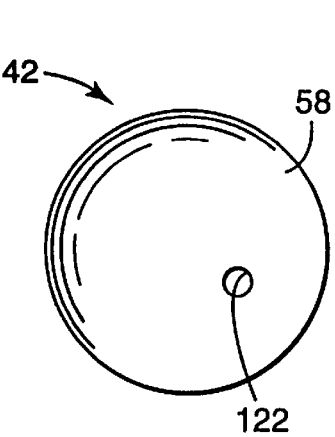

FIGS. 8e to 8g illustrate the preformed base block of FIGS. 8a to 8c. FIG. 8e is a rear end view of preformed base block 42, showing positioning guides 117, polishing pin holes 124, fill hole 122, and outer edge 130. FIG. 8f is a side view of this same preformed base block 42, illustrating rear surface 54, collar 55, and tapered edge 56. FIG. 8g is a front end view of preformed base block 42, illustrating fill hole 122 and curved front surface 58. If desired, e.g., for preformed base blocks that are formed from a plastic material, the polishing pin guides optionally may be formed using a suitable insert, such as a metal or ceramic insert. The metal or ceramic inserts may resist wear that would compromise the polishing process.

Figure 9F:
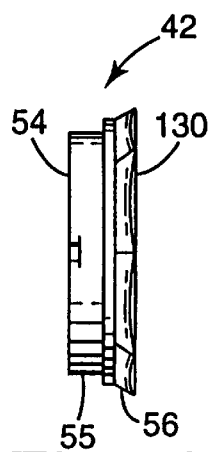
Figure 9G:
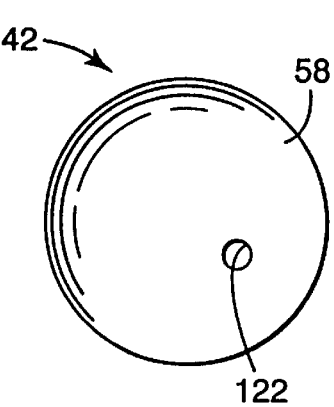

FIGS. 9e to 9g illustrate an alternative embodiment of the preformed base block of FIGS. 8a to 8c. FIG. 9e is a rear end view of a preformed base block, showing positioning guides 117, polishing pin holes 124, and fill hole 122. The outer edge 132 in this example is scalloped so as to prevent rotation of the thermoplastic blocking composition about the preformed base block. FIG. 9f is a side view of this same preformed base block, illustrating rear surface 54, collar 55, and tapered edge 56. FIG. 9g is a front end view of this preformed base block, illustrating fill hole 122 and curved front surface 58.

Figure 10F:
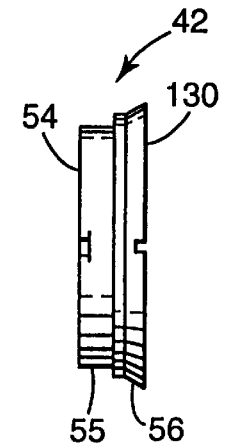
Figure 10G:
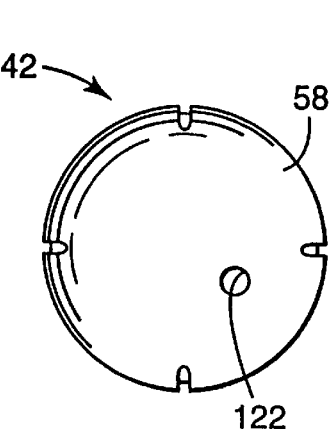

FIGS. 10e to 10g illustrate a further alternative embodiment of the preformed base block of FIGS. 8a to 8c. FIG. 10e is a rear end view of a preformed base block, showing positioning guides 117, polishing pin holes 124, and fill hole 122. The outer edge 130 in this example contains at least one key 140 that helps prevent rotation of the thermoplastic blocking composition about the preformed base block. FIG. 10f is a side view of this same preformed base block, illustrating rear surface 54, collar 55, and tapered edge 56. FIG. 10g is a front end view of this preformed base block, illustrating fill hole 122 and curved front surface 58.

FIGS. 11e to 11g illustrate an alternative embodiment of the preformed base block of FIGS. 8a to 8c. FIG. 11e is a rear end view of preformed base block 42, showing positioning guides 117, polishing pin holes 124, fill hole 122, and outer edge 130. FIG. 11f is a side view of this same preformed base block 42, illustrating rear surface 54, collar 55, and tapered edge 56. FIG. 11g is a front end view of preformed base block 42, illustrating fill hole 122 and front surface 58. Front surface 58 is textured and comprises a plurality of projecting portions 60 and recessed portions 62. The projecting portions 60 in this illustrative embodiment measure approximately 2.3 mm by 2.3 mm and have a draft angle of approximately 5 degrees. Each rectangular projecting portion is separated by a gap of approximately 0.9 mm width.

FIGS. 12e to 12g illustrate an alternative embodiment of the preformed base block of FIGS. 8a to 8c. FIG. 12e is a rear end view of preformed base block 42, showing positioning guides 117, polishing pin holes 124, fill hole 122, and outer edge 130. FIG. 12f is a side view of this same preformed base block 42, illustrating rear surface 54, collar 55, and tapered edge 56. FIG. 12g is a front end view of preformed base block 42, illustrating fill hole 122 and front surface 58. Front surface 58 is textured and comprises a plurality of projecting portions 64 and recessed portions 66. The projecting portions 64 in this illustrative embodiment measure approximately 1.6 mm in diameter, have a height of 0.38 mm, and have a draft angle of approximately 20 degrees. The circular projecting portions are spaced approximately 3 mm on center.

The following examples are offered to aid in the understanding of the present invention and are not to be construed as limiting the scope thereof. Unless otherwise indicated, all parts and percentages are by weight.

EXAMPLES

Example 1

Polyetherester block copolymers were synthesized by placing the reactants in the amounts listed in Table 1a into a 500 ml three-neck round bottom flask. The center neck had a stir shaft and paddle, one side neck had an adapter attached to a nitrogen source, and another side neck had a modified /Dean-Stark trap to condense and collect vapor. Run conditions for Runs 1–8 are given in Table 1b. The heat source was a Wood's metal bath commercially available from Aldrich Chemical Company, Milwaukee, Wis. The mixture was stirred with a nitrogen flow until it cooled to approximately 150° C. and then it was poured from the flask into a container.

TABLE 1a

| | Reactants | | | | | |
|---|---|---|---|---|---|---|
| | Diacid | | Short Chain Diol | | Polyol | |
| Run Number | Name | Amount (g) | Name | Amount (g) | Name | Amount (g) |
| 1 | succinic acid | 35.8 | 1,8-octanediol | 45.0 | TERETHANE ™[1] 2900 | 20.0 |
| 2 | suberic acid | 27.2 | 1,8-octanediol | 23.8 | TERETHANE ™ 2900 | 50.0 |
| 3 | suberic acid | 43.5 | 1,8-octanediol | 38.0 | TERETHANE ™ 2900 | 20.0 |
| 4 | suberic acid | 52.8 | 1,4-butanediol | 29.0 | TERETHANE ™ 2900 | 20.0 |
| 5 | adipic acid | 35.9 | 1,6-hexanediol | 31.2 | TERETHANE ™ 2000 | 35.0 |
| 6 | suberic acid | 32.9 | 1,4-butanediol | 18.9 | TERETHANE ™ 2900 | 50.0 |
| 7 | suberic acid | 52.8 | 1,4-butanediol | 29.2 | TERETHANE ™ 1000 | 20.0 |
| 8 | succinic acid | 35.8 | 1,8-octanediol | 45.2 | TERETHANE ™ 1000 | 20.0 |

[1]TERETHANE is the tradename for polyether glycols available from E. I. Du Pont de Nemours, Inc., Wilmington, DE.

TABLE 1b

| Run Conditions | | |
|---|---|---|
| Time (hours) | Temperature (° C.) | Nitrogen Flow Rate (ml/min) |
| 0 | 150 | 100 |
| 1 | 200 | 100 |
| 4 | 240 | 500 |
| 7 (Shut down) | 150 | 500 |

The polyetherester materials, Runs 1–3 and 5–8, and a competitive material, Comp. Run 9, commercially available as "FREE BOND™ Non-alloy Blocking Substance" from Gerber Optical Inc., South Windsor, Conn. were evaluated by Thermal Mechanical Analysis (TMA) using a "Perkin-Elmer 7 Series Thermal Analysis System" commercially available from The Perkin-Elmer Corporation, Norwalk, Conn. to determine the percent change in dimensions while heating over a temperature range of 0° C. to near the melting temperature at a rate of 5° C. minute. An expansion probe with 50 mN of applied force was used. Transition temperatures and melting points were extrapolated at onset from the curves. The results for the polyetherester materials, Runs 1–3 and 5–8, and the competitive material, Comp. Run 9, are shown in Table 1c.

TABLE 1c

Thermomechanical Analysis of Polyetheresters

| Run Number | Percent Change in Dimensions for a Temperature Range (%) | Extrapolated Onset of Transition Temperatures (° C.) | Melting Temperature (° C.) |
|---|---|---|---|
| 1 | 1.6 (0°→60° C.) | 39, 55 | 64 |
| 2 | 2.8 (0°→52° C.) | 32, 19, 19, 20 | 57 |
| 3 | 1.7 (0°→60° C.) | 40, 38, 39 | 62 |
| 5 | 1.5 (0°→45° C.) | 26 | 48 |
| 6 | 2.2 (0°→45° C.) | 29, 17, 17 | 47 |
| 7 | 1.7 (0°→49° C.) | 34, 36, 37 | 50 |
| 8 | 1.5 (0°→58° C.) | 34, 34, 34 | 60 |
| Comp. Run 9 | 2.9 (0°→41° C.) | 29, 25, 26 | 44 |

The polyetherester materials, Runs 1–3 and 5–8 had higher melting temperatures and a lower percent change in dimensions over the temperature range of heating than the competitive material in Comp. Run 9.

The polyetherester materials, Runs 1–8, were evaluated by Gel Permeation Chromatography (GPC) for weight, number, and z average molecular weights. GPC analysis was done in tetrahydrofuran (THF) at 1.0 ml/min. using a HP1090LC System from Hewlett-Packard, Palo Alto, Calif. including a HP 1047A Refractive Index detector and a HP Diode Array Detector (UV detector at 254 nm). A CRI Permagel 10 micron particle size column from Column Resolutions Inc., San Jose, Calif. was used for high molecular weight materials. Analog signals were converted to digital data using Polymer Laboratories, Inc., Amherst, Mass., software and hardware. Calibration was based on polystyrene standards from Pressure Chemical Co., Pittsburgh, Pa. The sample solution was weighed accurately to give 15 mg of resin /5 ml solvent and filtered with a 0.2 micron "TEFLON™ Filter" from Scientific Resources, Eatontown, N.J. and 100 microliters was injected into the column. A Polydispersity Index was calculated by dividing $M_w$ by $M_n$. The results are shown in Table 1d.

TABLE 1d

| Run Number | Weight Average Molecular Weight ($M_w$) | Number Average Molecular Weight ($M_n$) | Z Average Molecular Weight ($M_z$) | Polydispersity Index ($M_w/M_n$) |
|---|---|---|---|---|
| 1 | 23684 | 9871 | 38973 | 2.40 |
| 2 | 21411 | 10554 | 34580 | 2.03 |
| 3 | 15015 | 7253 | 24074 | 2.07 |
| 4 | 21488 | 8682 | 35976 | 2.48 |
| 5 | 16403 | 4816 | 28342 | 3.41 |
| 6 | 21066 | 11826 | 31237 | 1.78 |
| 7 | 18119 | 9199 | 28880 | 1.97 |
| 8 | 15448 | 7973 | 23949 | 1.94 |

Number average molecular weight equals weight average molecular weight for a monodisperse system. Polydispersity Index is a measure of the breadth of the polymer molecular weight distribution. Run 5 had the broadest molecular weight distribution.

The flow behavior of polyetherester formulations was examined using a parallel plate fixture on a Rheometrics Dynamic Analyzer (RDA-II) from Rheometrics, Inc., Piscataway, N.J. The steady shear viscosity (Pa s) was measured at shear rates of 1, 5, and 10 second$^{-1}$ at 65.6° C. At each shear rate, the measurement was made when the torque was at steady state. The results are shown in Table 1e.

TABLE 1e

| | Shear Viscosity at Shear Rates of 1, 5, and 10 second$^{-1}$ (Pa s) | | |
|---|---|---|---|
| Run Number | 1 s$^{-1}$ | 5 s$^{-1}$ | 10 s$^{-1}$ |
| 1 | 15.27 | 15.11 | 15.16 |
| 2 | 7.45 | 7.44 | 7.39 |
| 3 | 3.16 | 3.04 | 3.02 |
| 5 | 5.22 | 5.16 | 5.17 |
| 6 | 9.93 | 9.59 | 9.67 |
| 7 | 5.37 | 5.36 | 5.37 |
| 8 | 3.44 | 3.83 | 3.86 |
| Comp. Run 9 | 0.98 | 0.91 | 0.88 |

The differences in the measured viscosity indicated variation in the molecular weight of the resin systems. For the "FREE BOND™ Non-alloy Blocking substance" (Comp. Run 9), the measured viscosity was at the limit of the instrument sensitivity; therefore, the viscosity may be approximate values.

The polyetherester materials, Runs 1–3 and 5–8, and the competitive material, Comp. Run 9, were evaluated for hardness using ASTM Test Method D2240-91 "Shore Type 'A' Hardness". Three measurements were made for each run. The results are shown in Table 1f.

TABLE 1f

| | Shore Type 'A' Hardness Test (ASTM D2240 - 91) Measurement | | | |
|---|---|---|---|---|
| Run Number | 1 | 2 | 3 | Average |
| 1 | 96 | 97 | 93 | 95 |
| 2 | 93 | 96 | 96 | 95 |
| 3 | 78 | 77 | 78 | 78 |
| 5 | 46 | 43 | 39 | 43 |

TABLE 1f-continued

| | Shore Type 'A' Hardness Test (ASTM D2240 - 91) Measurement | | | |
|---|---|---|---|---|
| Run Number | 1 | 2 | 3 | Average |
| 6 | 83 | 83 | 83 | 83 |
| 7 | 82 | 79 | 84 | 82 |
| 8 | 81 | 79 | 81 | 80 |
| Comp. Run 9 | 66 | 63 | 64 | 64 |

Example 2

Polycaprolactone materials commercially available as "TONE™ P-300" (10,000 molecular weight) polycaprolactone from Union Carbide Chemicals and Plastics Company Inc., Danbury, Conn., Run 1, and as "CAPA™ 630" (30,000 molecular weight) polycaprolactone from Solvay Interox, Houston, Tex., Run 2, were evaluated by Thermal Mechanical Analysis (TMA) using the same procedure described for Example 1. The results are shown in Table 2a along with the results of two comparison runs.

TABLE 2a

Thermomechanical Analysis of Polycaprolactones

| Run Number | Percent Change in Dimensions for a Temperature Range | Extrapolated Onset of Transition Temperatures (° C.) | Melt Temperature (° C.) |
|---|---|---|---|
| 1 | 1.0 (0°→54° C.) | 41, 47 | 61 |
| 2 | 1.4 (0°→54° C.) | 26, 38, 41 | 60 |
| Comp. Run 3[1] | 1.9 (0°→40° C.) | | 46 |
| Comp. Run 4[2] | 2.9 (0°→41° C.) | 29, 25, 26 | 44 |

[1]"OPTEK ™ Feather Lite Blocking Compound" available from Associated Development Corporation, Optek Division, Pinellas Park, FL.
[2]"FREE BOND ™ Non-alloy Blocking Substance" available from Gerber Optical Inc., South Windsor, CT.

The polycaprolactone materials, Runs 1 and 2, had a higher melt temperature and a lower percent change in dimensions over a temperature range of heating than the competitive materials in Comp. Runs 3 and 4.

The polycaprolactone materials and the two comparison materials were evaluated by Gel Permeation Chromatography (GPC) for weight, number, and z average molecular weights using the same procedure described for Example 1. The results are shown in Table 2b.

TABLE 2b

| Run Number | Weight Average Molecular Weight ($M_w$) | Number Average Molecular Weight ($M_n$) | Z Average Molecular Weight ($M_z$) | Polydispersity Index ($M_w/M_n$) |
|---|---|---|---|---|
| 1a | 23850 | 5220 | 38803 | 4.57 |
| 1b[1] | 23520 | 4720 | 38611 | 4.98 |
| 2 | 61800 | 40190 | 87281 | 1.54 |
| Comp. Run 3 | 35470 | 2500 | 179460 | 14.18 |
| Comp. Run 4 | 26570 | 1140 | 172450 | 23.35 |

[1]Run 1b differed from Run 1a in that this sample was aged in an oven at 66° C. for 30 days before GPC testing.

The polydispersity index shows that the competitive blocking compounds, Comp. Runs 3 and 4 had very broad molecular weight distributions. The "TONE™ P-300 Polycaprolactone" from Union Carbide Chemicals and Plastics Company Inc., Runs 1a and 1b had a somewhat broader molecular weight distribution than "CAPA™ 630 Polycaprolactone" from Solvay Interox, Run 2.

The flow behavior of polycaprolactone materials, Runs 1 and 2, and the two comparison materials, Comp. Runs 3 and 4, were examined using the same procedure described for Example 1. The results are shown in Table 2c.

TABLE 2c

| | Shear Viscosity at Shear Rates of 1, 5, and 10 $s^{-1}$ (Pa s) | | |
|---|---|---|---|
| Run Number | 1 $s^{-1}$ | 5 $s^{-1}$ | 10 $s^{-1}$ |
| 1 | 15.5 | 15.6 | 15.7 |
| 2 | 407.3 | 408.9 | 410.0 |
| Comp. Run 3 | 2.6 | 2.4 | 2.21 |
| Comp. Run 4 | 0.98 | 0.91 | 0.88 |

The polycaprolactone materials, Runs 1 and 2, had a higher viscosity than the competitive materials in Comp. Runs 3 and 4. The polycaprolactone in Run 2 had a significantly higher viscosity than any of the other materials.

The tangent modulus of elasticity in bending and flexural strength were measured for the two polycaprolactones and the competitive materials using ASTM D 790-86, "Standard Test Methods for Flexural Properties of Unreinforced and Reinforced Plastics and Electrical Insulating Materials" Test Method I. This test employs a three-point loading system utilizing center loading on a simply supported beam. The specimen were molded by heating the material to its melting temperature and pouring into a fluorocarbon coated mold die to give a test specimen that was 165 mm long, 12 mm wide, and 6 mm thick. The measurements were made on a "MTS SinTech™ Mechanical Tester" from MTS Systems Corporation, Eden Prairie, Minn. The span tested was 96 mm long giving a span to depth ratio equal to 16:1. The crosshead motion was 2 mm per min. Four specimen were tested for each Run. The results are shown in Tables 2d and 2e.

TABLE 2d

| | Tangent Modulus of Elasticity in Bending (ASTM D 790-86) (MPa) | | | | | |
|---|---|---|---|---|---|---|
| Run Number | 1 | 2 | 3 | 4 | Mean | Standard Deviation |
| 1 | 355 | 367 | 313 | 256 | 323 | 50 |
| 2 | 408 | 224 | 355 | 266 | 313 | 83 |

TABLE 2d-continued

Tangent Modulus of Elasticity in Bending (ASTM D 790-86) (MPa)

| Run Number | 1 | 2 | 3 | 4 | Mean | Standard Deviation |
|---|---|---|---|---|---|---|
| Comp. Run 3 | 28 | 48 | 32 | 11 | 30 | 15 |
| Comp. Run 4 | 30 | 22 | 29 | 37 | 29 | 6 |

The polycaprolactone materials in Runs 1 and 2 had ten times greater bending modulus than the comparison competitive materials in Runs 3 and 4.

TABLE 2e

Flecural Strength (ASTM D 790-86) (MPa)

| Run Number | 1 | 2 | 3 | 4 | Mean | Standard Deviation |
|---|---|---|---|---|---|---|
| 1 | 2.7 | 2.8 | 3.0 | 2.0 | 2.6 | 0.3 |
| 2 | 14.3 | 13.3 | 20.1 | 18.1 | 16.5 | 3.2 |
| Comp. Run 3 | 0.5 | 1.3 | 0.7 | 0.7 | 0.8 | 0.4 |
| Comp. Run 4 | 1.2 | 0.8 | 0.7 | 1.2 | 1.0 | 0.3 |

The polycaprolactone used in Run 2 had a flexural strength that was six times greater than the polycaprolactone used in Run 1 and fifteen times greater that the comparison competitive materials in Comp. Runs 3 and 4. As a result of having greater rigidity, the polycaprolactone materials should exhibit less flexing during normal lens processing conditions.

Hardness Test

The hardness of the polycaprolactone materials used in Run 1 and 2 and the competitive materials in Comp. Runs 3 and 4 was determined using a nanoindentation method. An ultramicro hardness tester, "UMIS™ 2000 Tester" from Division of Applied Physics, CSIRO, Australia was used. A Berkovich diamond indenter with a cone angle of 65 degrees was impressed against a surface in load increments of 1 mN while the resultant displacement was measured until the maximum load of 60 mN was achieved, then the load was incrementally decreased at 1 mN and the material's elastic recovery was observed as a decrease in total penetration. The hardness is equal to maximum load divided by the projected area of plastic deformation (i.e. contact area) and is reported in giga-pascals (GPa). The results are shown in Table 2f.

TABLE 2f

| Run Number | Hardness (GPa) |
|---|---|
| 1 | 5.02 |
| 2 | 5.29 |
| Comp. Run 3 | 0.00187 |
| Comp. Run 4 | 0.14 |

The polycaprolactones, Runs 1 and 2, were significantly harder than the competitive materials, Comp. Runs 3 and 4.

Probe Tack Test

A probe tack test was used to evaluate the tackiness of the materials and is described in ASTM D2979-88. Aluminum tins, 57 mm in diameter, were tared and three grams of each polycaprolactone (Runs 1 and 2) and each competitive material (Comp. Runs 3 and 4) were added to a tin. The materials were melted on a standard hot plate and cooled for 2 minutes. A 25.4 mm by 25.4 mm square of the material including the aluminum beneath the material was scissors cut and placed on the test probe area of a "TMI Polyken Probetack (Model 80-02-01)" commercially available from Testing Machines Inc., Amityville, N.Y. with an "A" annular weight of 200 grams (foam side down) on top of the aluminum side of the sample and the material side directly on top of the test probe. The machine settings were: Speed—0.5 cm; Dwell time: 2 seconds; Mode: peak. The test was initiated and the peak value recorded in grams. The results are shown in Table 2g.

TABLE 2g

| Run Number | 1 (g) | 2 (g) | 3 (g) | 4 (g) | 5 (g) | Mean tack (g) | Standard Deviation (g) |
|---|---|---|---|---|---|---|---|
| 1 | 213 | 290 | 313 | 290 | 271 | 275 | 38 |
| 2 | 364 | 481 | 267 | 325 | 38 | 364 | 79 |
| Comp. Run 3 | 115 | 109 | 110 | 90 | 102 | 105 | 10 |
| Comp. Run 4 | 1190 | 1462 | 1474 | 1090 | 1067 | 1257 | 198 |

The probe tack test showed that "FREE BOND™ Non-alloy Blocking Substance" (Comp. Run 4) was significantly stickier than the polycaprolactone materials (Runs 1 and 2) and "OPTIK™ Feather Lite Blocking Compound (Comp. Run 3). Thus, "FREE BOND™ Non-alloy Blocking Substance" would be stickier around the laboratory and more difficult to clean from surfaces.

Shear Adhesion Test

Circular polymethacrylate resin mounts were made and then ground using Grade 120 silicon carbide paper-backed abrasive mounted on a lapidary wheel. Further grinding and polishing of the mounts was carried out by mounting Grade 600 silicon carbide paper-backed abrasive on the lapidary wheel. Approximately 2.8 cm circles were cut from each of two commercially available tapes: A) "VENTURE™ Tape", available from Venture Tape Corp., Rockland, Ma.; and B) "SURFACE SAVER™ #1640 Lens Surface Systems" available from 3M Company, St. Paul, Minn. The tape circles were applied to the resin mounts with the adhesive side of the tape on the smooth surface of the resin mount, rolled twice with a two inch hand roller, and placed on a round 0.5 cm mold made from a 2 mm thick "TEFLON™ Polytetrafluoroethylene Sheet" with a 5 mm diameter circular hole through the sheet. The hole in each mold was filled using syringes with melted polycaprolactone from Run 1 or 2, competitive materials from Comparison Runs 3 or 4, or a low-melting-temperature blocking alloy commercially available as "Coburn Blok-alloy 9916" from Coburn Optical Industries, Muskogee, Okla., Comp. Run 5. The materials were allowed to harden and the mold was removed leaving resin mounts with the applied tape sample molded to the polycaprolactone, competitive materials or blocking alloy.

Adhesive strength was evaluated by mounting the resin mount in a holder clamped in the jaws of an "INSTRON™ Testing Apparatus" with the polished mount surface oriented parallel to the direction of pull. A loop of 0.44 mm diameter wire was placed around the base of the hardened materials. The ends of the wire were clamped in the pulling jaw of the tensile testing apparatus, placing the bond in shear stress. The bond was stressed until it failed, using a crosshead speed of 2 mm/min. Shear adhesion values for 10 samples of each material were measured and the average and standard deviation recorded. The results are recorded in Table 2h.

TABLE 2h

| | Number Bonded Out of 10 specimens | | Average adhesion value (kg/cm$^2$) | | Standard Deviation (kg/cm$^2$) | |
|---|---|---|---|---|---|---|
| Run Number | "VENTURE tape"[1] | "SURFACE SAVER Lens Surfacing Systems"[2] | "VENTURE Tape" | "SURFACE SAVER Lens Surfacing Systems" | "VENTURE Tape" | "SURFACE SAVER Lens Surfacing Systems" |
| 1 | 10 | 10 | 8.15 | 18.12 | 1.66 | 1.61 |
| 2 | 0 | 10 | — | Tape Ripped | — | — |
| Comp. Run 3 | 0 | 2 | — | 4.51 | — | 1.14 |
| Comp. Run 4 | 3 | 4 | 5.56 | 6.25 | 2.44 | 1.17 |
| Comp. Run 5 | 2 | 10 | 12.15 | 12.96 | 4.09 | 2.80 |

[1]"VENTURE ™ No. 455 Tape" commercially available from Venture Tape Corp., Rockland, MA
[2]"SURFACE SAVER ™ #1640 Lens Surfacing Systems" commercially available from 3M Company, St. Paul, MN Lens Distortion Test A surface protection tape was made by blending two resins, "BYNEL™ 3101 Acid and Acrylate Modified Ethylene Vinyl Acetate" (25 wt. %) from E. I. Du Pont de Nemours and Company, Wilmington, Del. and "ATTANE™ 4602 Ultra Low Density Ethylene/Octene Copolymer" (75 wt. %) from Dow Chemical Company, Midland, Mich. on a "Haake Rheocord extruder" (Model 252) commercially available from Haake Inc., Saddle Brook, N.J. with a 1.9 cm diameter screw and with a length to diameter (L:D) ratio of 25:1 to form the backing layer of the surface protection tape. The temperature was progressively increased from 177° C. to 277° C. from 1 zone 3. The temperature was 288° C.

A double coated tape commercially available as "3M Double Coated 1512 Tape" was applied to one side of the backing layer of the lens surface protective film and to 70 mm plastic lenses with 2.0–2.4 mm center thickness, plano, finished uncut, "RLX Plus™ Scratch Resistant, Finished Lens in Hard Resin" from signet Armorlite, Inc., San Marcos, Calif. using the 3M SURFACE SAVER Applicator available from 3M. Air pressure was set at 0.02–0.03 MPa for the block commercially available as OPTEK™ Model 200 Blocker. A brass blocking ring was placed on the locker and a 56 mm diameter Coburn Block from Coburn Company was placed into the ring such that the inlet in the block fit snugly over the rubber nozzle. The block was centered on the lens and slowly filled with polycaprolactone from Run 1 at 60° C. The blocked lens assembly was allowed to set for 10 to 15 seconds after filling, in order for the resin to harden and form a good bond to the taped lens. The blocking ring and blocked lens was removed from the blocker and the blocked lens was removed from the blocking ring.

The heat transfer temperature of the melted polycaprolactone was measured at the lens surface using a temperature probe sandwiched between the lens surface and the adhesive side of the surface protector tape. The results are shown in Table 2i.

TABLE 2i

| Time (minutes) | Temperature (° C.) |
|---|---|
| 0 | 25.56 |
| 1 | 36.67 |
| 2 | 36.11 |
| 3 | 36.11 |
| 4 | 36.11 |
| 5 | 35.56 |
| 6 | 35.00 |
| 7 | 34.44 |
| 8 | 34.44 |
| 9 | 33.89 |
| 10 | 33.89 |
| 11 | 33.89 |
| 12 | 33.89 |
| 13 | 33.89 |
| 14 | 33.33 |
| 15 | 33.33 |
| 16 | 33.33 |

The lens were examined and found to be distortion "free" which means that it is safe to block such lenses with a surface protector tape at 60° C.

Cooling Rates

The cooling rates of the polycaprolactones, Runs 1 and 2, were compared to the blocking alloy commercially available as "Coburn Blok-alloy 9916" from Coburn Optical Industries, Comp. Run 5, and the competitive material used in Comp. Run 4. An Omega Model HH21 microprocessor thermometer type J-K-T thermocouple was placed below the tape and against the lens. The results are shown in Table 2j.

TABLE 2j

| Time | Temperature (° C.) | | | |
|---|---|---|---|---|
| (Minutes) | Run 1 | Run 2 | Comp. Run 4 | Comp. Run 5 |
| 1 | 66.67 | 67.22 | 65.56 | 66.67 |
| 2 | 62.78 | 63.89 | 62.22 | 61.67 |
| 3 | 63.33 | 61.11 | 57.78 | 57.22 |
| 4 | 58.89 | 58.89 | 55.56 | 53.89 |
| 5 | 56.67 | 56.67 | 52.78 | 50.56 |
| 6 | 52.78 | 54.44 | 47.78 | 47.78 |

TABLE 2j-continued

| Time | Temperature (° C.) | | | |
|---|---|---|---|---|
| (Minutes) | Run 1 | Run 2 | Comp. Run 4 | Comp. Run 5 |
| 7 | 50.00 | 53.33 | 45.00 | 45.56 |
| 8 | 50.00 | 51.67 | 43.33 | 44.44 |
| 9 | 48.33 | 50.00 | 38.33 | 43.89 |
| 10 | 46.67 | 48.33 | 40.00 | 45.00 |
| 11 | 44.44 | 46.67 | 38.89 | 45.00 |
| 12 | 43.89 | 45.36 | 37.78 | 45.00 |
| 13 | 42.78 | 43.89 | 36.11 | 45.00 |
| 14 | 41.67 | 42.78 | 36.11 | 45.00 |
| 15 | 40.56 | 41.67 | 35.56 | 45.00 |
| 20 | 38.89 | 37.78 | 33.33 | 45.00 |
| 25 | 40.00 | 37.78 | 31.11 | 45.00 |
| 30 | 40.00 | 38.33 | 30.00 | 45.56 |
| 35 | 37.78 | 37.78 | 28.89 | 45.56 |
| 40 | 32.78 | 37.22 | 27.22 | 45.56 |
| 45 | 31.67 | 36.67 | 26.67 | 45.56 |
| 50 | 31.11 | 35.00 | 26.11 | 43.89 |
| 55 | 28.89 | 33.33 | 25.00 | 36.67 |
| 60 | 27.22 | 27.22 | 25.00 | 31.11 |
| 65 | 27.78 | 27.78 | 25.00 | 28.33 |
| 70 | 28.89 | 28.89 | 25.00 | 27.78 |

Blocking alloy, Comp. Run 5, initially cooled faster than any of the other materials in the first five minutes and then after ten minutes it held at a temperature between 45.00° C. and 45.56° C. which was a slower cooling rate. "FREE BOND™ Non-alloy Blocking Substance", Comp. Run 4, cooled more quickly than any of the other materials.

Example 3

Low molecular weight polycaprolactones commercially available as "TONE™ Polyol 1270" (reported MW=4,000), "TONE™ Polyol 0260" (reported MW=3,000), and "TONE™ Polyol 2241" (reported MW=2,000) from Union Carbide Chemicals and Plastics Company Inc., Danbury, Conn. were blended with a higher molecular weight polycaprolactone (PCL) commercially available as "TONE™ Polyol P-300" (reported MW=10,000) from Union Carbide Chemicals and Plastics Company Inc. in the amounts shown in Table 3a, Runs 1–12. The polycaprolactones were placed in a high density polyethylene container in an oven at 65° C. until they were melted, approximately 2 hours. The container was placed in boiling water on a hot plate with a mechanical stirrer for a few minutes. The container was returned to a 65° C. oven to deaerate the molten polymers. Then the molten polymers were poured onto a tray to cool to room temperature and solidify. Low molecular weight polycaprolactone triols (reported MW=300, 530, and 1250) commercially available from Aldrich Chemical Co., Inc., Milwaukee, Wis. were added to the melt of the higher molecular weight polycaprolactone, Run 1, in varying amounts (Table 3a) in Runs 13–24.

Hardness was measured using two durometers commercially available as Model 307L for Shore Type 'D' and Model 306L for Shore Type 'A' from Pacific Transducer Corporation, Los Angeles, Calif. according to ASTM D2240-91.

Viscosity of the molten polymer mixtures were determined using a Brookfield viscometer, Model LVT, spindle No. 34 commercially available from Brookfield Engineering Laboratories, Inc., Stoughton, Mass. at 60° C. The spindle end was immersed to about 0.6 cm in the melt and readings were taken at intervals for 5 to 10 minutes until the reading was constant. The viscosity in centipoise (cP) was calculated.

TABLE 3a

| Run Number | High Molecular Weight PCL[1] (wt. %) | Low Molecular Weight PCL (wt. %) | Low Molecular Weight PCL Triol (wt. %) | Hardness Shore 'D'/'A' | Viscosity (cP) |
|---|---|---|---|---|---|
| 1 | 100 | 0 | 0 | 53/98 | 23000 |
| 2 | 80 | 20[2] | 0 | 52/98 | 14800 |
| 3 | 60 | 40[2] | 0 | 47/98 | 10600 |
| 4 | 40 | 60[2] | 0 | 47/98 | 8000 |
| 5 | 20 | 80[2] | 0 | | |
| 6 | 0 | 100[2] | 0 | 40/— | 2600 |
| 7 | 80 | 20[3] | 0 | 46/98 | 11600 |
| 8 | 60 | 40[3] | 0 | 42/98 | |
| 9 | 0 | 100[3] | 0 | | 1500 |
| 10 | 80 | 20[4] | 0 | 44/98 | 11200 |
| 11 | 60 | 40[4] | 0 | 40/96 | 5400 |
| 12 | 0 | 100[4] | 0 | 15/80 | 450 |
| 13 | 90 | 0 | 10[5] | 50/— | 15000 |
| 14 | 80 | 0 | 20[5] | 42/— | 10800 |
| 15 | 0 | 0 | 100[5] | | 90 |
| 16 | 97.5 | 0 | 2.5[6] | | 18400 |
| 17 | 95 | 0 | 5[6] | 40/98 | 15400 |
| 18 | 90 | 0 | 10[6] | 30/— | |
| 19 | 80 | 0 | 20[6] | 30/— | |
| 20 | 70 | 0 | 30[6] | 30/— | |
| 21 | 95 | 0 | 5[7] | 40/98 | |
| 22 | 90 | 0 | 10[7] | 30/— | |
| 23 | 80 | 0 | 20 | 30/— | |
| 24 | 70 | 0 | 30[7] | 30/— | |

[1]"TONE ™ Polyol P-300" polycaprolactone available from Union Carbide Chemicals and Plastics Company, Inc., Danbury, CT
[2]"TONE ™ Polyol 1270" polycaprolactone available from Union Carbide Chemicals and Plastics Company, Inc.
[3]"TONE ™ Polyol 0260" polycaprolactone available from Union Carbide Chemicals and Plastics Company, Inc.
[4]"TONE ™ Polyol 2241" polycaprolactone available from Union Carbide Chemicals and Plastics Company, Inc.
[5]Low molecular weight polycaprolactone triol (reported MW = 1250) commercially available from Aldrich Chemical Co., Inc., Milwaukee, WI
[6]Low molecular weight polycaprolactone triols (reported MW = 530) commercially available from Aldrich Chemical Co., Inc.
[7]Low molecular weight polycaprolactone triols (reported MW = 300) commercially available from Aldrich Chemical Co., Inc.

The addition of lower molecular weight solid polycaprolactone in Runs 2–12 helped to reduce the viscosity of the blend. The addition of low molecular weight polycaprolactone triol in Runs 13–24 served as a plasticizer making the polycaprolactone blend soft while decreasing viscosity.

Example 4

Carbon black commercially available as "AROSPHERE 11" from Huber Corp., Borger, Tex. and a black inorganic pigment commercially available as "F-6331" from Ferro Corporation, Color Division, Cleveland, Ohio were added in the amounts shown in Table 4a to a polycaprolactone commercially available as "TONE™ Polyol P-300" (10,000 molecular weight) from Union Carbide Chemicals and Plastics Company, Inc. Ceramic microspheres commercially available as "ZEEOSPHERES™ 200" from 3M Company, St. Paul, Minn. were added in the amounts shown in Table 4a to a polycaprolactone commercially available as "TONE™ Polyol 1270" (4,000 molecular weight) from Union Carbide Chemicals and Plastics Company, Inc. The polycaprolactone and carbon black, pigment, or microspheres were placed in a HDPE container in an oven at 65° C. until the polycaprolactone was melted. Then the container was placed in boiling water on a hot plate with a mechanical stirrer for a few minutes. The container was placed back in a 65° C. oven to deaerate. The molten polymer mixture was poured into an anodized aluminum metal block commercially available from Coburn, Muskogee, Okla., covered with a polyethylene film, and molded in a concave shape. The block was cooled and the polycaprolactone mixture solidified. The melting time was evaluated by observing the time in seconds that the polymer mixture took to melt at 65° C. under a 500 watt GE sun lamp held at a distance of 125 mm from the surface of the polymer.

The polycaprolactone mixtures were also evaluated for hardness. The results are shown in Table 4a. Hardness was measured using ASTM D2240-91 "Shore Type 'D'".

TABLE 4a

| Run Number | PCL (wt. %) | Inorganic pigment[3] (wt. %) | Carbon Black[4] (wt. %) | Ceramic Microsperes[5] (wt. %) | Melting Time (seconds) | Hardness Shore "D" |
|---|---|---|---|---|---|---|
| 1 | 100[1] | 0 | 0 | 0 | >120 | 53 |
| 2 | 95[1] | 5 | 0 | 0 | 10–15 | 54 |
| 3 | 90[1] | 10 | 0 | 0 | 10–15 | 57 |
| 4 | 95[1] | 0 | 5 | 0 | 10–15 | 53 |
| 5 | 90[1] | 0 | 10 | 0 | 10–15 | 53 |
| 6 | 80[2] | 0 | 0 | 20 | 10 | 45 |
| 7 | 100[2] | 0 | 0 | 0 | >60 | 40 |

[1]"TONE ™ Polyol P-300" polycaprolactone available from Union Carbide Chemicals and Plastics Company, Inc., Danbury, CT
[2]"TONE ™ Polyol 1270" polycaprolactone available from Union Carbide Chemicals and Plastics Company, Inc.
[3]"F-6331" black inorganic pigment available from Ferro Corporation, Color Division, Cleveland, OH
[4]"AROSPRERE 11" carbon black available from Huber Corporation, Borger, TX
[5]"ZEEOSPHERES ™ Z-200" ceramic microspheres available from 3M Company, St. Paul, MN The carbon black, the black inorganic pigment, and the ceramic microspheres increased the hardness of the polycaprolactone. Since both carbon black and the pigment are able to absorb heat and light very quickly, they have a potential advantage of fast heating and cooling for lens blocking applications. In general, the black inorganic pigment blended with the polycaprolactone more easily than the carbon black.

Example 5

Low temperature melting plastics: candle wax, Gerber wax from Gerber Optical Inc., South Windsor, Conn., and Exxon Ethylene Vinyl Acetate (MV 02528) from Exxon Company, Houston, Tex. were each mixed with 30 weight percent carbon black commercially available as "AROSPHERE 11" from Huber Corp., Borger, Tex. The waxes and carbon black were placed in a HDPE container in an oven at 85° C. until the waxes melted. Then the container was placed in boiling water on a hot plate with a mechanical stirrer for a few minutes. The container was placed back in a 65° C. oven to deaerate. The molten polymer mixture was poured into a tray and allowed to cool and solidify. The melting time was evaluated by observing the time in seconds that the wax mixture took to melt at 65° C. under a 500 watt GE sun lamp held at a distance of 125 mm from the surface of the polymer. Hardness was measured using ASTM D2240-91 "Shore Type 'D'".

TABLE 5a

| Run Number | Low Melting Temperature Plastics (wt. %) | Carbon Black (wt. %) | Melting Time (seconds) | Hardness ('D'/'A') |
|---|---|---|---|---|
| 1 | ethylene vinyl acetate[1] 70 | 30 | 15 | |
| 2 | candle wax 70 | 30 | 10 | |
| 3 | wax[2] 70 | 30 | 5 | 28/88 |

[1]"Exxon Ethylene vinyl acetate (MV 02528)" available from Exxon Chemical Company, Houston, TX
[2]"Gerber wax" available from Gerber Optical Inc., South Windsor, CT Low melting plastics mixed with a heat absorbing material such as carbon black had sufficiently low melting times to be useful as a blocking material. Blending carbon black, black pigment or ceramic microspheres increased hardness. The wax used in Run 3 had a hardness of 22D before adding the carbon black.

Example 6

Two resins were blended on a "Haake Rheocord Extruder" (Model 252) commercially available from Haake Inc., Saddle Brook, N.J. with a 1.9 cm diameter screw and with a length to diameter (L:D) ratio of 25:1 to form the backing layer of the surface protection tape. The amounts and types of resins are listed in Table 6a. The temperature of the extruder inlet was maintained at 149° C. The extruder outlet and neck tube temperatures were kept at the same temperatures, 177° C. The die temperature was 204° C.

The deblock test was used to measure the deblocking force required to separate a blocked lens from the block. A double coated tape commercially available as "3M Double Coated 1512 Tape" was applied to one side of the backing layer of the lens surface protective film and to 70 mm plastic lenses with 2.0–2.4 mm center thickness, plano, finished uncut, "RLX Plus™ Scratch Resistant, Finished Lens in Hard Resin" from Signet Armorlite, Inc. using the 3M SURFACE SAVER Applicator with an air pressure setting of 0.28 MPa. Air pressure was set at 0.02–0.03 MPa for the blocker commercially available as OPTEK™ Model 200 Blocker. A brass blocking ring was placed on the blocker and a 56 mm diameter Coburn Block from Coburn Company was placed into the ring such that the inlet in the block fit snugly over the rubber nozzle. The block was centered on the lens and slowly filled with polycaprolactone from Run 1. The blocked lens assembly was allowed to set for 10 to 15 seconds after filling, in order for the resin to harden and form a good bond to the taped lens. The blocked lens was removed from the blocker and allowed to set for 1 hour before deblocking. The blocked lens was placed into the deblocking ring and the lens was taped to the deblocking ring using 1.27 cm wide filament tape. With the blocking tool facing downward, the blocked lens was placed in a hollow tube. The diameter of the tube was much greater than the blocking tool and the tube was sufficiently thick to abruptly stop the lens by its perimeter. The blocked lens assembly was dropped starting at 2.5 cm and raised in 2.5 cm increments until the block separated from the tape or until 15.2 cm in height, then, raised and dropped in 5.1 cm increments up to 91.4 cm. The height in centimeters (cm) at which the block released from the tape was recorded as the deblock values in Table 6a.

Tensile Strength and Percent Elongation in the machine and cross machine directions were determined for Runs 1–7 using ASTM Test Method D 882-91 ("Standard Test Methods for Tensile Properties of Thin Plastic Sheeting" Test Method A: Static Weighing, Constant-Rate-of-Grip Separation Test) on an "INSTRON™ Model No. 1122 Tensile Tester" from Instron Corporation, Canton, Mass. The films were tested in the machine direction and cross machine direction and the results of 3 samples in each direction were averaged. The crosshead speed was 25.4 cm/min, size of sample was 10.2 cm long, 2.54 cm wide, and 0.127 mm thick, and the distance between the grips was 5.08cm.

ing it against the laboratory bench which is the usual method for deblocking a lens. The cylinder made in Run 2 was harder to remove than the one made in Run 1 and a little more marking was observed on the tape backing surface. The cylinder made in Run 3 was the hardest to pull off the tape backing.

In a second experiment using the same resin/wax blends, an assembly of the mold on the tape backing was clamped TABLE 6a

| Run Number | Composition | | Deblock Values (cm) | Tensile Strength | | Elongation | |
|---|---|---|---|---|---|---|---|
| | Resin 1[1] (wt. %) | Resin 2 (wt. %) | | Machine Direction (MPa) | Cross Direction (MPa) | Machine Direction (%) | Cross Direction (%) |
| 1 | 20 | 80[2] | 15.2 | 0.098 | 0.066 | 624 | 638 |
| 2 | 20 | 80[3] | 15.2 | 0.134 | 0.107 | 737 | 799 |
| 3 | 40 | 60[4] | 20.3 | | | | |
| 4 | 40 | 60[2] | 20.3 | 0.132 | 0.044 | 409 | 457 |
| 5 | 40 | 60[3] | 15.2 | 0.134 | 0.046 | 512 | 416 |
| 6 | 60 | 40[2] | 20.3 | 0.134 | 0.062 | 603 | 446 |
| 7 | 60 | 40[3] | 30.5 | 0.134 | 0.069 | 612 | 469 |

[1]"ESTANE ™ 58309 Polyether Type Thermoplastic Polyurethane" from The B. F. Goodrich Company, Cleveland, OH.
[2]"BYNEL ™ E-374 Anhydride Modified Ethylene Acrylate" from E. I. Du Pont de Nemours and Company, Wilmington, DE (now BYNEL 2174).
[3]"AFFINITY ™ 1845 Very Low Density Polyethylene" from Dow Chemical Company, Midland, MI.
[4]"ASPUN ™ 6806 Linear Low Density Polyethylene" from Dow Chemical Company, Midland, MI.

Example 7

Runs 1–3 were prepared by melt blending the amounts and types of resins, waxes, and other additives described in Table 7a to form blocking compositions.

TABLE 7a

| Run Number | Ethylene/Vinyl Acetate[1] (parts) | Paraffin Wax[2] (parts) | Other Additives (parts) |
|---|---|---|---|
| 1 | 200 | 100 | 15.8[3] |
| 2 | 400 | 200 | 1.2[4] |
| 3 | 100 | 100 | 0 |

[1]"ELVAX ™ 210" (72 weight percent ethylene/28 weight percent vinyl acetate) from E. I. Du Pont de Nemours and Company, Wilmington, DE.
[2]"SHELLWAX ™ 200" from Shell Oil Company, Houston, TX.
[3]"Dow Corning 360 Silicone Medical Fluid" (20 centipoise viscosity) from Dow Corning, Midland, MI.
[4]"GP-1 Thixotrope" (N-lauroyl-L-glutamic acid di-n-butylamide) from Ajinomoto U.S.A., Inc., Teaneck, NJ.

In order to test the adhesion of the blocking compositions to a lens protection tape (commercially available as "SURFACE SAVER™ #1640 Lens Surface Systems" from 3M Company), a ceramic plate was clamped to the top of a laboratory bench, the lens protection tape was placed adhesive side down on the plate and a TEFLON™ Coated Mold with four 1.3 cm diameter holes was placed on top of the backing of the tape. A blend from Run 1, 2, or 3 was placed in a container on a hot plate until it was melted. Then the molten blend was poured into the holes in the mold to a depth of 0.3 to 0.6 cm. The molten blend was allowed to cool to room temperature and solidify into cylinders. The cylinders of resin/wax blend were removed from the mold. The cylinders of solidified resin/wax blend were removed from the tape by pulling them off by hand. The cylinder made in Run 1 came off the easiest and marred the tape backing the least. However, the cylinder would not come off by knocking it against the laboratory bench which is the usual method to a piece of acrylic film instead of the ceramic plate. Solid pieces of resin/wax blends from Runs 1, 2, or 3 were placed in the holes of the mold and the entire assembly was placed in an oven at 70° C. until the resin/wax blend had melted and flowed. The assembly was allowed to cool and the resin/wax blend solidified. The cylinders of resin/wax blends were removed from the mold and pulled off of the tape by hand. The resin/wax blend from Run 1 had very low adhesion to the backing and came off very easily. The blend from Run 2 was fairly hard to remove and left a little residue on the backing. The blend from Run 3 has hard to remove and left a lot of residue on the backing.

Example 8

Pieces of polycaprolactone (PCL) (commercially available as "TONE™ Polyol P-300" (10,000 molecular weight) from Union Carbide Chemicals and Plastics Company Inc., Danbury, Conn.) were placed in the holes of the mold described in Example 7 and the entire assembly was placed in an oven at 70° C. until the resin had melted and flowed. The assembly was allowed to cool and the resins solidified. The cylinders of resin were removed from the mold and pulled off of the tape by hand. PCL was as hard to remove from the tape backing as the cylinders in Example 7, Runs 2 and 3. In a second experiment the lens protection tape in the assembly was replaced with an unprimed polyethylene terephthlate (PET) film. There was no adhesion of the PCL to the PET film. In a third experiment the PET film was replaced with a polyethylene film from a "ZIPLOC™ Bag". The cylinders were very easily removed.

Example 9

Resins were made by blending the amounts and types of resins described in Table 9a to form blocking compositions.

TABLE 9a

| Run Number | Polycaprolactone[1] (parts) | Ethylene/Vinyl Acetate (parts) |
|---|---|---|
| 1 | 400 | 100[2] |
| 2 | 400 | 100[3] |

[1]"TONE ™ Polyol P-300" (10,000 molecular weight) from Union Carbide Chemicals and Plastics Company Inc.
[2]"ELVAX ™ 210" (72 weight percent ethylene/28 weight percent vinyl acetate) (Melt Index 400) from E. I. Du Pont de Nemours and Company
[3]"ELVAX ™ 4969-6W" (72 weight percent ethylene/28 weight percent vinyl acetate) (Melt Index 1900) from E. I. Du Pont de Nemours and Company Pieces of the resin blends from Run 1 or Run 2 were placed in the holes of the mold described in Example 7 and the entire assembly was placed in an oven at 70° C. until the resin blends had melted and flowed. The assembly was allowed to cool and the resin blends solidified. The cylinders of resin from Run 1 or Run 2 were removed from the mold and pulled off of the tape by hand. Cylinders of resin from Run 1 were removed easily but not too easily. The viscosity of the resin blend from Run 1 was fairly high. Cylinders of resin blends from Run 2 were removed very easily and the viscosity of the resin blend from Run 2 was also fairly high.

Example 10

A resin was made by blending 8 parts polycaprolactone (commercially available as "TONE™ Polyol P-300" (10,000 molecular weight) from Union Carbide Chemicals and Plastics Company Inc.) with 5 parts polycaprolactone (commercially available as "TONE™ Polyol 221" (1000 molecular weight) from Union Carbide Chemicals and Plastics Company Inc.). Pieces of the resin were placed in the holes of the mold described in Example 7 and the entire assembly was placed in an oven at 70° C. until the resin had melted and flowed. In this experiment the lens protection tape in the assembly was replaced with a polyethylene film from a "ZIPLOC™ Bag". The assembly was allowed to cool and the resin solidified. The cylinders were removed from the mold and pulled off of the tape by hand. The cylinders of resin were very easily removed from the film.

Melting points were determined using Differential Scanning Calorimetry (DSC) at a rate of 20° C. per minute from minus 50° C. to plus 150° C. The results are reported in Table 10a.

TABLE 10a

| Example No./Run No. | Melting Temperature (° C.) |
|---|---|
| 8 | 70 |
| 10 | 58 |
| 9/1 | 61 |
| 9/2 | 65 |

Example 11

Two layer lens surface protection tapes were coextruded in a one step process. The two layers were an outer film layer and an adhesive layer.

The resins used for the film layer comprised 60 parts "ESTANE™ 58309 Polyether Type Thermoplastic Polyurethane" from the B. F. Goodrich Company; 34 parts AFFINITY™ 1845 Very Low Density Polyethylene" from Dow Chemical Company; and 6 parts "Green Pigment Number 1054" from Hoechst-Celanese Corp., Specialty Chemical Group, Coventry, R.I. The resins were blended using a 58 mm diameter twin screw extruder with a L:D ratio of 44:1 (available from Crompton & Knowles Corp., Davis Standard Division, Pawiatuck, Conn.). The temperature of the extruder inlet was maintained at 38° C. and the extruder outlet and neck tube temperatures were maintained at 149° C. The target film layer caliper was 0.051 mm.

The adhesive layer was a 94 parts IOA/6 parts AA acrylic adhesive with 0.4% ABP crosslinker made by the process described in U.S. Pat. Nos. 4,737,559 and 4,847,137. The adhesive layer was processed using a 58 mm diameter twin screw extruder with a L:D ratio of 44:1 (available from Crompton & Knowles Corp.). The temperature of the extruder inlet was maintained at 93° C., the extruder outlet was at 149° C., and the neck tube temperature was maintained at 166° C. The target adhesive layer caliper was 0.076 mm.

The melt flows from the two extruders were combined into one melt stream using a "Cloeren™ Model 93-1123 feedblock" (available from The Cloeren Company, Orange, Tex.) and formed into a two layer film with the adhesive layer down using a "Cloeren EPOCH™ 3 Die" fabricated by The Cloeren Company. The feedblock and the die temperature were maintained at 177° C. The film was extruded onto a silicone release liner. The adhesive was crosslinked by irradiating the tape from the film side using UV curing lamps (available from UVEX Inc., Sunnyvale, Calif.) with a light intensity of 100 millijoules per square cm as measured by a Model M365 UV Radiometer (from Electronic Instrumentation and Technology Inc., Sterling, Va.). The target caliper for the adhesive was 0.076 mm.

The tape was evaluated for deblock force using the Deblock Test described in Example 6 except the double coated tape was not used to attach the tape to the lens surface. The average deblock value was 58.4 cm.

Example 12

Two layer lens surface protection tapes were coextruded in a one step process.

The resins used for the film layer comprised 56 parts "PELLETHANE™ 2103-90AE Polytetramethylene Glycol Ether Thermoplastic Polyurethane Elastomers" from Dow Chemical Company; 38 parts "ENGAGE™ 8200 Polyolefin Elastomer" from Dow Chemical Company; and 6 parts "Green Pigment Number 1054" from Hoechst-Celanese Corp. The resins were blended using the twin screw extruder described in Example 11. The temperature of the extruder inlet was maintained at 21° C. and the extruder outlet and neck tube temperatures were maintained at 166° C. The target film layer caliper was 0.051 mm.

The adhesive layer was the same as that described in Example 11. The adhesive layer was processed using the twin screw extruder described in Example 11. The temperature of the extruder inlet was maintained at 93° C., the extruder outlet was at 149° C., and the neck tube temperature varied from 177° C. to 193° C. The target adhesive layer caliper was 0.076 mm.

The melt flows from the two extruders were combined into one melt stream as described in Example 11. The feedblock temperature was maintained at 177° C. and the die temperature was maintained at 179° C. The film was extruded onto a silicone release liner. The adhesive was crosslinked by irradiating the tape from the film side using UV curing lamps (available from UVEX Inc.) with a light intensity of 150 millijoules per square cm as measured by a Model M365 UV Radiometer (from Electronic Instrumentation and Technology Inc.). The target caliper for the adhesive was 0.076 mm.

Example 13

Polycaprolactone (PCL) materials available as "CAPA™ poly(ε-caprolactone) diol" (10,000 molecular weight) from Solvay Interox, Houston, Tex., Run 1, were blended with a lower viscosity material, stearic acid (SA) available from J. T. Baker, Phillipsburg, N.J., in the amounts shown in Table 13a, Runs 2–5. The lower viscosity material, SA, was heated in an aluminum tin until liquified and allowed to cool and solidify. The PCL was heated in an aluminum tin on a hot plate to about 100° C. Chunks of SA were broken off and added slowly to the molten PCL while stirring mechanically.

TABLE 13a

| Run Number | Polycaprolactone (weight percent) | Stearic Acid (weight percent) |
|---|---|---|
| 1 | 100 | 0 |
| 2 | 95 | 5 |
| 3 | 90 | 10 |
| 4 | 85 | 15 |
| 5 | 80 | 20 |

Viscosity of the molten PCL/SA mixtures was determined using a Brookfield Viscometer as described in Example 3.

Hot melt blends of PCL/SA were poured into a Coburn block, then covered with polyethylene terephthalate film and allowed to solidify. Hardness was measured using a durometer for Shore type 'D' as described in Example 3 after 10, 20, and 30 minutes of cooling. The solidified PCL/SA mixture was inspected for cracking on the surface. The time required for the molten PCL/SA mixture to solidify was measured. The results of viscosity and hardness testing as well as the presence or absence of cracks and the set-up time are reported in Table 13b.

TABLE 13b

| Run Number | Viscosity (cp) | Shore "D" Hardness 10 min | 20 min | 30 min | Cracking (yes or no) | Set-up Time (seconds) |
|---|---|---|---|---|---|---|
| 1 | 30,000 | 37 | 41 | 44 | no | >30 |
| 2 | 18,000 | 37 | 39 | 38 | no | 10–15 |
| 3 | 14,400 | 27 | 30 | 36 | no | — |
| 4 | 10,600 | 24 | 28 | 34 | no | — |
| 5 | 8,300 | 20 | 27 | 30 | no | — |

The viscosity of PCL was decreased by a factor of about 4 when 20 percent SA was added to the melt.

Example 14

Polycaprolactone (PCL) materials available as "CAP™ poly(ε-caprolactone) diol" (10,000 molecular weight) from Solvay Interox, Houston, Tex. were blended with a lower viscosity material, stearyl alcohol (SAL) or 1-octadecanol available from Aldrich Chemical Company, Milwaukee, Wis., as described in Example 13 in the amounts shown in Table 14a.

TABLE 14a

| Run Number | Polycaprolactone (weight percent) | Stearyl alcohol (weight percent) |
|---|---|---|
| 1 | 100 | 0 |
| 2 | 95 | 5 |
| 3 | 90 | 10 |
| 4 | 85 | 15 |
| 5 | 80 | 20 |

The blocking compositions of molten PCL/SAL blends were evaluated for viscosity, hardness, and cracking, as described for Example 13. The results are reported in Table 14b.

TABLE 14b

| Run Number | Viscosity (cp) | Shore "D" Hardness 10 min | 20 min | 30 min | Cracking (yes or no) |
|---|---|---|---|---|---|
| 1 | 30,000 | 37 | 41 | 44 | no |
| 2 | 16,600 | 35 | 39 | 43 | no |
| 3 | 12,200 | 24 | 29 | 31 | no |
| 4 | 8,920 | 19 | 24 | 28 | no |
| 5 | 6,720 | 18 | 24 | 27 | no |

SAL is less acidic than SA.

Example 15

Polycaprolactone (PCL) materials available as "CAPA™ poly(ε-caprolactone) diol" (10,000 molecular weight) from Solvay Interox, Houston, Tex., were blended with lower viscosity materials, stearic acid (SA) and stearyl alcohol (SAL). Chunks of solidified, blended SA and SAL in a ratio of 64 parts by weight SA to 36 parts by weight SAL were added to the molten PCL as described in Example 13 in the amounts shown in Table 15a.

TABLE 15a

| Run Number | Polycaprolactone (weight percent) | Stearic Acid:Stearyl alcohol (weight percent) |
|---|---|---|
| 1 | 100 | 0 |
| 2 | 95 | 5 |
| 3 | 90 | 10 |
| 4 | 85 | 15 |
| 5 | 80 | 20 |

The blocking compositions of molten PCL/SAL blends were evaluated for viscosity, hardness, and cracking as described for Example 13. The results are reported rted in Table 15b.

TABLE 15b

| Run Number | Viscosity (cp) | Shore "D" Hardness 10 min | 20 min | 30 min | Cracking (yes or no) |
|---|---|---|---|---|---|
| 1 | 30,000 | 37 | 41 | 44 | no |
| 2 | 17,900 | 34 | 41 | 41 | no |
| 3 | 12,400 | 32 | 35 | 36 | no |
| 4 | 8,000 | 28 | 32 | 32 | no |
| 5 | 5,500 | 27 | 31 | 31 | no |

The blend solidified faster than PCL alone.

Example 16

Polycaprolactone (PCL) materials available as "TONE™ P-300 polycaprolactone" (10,000 molecular weight) from Union Carbide Corporation, Danbury, Conn. were blended with a lower viscosity material, tri-phenyl phosphate (TPP) available from Monsanto Chemical Company, St. Louis, Mo., as described in Example 13 in the amounts shown in Table 16a.

TABLE 16a

| Run Number | Polycaprolactone (weight percent) | Tri-phenyl phosphate (weight percent) |
|---|---|---|
| 1 | 100 | 0 |
| 2 | 95 | 5 |
| 3 | 90 | 10 |
| 4 | 85 | 15 |

The blocking compositions of molten PCL/TPP blends were evaluated for viscosity, hardness, and cracking as described for Example 13. The results are reported in Table 16b.

TABLE 16b

| Run Number | Viscosity (cp) | Shore "D" Hardness 10 min | 20 min | 30 min | Cracking (yes or no) |
|---|---|---|---|---|---|
| 1 | 54,000 | 37 | 41 | 44 | no |
| 2 | 44,200 | 38 | 40 | 41 | no |
| 3 | 35,500 | 34 | 35 | 36 | no |
| 4 | 30,000 | 30 | 31 | 31 | no |

The viscosity of PCL was decreased by a factor of about 2 when 15 percent TPP was added to the melt.

Example 17

Polycaprolactone materials available as "CAPA™ poly (ε-caprolactone) diol"(10,000 molecular weight) from Solvay Interox, Houston, Tex., were blended with a lower viscosity material, myristyl alcohol (MAL) (1-tetradecanol) available from Aldrich Chemical Company as described in 13 in the amounts shown in Table 17a.

TABLE 17a

| Run Number | Polycaprolactone (weight percent) | Myristyl alcohol (weight percent) |
|---|---|---|
| 1 | 100 | 0 |
| 2 | 95 | 5 |
| 3 | 90 | 10 |
| 4 | 85 | 15 |
| 5 | 70 | 30 |

The blocking compositions of molten PCL/MAL blends were evaluated for viscosity as described for Example 3 except spindle no. 16 was used. The molten blends were poured into a mold, allowed to cool and solidify, and evaluated for Tangent Modulus of Elasticity in Bending and Flexural Strength as described for Example 2 except the crosshead motion was 2.8 mm per minute. The results are reported in Tables 17b and 17c.

TABLE 17b

Tangent Modulus of Elasticity in Bending

| Run Number | Number of Samples | Mean (MPa) | Standard Deviation (MPa) |
|---|---|---|---|
| 5 | 5 | 434 | 19 |

TABLE 17c

Flexural Strength

| Run Number | Number of Samples | Mean (MPa) | Standard Deviation (MPa) |
|---|---|---|---|
| 5 | 5 | 3.3 | 0.3 |

Example 18

Polycaprolactone materials available as "CAPA™ poly (ε-caprolactone) diol" (10,000 molecular weight) from Solvay Interox, Houston, Tex. were blended with lower viscosity materials, myristyl alcohol (MAL) (1-tetradecanol) and stearyl alcohol (SAL) (1-octadeconol) available from Aldrich Chemical Company. Chunks of blended and solidified MAL and SAL were added as described in Example 13 in the amounts shown in Table 18a.

TABLE 18a

| Run Number | Polycaprolactone (weight percent) | Myristyl alcohol (weight percent) | Stearyl alcohol (weight percent) |
|---|---|---|---|
| 1 | 80 | 6 | 14 |
| 2 | 80 | 7 | 13 |
| 3 | 80 | 8 | 12 |
| 4 | 80 | 9 | 11 |

The blocking compositions of molten PCL/MAL/SAL blends were evaluated for viscosity as described for Example 3, except spindle no. 16 was used. The molten blends were poured into a mold, allowed to cool and solidify, and evaluated for Tangent Modulus of Elasticity in Bending and Flexural Strength as described for Example 2 except the crosshead motion was 2.8 mm per minute. The results are reported in Tables 18b and 18c.

TABLE 18b

Tangent Modulus of Elasticity in Bending

| Run Number | Viscosity (cp) | Number of Samples | Mean (MPa) | Standard Deviation (MPa) |
|---|---|---|---|---|
| 1 | 6,000 | 5 | 436 | 31 |
| 2 | 6,000 | 5 | 506 | 29 |
| 3 | 5,900 | 5 | 454 | 34 |
| 4 | 5,800 | 5 | 471 | 39 |

TABLE 18c

Flexural Strength

| Run Number | Number of Samples | Mean (MPa) | Standard Deviation (MPa) |
|---|---|---|---|
| 1 | 5 | 3.2 | 0.4 |
| 2 | 5 | 3.2 | 0.3 |

TABLE 18c-continued

| | | Flexural Strength | |
|---|---|---|---|
| Run Number | Number of Samples | Mean (MPa) | Standard Deviation (MPa) |
| 3 | 5 | 3.3 | 0.2 |
| 4 | 5 | 3.5 | 0.3 |

Example 19

Polycaprolactone materials available as "CAPA™ poly (ε-caprolactone) diol" (10,000 molecular weight) from Solvay Interox, Houston, Tex. were blended with lower viscosity materials, dodecyl alcohol (DO) (1-odecanol) available from Eastman Chemical Company, Kingsport, Tenn., myristyl alcohol (MAL) (1-tetradecanol) and stearyl alcohol (SAL) (1-octadeconol) available from Aldrich Chemical Company. Chunks of blended and solidified DO, MAL, and SAL were added as described in Example 13 in the amounts shown in Table 19a.

TABLE 19a

| Run Number | Polycaprolactone (weight percent) | Dodecyl alcohol (weight percent) | Myristyl alcohol (weight percent) | Stearyl alcohol (weight percent) |
|---|---|---|---|---|
| 1 | 95 | 0.1 | 1.7 | 3.2 |
| 2 | 90 | 0.2 | 3.4 | 6.4 |
| 3 | 85 | 0.3 | 5.1 | 9.6 |
| 4 | 80 | 0.4 | 6.8 | 12.8 |

The blocking compositions of molten PCL/DO/MAL/SAL blends were evaluated for viscosity as described for Example 3 except spindle no. 16 was used. The molten blends were poured into a mold, allowed to cool and solidify, and evaluated for Tangent Modulus of Elasticity in Bending and Flexural Strength as described for Example 2 except the crosshead motion was 2.8 mm per minute. The results are reported in Tables 19b and 19c.

TABLE 19b

| | | Tangent Modulus of Elasticity in Bending | | |
|---|---|---|---|---|
| Run Number | Viscosity (cp) | Number of Samples | Mean (MPa) | Standard Deviation (MPa) |
| 1 | 16,400 | 5 | 566 | 49 |
| 2 | 11,600 | 5 | 521 | 15 |
| 3 | 7,800 | 5 | 447 | 42 |
| 4 | 5,600 | 5 | 509 | 30 |

TABLE 19c

| | | Flexural Strength | |
|---|---|---|---|
| Run Number | Number of Samples | Mean (MPa) | Standard Deviation (MPa) |
| 1 | 5 | 1.9 | 0.03 |
| 2 | 5 | 2.3 | 0.2 |
| 3 | 5 | 2.3 | 0.1 |
| 4 | 5 | 3.2 | 0.2 |

Example 20

Polycaprolactone materials available as "CAPA™ poly (ε-caprolactone) diol" (10,000 molecular weight) from Solvay Interox, Houston, Tex. were blended with polyethylene glycol methyl ether (2,000 molecular weight) (PEGME) available from Aldrich Chemical Company as described in Example 13 in the amounts shown in Table 20a.

TABLE 20a

| Run Number | Polycaprolactone (weight percent) | Polyethylene glycol methyl ether (weight percent) |
|---|---|---|
| 1 | 90 | 10 |
| 2 | 80 | 20 |
| 3 | 70 | 30 |

The molten PCL/PEGMA blends were poured into a mold, allowed to cool solidify, and evaluated for Tangent Modulus of Elasticity in Bending and Flexural Strength as described for Example 2 except the crosshead motion was 2.8 mm per minute. The results are reported in Tables 20b and 20c.

TABLE 20b

| | Tangent Modulus of Elasticity in Bending | | |
|---|---|---|---|
| Run Number | Number of Samples | Mean (MPa) | Standard Deviation (MPa) |
| 1 | 5 | 491 | 34 |
| 2 | 5 | 478 | 30 |
| 3 | 5 | 589 | 27 |

TABLE 20c

| | Flexural Strength | | |
|---|---|---|---|
| Run Number | Number of Samples | Mean (MPa) | Standard Deviation (MPa) |
| 1 | 5 | 2.6 | 0.2 |
| 2 | 5 | 3.5 | 0.3 |
| 3 | 5 | 3.2 | 0.4 |

Example 21

Polycaprolactone materials available as "CAPA™ poly (ε-caprolactone) diol" (8,000 molecular weight), "CAPA™ poly(ε-caprolactone) diol" (10,000 molecular weight), and "CAPA™ poly(ε-caprolactone) diol" (12,000 molecular weight) from Solvay Interox were blended with polyethylene ethylene glycol (1500 0r 2000 molecular weight (MW)) (PEG) available from Aldrich Chemical Company as described in Example 13 in the amounts shown in Table 21a.

TABLE 21a

| Run Number | Polycaprolactone (weight percent) | | | Polyethylene ethylene glycol (weight percent) | |
|---|---|---|---|---|---|
| | "P-8K"[1] | "P-10K"[2] | "P-12K"[3] | 1500 MW | 2000 MW |
| 1 | — | 90 | — | 10 | — |
| 2 | — | 80 | — | 20 | — |
| 3 | 90 | — | — | — | 10 |
| 4 | 80 | — | — | — | 20 |
| 5 | — | 90 | — | — | 10 |
| 6 | — | — | 90 | — | 10 |

[1]"CAPA ™ poly(ε-caprolactone) diol" (8,000 molecular weight) from Solvay Interox, Houston, TX.

TABLE 21a-continued

| Run Number | Polycaprolactone (weight percent) | | | Polyethylene ethylene glycol (weight percent) | |
|---|---|---|---|---|---|
| | "P-8K"[1] | "P-10K"[2] | "P-12K"[3] | 1500 MW | 2000 MW |

[2]"CAPA ™ poly(ε-caprolactone) diol" (10,000 molecular weight) from Solvay Interox.
[3]"CAPA ™ poly(ε-caprolactone) diol" (12,000 molecular weight) from Solvay Interox.

The blocking compositions of molten PCL/PEG blends were evaluated for viscosity as described for Example 3 except spindle no. 16 was used. The molten blends were poured into a mold, allowed to cool and solidify, and evaluated for Tangent Modulus of Elasticity in Bending and Flexural Strength as described for Example 2 except the crosshead motion was 2.8 mm per minute. The results are reported in Tables 21b and 21c.

TABLE 21b

| | | Tangent Modulus of Elasticity in Bending | |
|---|---|---|---|
| Run Number | Viscosity (cp) | Number of Samples | Mean (MPa) | Standard Deviation (MPa) |
| 1 | 17,000 | 5 | 419 | 22 |
| 2 | 11,000 | 5 | 404 | 35 |
| 3 | 8,300 | 5 | 493 | 17 |
| 4 | 6,200 | 5 | 430 | 64 |
| 5 | 16,200 | 5 | 525 | 42 |
| 6 | 31,000 | 4 | 454 | 34 |

TABLE 21c

| | | Flexural Strength | |
|---|---|---|---|
| Run Number | Number of Samples | Mean (MPa) | Standard Deviation (MPa) |
| 1 | 5 | 3.4 | 0.5 |
| 2 | 5 | 2.1 | 0.7 |
| 3 | 5 | 2.4 | 0.3 |
| 4 | 5 | 4.2 | 0.9 |
| 5 | 5 | 2.0 | 0.3 |
| 6 | 4 | 3.0 | 0.5 |

Example 22

High molecular weight polycaprolactone materials available as "CAPA™ 630" (10,000 molecular weight) from Solvay Interox were blended with lower viscosity materials, a low molecular weight polycaprolactone available as "TONE™ P-1270" (4,000 molecular weight) from Union Carbide Chemicals and plastics Company Inc. polycaprolactone (PCL) and, myristyl alcohol (MAL) (1-tetradecanol) available from Aldrich Chemical Company. Chunks of a low molecular weight PCL and MAL were added as described in Example 13 in the amounts shown in Table 22a.

TABLE 22a

| Run Number | Polycaprolactone (weight percent) | | Myristyl alcohol (weight percent) |
|---|---|---|---|
| | "CAPA ™ 630"[1] | "TONE ™ P-1270"[2] | |
| 1 | 44 | 20 | 36 |
| 2 | 43 | 36 | 21 |

[1]Commercially available from Solvay Interox, Houston, TX.
[2]Commercially available from Union Carbide Chemicals and Plastics Company Inc., Danbury, CT.

The blocking compositions of molten PCL/MAL blends were evaluated for viscosity as described for Example 3 except spindle no. 16 was used. The molten blends were poured into a mold, allowed to cool and solidify, and evaluated for Tangent Modulus of Elasticity in Bending and Flexural Strength as described for Example 2 except the crosshead motion was 2.8 mm per minute. The results are reported in Tables 22b and 22c.

TABLE 22b

| | | Tangent Modulus of Elasticity in Bending | | |
|---|---|---|---|---|
| Run Number | Viscosity (cp) | Number of Samples | Mean (MPa) | Standard Deviation (MPa) |
| 1 | 22,000 | 5 | 336 | 23 |
| 2 | 22,000 | 5 | 396 | 24 |

TABLE 22c

| | Flexural Strength | | |
|---|---|---|---|
| Run Number | Number of Samples | Mean (MPa) | Standard Deviation (MPa) |
| 1 | 5 | 5.0 | 0.7 |
| 2 | 5 | 4.4 | 0.4 |

Example 23

High molecular weight polycaprolactone materials available as "CAPA™ 630" (30,000 molecular weight) from Solvay Interox were blended with lower viscosity materials, a low molecular weight polycaprolactone available as "TONE™ P-1270" from Union Carbide Chemicals and Plastics Company Inc. polycaprolactone (PCL), myristyl alcohol (MAL) (1-tetradecanol) and stearyl alcohol (SAL) (1-octadeconol) available from Aldrich Chemical Company. Chunks of blended and solidified low molecular weight PCL, MAL, and SAL were added as described in Example 13 in the amounts shown in Table 23a.

TABLE 23a

| Run Number | Polycaprolactone (weight percent) | | Myristyl alcohol (weight percent) | Stearyl alcohol (weight percent) |
|---|---|---|---|---|
| | "CAPA ™ 630"[1] | "TONE ™ P-1270"[2] | | |
| 1 | 41 | 30 | 20 | 10 |

[1]Commercially available from Solvay Interox, Houston, TX.
[2]Commercially available from Union Carbide Chemicals and Plastics Company Inc., Danbury, CT.

The blocking compositions of molten PCL/MAL/SAL blends were evaluated for viscosity as described for Example 3 except spindle no. 16 was used. The molten blends were poured into a mold, allowed to cool and solidify, and evaluated for Tangent Modulus of Elasticity in Bending and Flexural Strength as described for Example 2 except the crosshead motion was 2.8 mm per minute. The results are reported in Tables 23b and 23c.

TABLE 23b

Tangent Modulus of Elasticity in Bending

| Run Number | Viscosity (cp) | Number of Samples | Mean (MPa) | Standard Deviation (MPa) |
| --- | --- | --- | --- | --- |
| 1 | 21,000 | 5 | 303 | 66 |

TABLE 23c

Flexural Strength

| Run Number | Number of Samples | Mean (MPa) | Standard Deviation |
| --- | --- | --- | --- |
| 1 | 5 | 4.6 | 0.6 |

Example 24

High molecular weight polycaprolactone materials available as "CAPA™ 630" (30,000 molecular weight) from Solvay Interox were blended with lower viscosity materials, a low molecular weight polycaprolactone material available as "TONE™ P-1270" (4,000 molecular weight) from Union Carbide Chemicals and Plastics Company Inc. polycaprolactone (PCL), myristyl alcohol (MAL) (1-tetradecanol), stearyl alcohol (SAL) (1-octadeconol) and polyethylene glycol (PEG) available from Aldrich Chemical Company. Chunks of blended and solidified low molecular weight PCL, MAL, Sal, and PEG were added as described in Example 13 in the amounts shown in Table 24a.

TABLE 24a

| | Polycaprolactone (weight percent) | | Myristyl alcohol | Stearyl alcohol | Polyethylene Glycol |
| --- | --- | --- | --- | --- | --- |
| Run Number | "CAPA ™ 630"[1] | "TONE ™ P-1270"[2] | (weight percent) | (weight percent) | (weight percent) |
| 1 | 43 | 20 | 19 | 9 | 9 |
| 2 | 41 | 24 | 16 | 9 | 11 |
| 3 | 42 | 24 | 15 | 5 | 15 |
| 4 | 42 | 18 | 18 | 10 | 12 |

[1]Commercially available from Solvay Interox, Houston, TX.
[2]Commercially available from Union Carbide Chemicals and Plastics Company Inc., Danbury, CT.

The blocking compositions of molten PCL/MAL/SAL/PEG blends were evaluated for viscosity as described for Example 3 except spindle no. 16 was used. The molten blends were poured into a mold, allowed to cool and solidify, and evaluated for Tangent Modulus of Elasticity in Bending and Flexural Strength as described for Example 2 except the crosshead motion was 2.8 mm per minute. The results are reported in Tables 24b and 24c.

TABLE 24b

Tangent Modulus of Elasticity in Bending

| Run Number | Viscosity (cp) | Number of Samples | Mean (MPa) | Deviation (MPa) |
| --- | --- | --- | --- | --- |
| 1 | 18,000 | 5 | 319 | 24 |
| 2 | 13,000 | 5 | 255 | 26 |
| 3 | 14,000 | 3 | 290 | 5 |
| 4 | 17,000 | 5 | 316 | 35 |

TABLE 24c

Flexural Strength

| Run Number | Number of Samples | Mean (MPa) | Standard Deviation |
| --- | --- | --- | --- |
| 1 | 5 | 3.6 | 0.6 |
| 2 | 5 | 4.3 | 0.3 |
| 3 | 3 | 4.4 | 0.1 |
| 4 | 5 | 3.7 | 0.6 |

Example 25

Three layer lens surface protection tapes were coextruded in a one step process. The three layers were an outer film layer (skin), a tie layer (core) and an adhesive layer. The compositions of the various layers used to make the tapes are given in Table 25a. The target thickness for the outer film layer, tie layer, and adhesive layer are reported in Table 25b.

The outer film layer was either a blend of polycaprolactone (PCL) (available as "CAPA™ 650" from Solvay Interox) and a maleic anhydride modified ethylene acrylate (available as "Bynel 2174" from DuPont Packaging & industrial Polymers, Wilmington, Del.) and a maleic anhydride modified linear low density polyethylene (available as "Bynel 4109" from DuPont Packaging & Industrial Polymers) or a blend of the PCL and a maleic anhydride modified low density polyethylene (available as "Bynel 4206" from DuPont Packaging & Industrial Polymers). Three percent of a pigment (available as "05ELD-1054" from Resco Colours a division of Hoechst, Mississauga, Ontario) was added to this blend. The resins and pigment as described in Table 25a were blended using a 58 mm diameter twin screw extruder with a length to diameter (L:D) ratio of 44:1 (available from Crompton & Knowles Corp., Davis Standard Division). The temperature of the extruder inlet was maintained at 21° C. and the extruder outlet and neck tube temperatures were maintained at 193° C.

The tie layer was made from a nylon 6/6,9 copolymer (available as "GRILON™ CF62BSE Nylon 6/6,9 Copolymer" from EMS-American Grilon Inc., Sumter, S.C.). The tie layer (core) was processed using a 6.35 cm (2.5 inch) diameter single screw extruder with a length to diameter (L:D) ratio of 30:1 (available from Crompton & Knowles Corp., Davis Standard Division). The temperature of the extruder inlet was maintained at 66° C. and the extruder outlet and neck tube temperatures were maintained at 177° C.

The adhesive layer was made from a 94 parts IOA /6 parts AA acrylic adhesive with 0.4% ABP crosslinker made by the process described in U.S. Pat. Nos. 4,737,559 and 4,847,137. The adhesive layer was processed using a 58 mm diameter twin screw extruder with a length to diameter (L:D) ratio of 44:1 (available from Crompton & Knowles Corp., Davis Standard Division). The temperature of the extruder inlet was maintained at 93° C. and the extruder outlet and neck tube temperatures were maintained at 177° C.

The melt streams from the three extruders were combined into one melt stream using a "Cloeren™ Model 92-1033 feedblock" (available from The Cloeren Company) and formed into a film using a Cloeren Epoch die fabricated by The Cloeren Company. The feedblock temperature was maintained at 177° C. and the die temperature was maintained at 179° C.

The adhesive was crosslinked by irradiating the tape from the adhesive side using UV curing lamps (available from UVEX Inc., Sunnyvale, Calif.) with a light intensity of 84 millijoules/square cm as measured by a Model M365 UV Radiometer (from Electronic Instrumentation and Technology Inc., Sterling, Va.) in the 320 to 390 nm range.

TABLE 25a

| | Composition | | | | | |
|---|---|---|---|---|---|---|
| | Film Layer[1] | | | | Tie Layer | Adhesive Layer |
| Run Number | Resin 1[2] (wt. %) | Resin 2[3] (wt. %) | Resin 3[4] (wt. %) | Resin 4[5] (wt. %) | Resin 6 (wt. %) | Adhesive[7] (wt. %) |
| 1 | 10 | 87 | — | — | 100 | 100 |
| 2 | 20 | 77 | — | — | 100 | 100 |
| 3 | 30 | 67 | — | — | 100 | 100 |
| 4 | 40 | 57 | — | — | 100 | 100 |
| 5 | 50 | 47 | — | — | 100 | 100 |
| 6 | 30 | — | 47 | 23 | 100 | 100 |
| 7 | 40 | — | 37 | 23 | 100 | 100 |

[1]The Film Layer of Runs 1–5 also contain 3 weight percent pigment, commercially available as "05ELD-1054" from Resco Colours a Division of Hoechst, Mississauga, Ontario.
[2]Commercially available as "CAPA ™ 650 polycaprolactone" from Solvay Interox, Houston, TX.
[3]Commercially available as "Bynel 4206 maleic anhydride modified low density polyethylene" from DuPont Packaging & Industrial Polymers, Wiimington, DE.
[4]Commercially available as "Bynel 2174 maleic anhydride modified ethylene acrylate" from DuPont Packaging & Industrial Polymers.
[5]Commercially available as "Bynel 4109 maleic anhydride modified linear low density polyethylene" from DuPont Packaging & Industrial Polymers.
[6]Commercially available as "GRILON ™ CF62BSE Nylon 6/6,9 Copolymer" from EMS American Grilon Inc., Sumter, SC.
[7]94 parts IOA/6 parts AA with 0.4% ABP crosslinker, made by the process described in US Pat. Nos. 4,737,559 and 4,847,137.

The lens surface protection tapes were evaluated using the Deblock Test described in Example 6 except that a second set of blocked lens were deblocked after being allowed to set for 17 hours. The results are reported in Table 25b.

TABLE 25b

| | Target Thickness | | | | |
|---|---|---|---|---|---|
| | Outer Film | Tie | Adhesive | Deblock Values after | |
| Run Number | Layer (mm) | Layer (mm) | Layer (mm) | 1 hour (cm) | 17 hours (cm) |
| 1 | 0.0508 | 0.0076 | 0.0762 | 8.4 | 10.9 |
| 2 | 0.0508 | 0.0076 | 0.0762 | na[1] | na |
| 3 | 0.0508 | 0.0076 | 0.0762 | 10.2 | 13.5 |
| 4 | 0.0508 | 0.0076 | 0.0762 | na | na |
| 5 | 0.0508 | 0.0076 | 0.0762 | 32.0 | 32.3 |
| 6 | 0.0508 | 0.0076 | 0.0762 | 18.5 | 18.5 |
| 7 | 0.0508 | 0.0076 | 0.0762 | 23.6 | 25.4 |

[1]"na" means not available.

Various modifications and alterations of this invention will be apparent to those skilled in the art without departing from the scope and spirit of this invention, and it should be understood that this invention is not limited to the illustrative embodiments set forth herein.

What is claimed is:

1. A preformed base block, comprising:
   a rear portion that is sized and adapted to fit a lens processing machine, and
   a front portion having a negatively tapered peripheral edge and a front textured surface, wherein the negatively tapered peripheral edge of the front portion is angled so as to provide a mechanical overcut and the front portion is adapted to mechanically retain a blocking composition against the negatively tapered peripheral edge to form a lens block against a lens blank;
   wherein the textured surface comprises a plurality of projecting portions having a draft angle greater than 4 degrees.

2. A preformed base block, comprising:
   a rear portion that is sized and adapted to fit a lens processing machine, and
   a front portion having a negatively tapered peripheral edge and a front textured surface, wherein the negatively tapered peripheral edge of the front portion is angled so as to provide a mechanical overcut and the front portion is adapted to mechanically retain a blocking composition against the negatively tapered peripheral edge to form a lens block against a lens blank,
   wherein the textured surface comprises a plurality of projecting portions having a depth of greater than about 0.15 mm.

3. A preformed base block, comprising:
   a rear portion that is sized and adapted to fit the chuck of a lens processing machine, and
   a front portion adapted to mechanically attain a blocking composition to form a lens block against a lens blank, with a front surface wherein the entire front surface is textured with a textured surface pattern, and the textured surface pattern provides a mechanical lock between the base block and the blocking composition thereby resisting rotation between the base block and the blocking composition.

4. The preformed base block of claim 3, wherein the textured surface comprises a plurality of projecting portions having a draft angle greater than 9 degrees and a depth of greater than about 0.25 mm.

5. A preformed base block, comprising:

a rear portion that is sized and adapted to fit a lens processing machine, and a front portion having a negatively tapered peripheral edge and a front textured surface, wherein the negatively tapered peripheral edge of the front portion is angled so as to provide a mechanical overcut and the front portion is adapted to mechanically retain a blocking composition against the negatively tapered peripheral edge to form a lens block against a lens blank, and wherein the block is provided in the form of an ophthalmic lens block comprising the base block and a solidified mass of a thermoplastic blocking composition.

6. The block of claim 5, wherein the thermoplastic blocking composition comprises epsilon-caprolactone.

7. The block of claim 5, wherein the thermoplastic blocking composition is a thermoplastic polymer composition having a mean bending modulus of at least 69 MPa at 21° C. and a sufficiently low melting or softening point such that the composition may be placed adjacent to an ophthalmic lens block while at its melting or softening point without damaging the lens blank.

8. The preformed base block of claim 3, wherein the block is provided in the form of an ophthalmic lens block comprising the base block and a solidified mass of a thermoplastic blocking composition.

9. The block of claim 8, wherein the thermoplastic blocking composition comprises epsilon-caprolactone.

10. The block of claim 8, wherein the thermoplastic blocking composition is a thermoplastic polymer composition having a mean bending modulus of at least 69 MPa at 21° C. and a sufficiently low melting or softening point such that the composition may be placed adjacent to an ophthalmic lens block while at its melting or softening point without damaging the lens blank.

11. A preformed base block according to claim 3, wherein the textured surface pattern comprises a plurality of projecting portions and the projecting portions have a draft angle greater than 4 degrees.

* * * * *

UNITED STATES PATENT AND TRADEMARK OFFICE
CERTIFICATE OF CORRECTION

PATENT NO. : 6,126,528
DATED : October 3, 2000
INVENTOR(S) : Carole Sedlock

It is certified that error appears in the above-identified patent and that said Letters Patent is hereby corrected as shown below:

Column 9,
Line 43, "preferablely" should read -- preferably --.

Column 41,
Line 17, "flecural" should read -- Flexural --.

Column 47,
Line 27, "AROSPRERE" should read -- AROSPHERE --.

Column 53,
Line 61, "CAP$^{TM}$" should read -- CAPA$^{TM}$ --.

Column 54,
Line 53, after "reported" delete -- rted --.

Column 58,
Line 49, "Or" should read -- or --.

Column 59,
Line 58, "10,000" should read -- 30,000 --.
Line 63, "plastics" should read -- Plastics --.

Column 64,
Line 62, "attain" should read -- retain --.

Signed and Sealed this

Fourth Day of June, 2002

*Attest:*

*Attesting Officer*

JAMES E. ROGAN
*Director of the United States Patent and Trademark Office*